United States Patent
Zhang et al.

(10) Patent No.: US 11,893,359 B2
(45) Date of Patent: Feb. 6, 2024

(54) SPEECH TRANSLATION METHOD AND TERMINAL WHEN TRANSLATED SPEECH OF TWO USERS ARE OBTAINED AT THE SAME TIME

(71) Applicant: Huawei Technologies Co., Ltd., Shenzhen (CN)

(72) Inventors: Xin Zhang, Shenzhen (CN); Gan Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 17/230,337

(22) Filed: Apr. 14, 2021

(65) Prior Publication Data

US 2021/0232777 A1    Jul. 29, 2021

Related U.S. Application Data

(63) Continuation of application No. PCT/CN2019/111129, filed on Oct. 15, 2019.

(30) Foreign Application Priority Data

Oct. 15, 2018  (CN) .......................... 201811198370.5

(51) Int. Cl.
  *G06F 40/58* (2020.01)
  *G10L 15/28* (2013.01)
  (Continued)

(52) U.S. Cl.
  CPC .............. *G06F 40/58* (2020.01); *G10L 21/00* (2013.01); *G10L 25/93* (2013.01); *H04L 51/58* (2022.05);
  (Continued)

(58) Field of Classification Search
  CPC .......... G06F 40/58; G10L 15/26; G10L 15/28
  (Continued)

(56) References Cited

U.S. PATENT DOCUMENTS 7,643,985 B2 *  1/2010  Horvitz .................. G06F 40/58
                                                                704/277
2003/0125927 A1   7/2003  Seme
(Continued)

FOREIGN PATENT DOCUMENTS

CN          101867632 A      10/2010
CN          201717937 U       1/2011
(Continued)

*Primary Examiner* — Farzad Kazeminezhad
(74) *Attorney, Agent, or Firm* — Slater Matsil, LLP

(57) ABSTRACT

This application discloses an audio processing method and a terminal. The method may include: collecting, by a first terminal, an original speech of a first user, translating the original speech of the first user into a translated speech of the first user, receiving an original speech of a second user that is sent by a second terminal, and translating the original speech of the second user into a translated speech of the second user; sending at least one of the original speech of the first user, the translated speech of the first user, and the translated speech of the second user to the second terminal based on a first setting; and playing at least one of the original speech of the second user, the translated speech of the second user, and the translated speech of the first user based on a second setting.

20 Claims, 33 Drawing Sheets

(51) Int. Cl.
*G10L 15/26* (2006.01)
*G10L 21/00* (2013.01)
*G10L 25/93* (2013.01)
*H04M 3/56* (2006.01)
*H04L 51/58* (2022.01)

(52) U.S. Cl.
CPC ............. *H04M 3/568* (2013.01); *G10L 15/26* (2013.01); *G10L 15/28* (2013.01); *G10L 2025/935* (2013.01)

(58) Field of Classification Search
USPC .................................................. 704/277, 7, 2
See application file for complete search history.

(56) References Cited

U.S. PATENT DOCUMENTS

| | | | | |
|---|---|---|---|---|
| 2008/0077390 | A1* | 3/2008 | Nagao | G10L 15/28 |
| | | | | 704/7 |
| 2009/0306957 | A1* | 12/2009 | Gao | G06F 40/58 |
| | | | | 704/2 |
| 2014/0358516 | A1 | 12/2014 | Lin et al. | |
| 2015/0081274 | A1 | 3/2015 | Kawamura et al. | |
| 2015/0095011 | A1 | 4/2015 | Furihata et al. | |
| 2017/0075883 | A1 | 3/2017 | Kamatani | |
| 2018/0039623 | A1 | 2/2018 | Ahn et al. | |

FOREIGN PATENT DOCUMENTS

| | | | |
|---|---|---|---|
| CN | 102903361 | A | 1/2013 |
| CN | 102915174 | A | 2/2013 |
| CN | 103176965 | A | 6/2013 |
| CN | 103810158 | A | 5/2014 |
| CN | 104732975 | A | 6/2015 |
| CN | 104754536 | A | 7/2015 |
| CN | 106464768 | A | 2/2017 |
| CN | 107111613 | A | 8/2017 |
| CN | 107315742 | A | 11/2017 |
| CN | 107343113 | A | 11/2017 |
| CN | 107465816 | A | 12/2017 |
| CN | 107483872 | A | 12/2017 |
| CN | 107885732 | A | 4/2018 |
| CN | 108280067 | A | 7/2018 |
| CN | 108319591 | A | 7/2018 |
| CN | 109286725 | A | 1/2019 |
| KR | 20040028178 | * | 4/2004 |
| KR | 20180107904 | A | 10/2018 |
| WO | 2015183707 | A1 | 12/2015 |
| WO | 2016094598 | A1 | 6/2016 |

* cited by examiner

101

A first terminal collects an original speech of a first user, obtains a translated speech of the first user that is obtained by translating the original speech of the first user, receives an original speech of a second user that is sent by a second terminal, and obtains a translated speech of the second user that is obtained by translating the original speech of the second user

102

The first terminal sends a first translated speech and/or the original speech of the first user to the second terminal based on a first setting

103

The first terminal plays a second translated speech and/or the original speech of the second user based on a second setting

FIG. 14

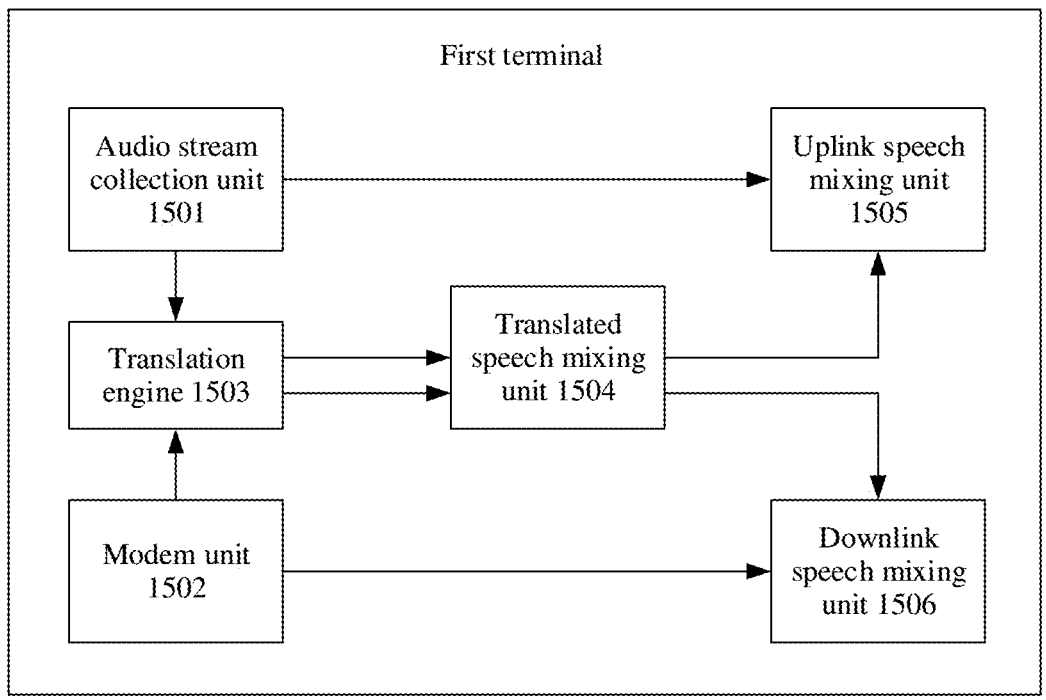

FIG. 15

SPEECH TRANSLATION METHOD AND TERMINAL WHEN TRANSLATED SPEECH OF TWO USERS ARE OBTAINED AT THE SAME TIME

CROSS-REFERENCE TO RELATED APPLICATIONS

This application is a continuation of International Application No. PCT/CN2019/111129, filed on Oct. 15, 2019, which claims priority to Chinese Patent Application No. 201811198370.5, filed on Oct. 15, 2018. The disclosures of the aforementioned applications are hereby incorporated by reference in their entireties.

TECHNICAL FIELD

This application relates to the field of communications technologies, and in particular, to a translation method and a terminal.

BACKGROUND

With continuous development of communications technologies, more people may communicate with each other by using communications terminals. As users become increasingly internationalized, people using different languages in different countries have increasing requirements for communication with communications terminals. However, a language difference brings great inconvenience to a call. A call between Chinese and American users is used as an example. Most Chinese users use Chinese, and most American users use English. Therefore, a language difference is a biggest obstacle to communication between the Chinese and American users.

To enable two parties using different languages to normally communicate with each other, a translation method needs to be proposed to implement conversion between different languages, so as to meet a call requirement of people.

SUMMARY

This application provides an audio processing method and a terminal, so that different audio streams can be flexibly provided for users during communication, and automatic two-way translation can be further implemented during communication.

According to a first aspect, this application provides an audio processing method, applied to a first terminal. The method may include: collecting, by the first terminal, an original speech of a first user, obtaining a translated speech of the first user that is obtained by translating the original speech of the first user, receiving an original speech of a second user that is sent by a second terminal, and obtaining a translated speech of the second user that is obtained by translating the original speech of the second user; sending, by the first terminal, a first translated speech and/or the original speech of the first user to the second terminal based on a first setting; and playing, by the first terminal, a second translated speech and/or the original speech of the second user based on a second setting, where the first translated speech includes the translated speech of the first user and/or the translated speech of the second user; and the second translated speech includes the translated speech of the first user and/or the translated speech of the second user.

In the method in the first aspect, the first user uses the first terminal, and the second user uses the second terminal. The first user uses a first language, and the second user uses a second language. The first language is different from the second language.

According to the method in the first aspect, during communication, the first terminal may play audio or send audio to the second terminal based on a user setting. Therefore, different audio streams can be flexibly provided for two communications parties, so that the two communications parties each can hear expected audio, thereby improving user experience in a call process. In addition, provided that one terminal has a translation capability, automatic two-way translation can be implemented during communication, so that the two parties using different languages can normally communicate with each other.

With reference to the first aspect, the first terminal may continuously collect an input audio stream. The first terminal may collect the input audio stream by using a built-in microphone, or may collect the input audio stream by using an external device of the first terminal. Herein, the external device may be a headset with a microphone, or may be a separate microphone.

In some embodiments, the first terminal has a call mute function. If the first user enables the call mute function of the first terminal, the first terminal temporarily stops collecting the audio stream.

With reference to the first aspect, in some embodiments, the first terminal may perform processing such as noise reduction or echo suppression on the continuously collected audio stream. In this way, the original speech of the first user in the audio stream can be highlighted, impact of a background sound or an environmental sound in the audio stream on the original speech of the first user can be reduced, and subsequent translation quality can be ensured.

With reference to the first aspect, in some embodiments, after collecting the original speech of the first user, the first terminal may obtain the translated speech of the first user in any one of the following manners:

(1) The translated speech of the first user is obtained by the first terminal through local translation.

Optionally, the first terminal may translate the original speech of the first user in the following steps: (a) speech recognition; (b) text correction; (c) translation; and (d) speech synthesis.

(2) The first terminal sends the original speech of the first user to a translation server, and the translation server translates the original speech of the first user into the translated speech of the first user, and then sends the translated speech of the first user to the first terminal.

The translation server is a server (for example, a Google translation server or a Microsoft translation server) that has a translation function. A process in which the translation server translates the original speech of the first user is the same as a process in which the first terminal translates the original speech of the first user. For details, refer to the related descriptions. In some embodiments, the translation server has a requirement on a format of the input audio stream. Therefore, the first terminal may perform processing such as coding or resampling on the collected audio stream, to obtain an audio stream that meets the format requirement, and then send the audio stream to the translation server. In some embodiments, a translated speech returned by the translation server to the first terminal may be compressed. Therefore, after receiving the translated speech of the first user, the first terminal may perform processing such as decoding or resampling on the translated speech of the first user.

With reference to the first aspect, the second terminal may also continuously collect the original speech of the second user, and send the original speech of the second user to the first terminal. A process in which the second terminal collects the original speech of the second user is the same as a process in which the first terminal collects the original speech of the first user. For details, refer to the related descriptions.

With reference to the first aspect, after receiving the original speech of the second user, the first terminal may obtain the translated speech of the second user that is obtained by translating the original speech of the second user. Similar to the translated speech of the first user, the translated speech of the second user may be obtained by the first terminal through local translation. Alternatively, the translation server translates the original speech of the second user into the translated speech of the second user, and then sends the translated speech of the second user to the first terminal. For details, refer to the foregoing related descriptions.

With reference to the first aspect, in some embodiments, the first setting reflects a call mode of the second terminal. The call mode of the second terminal indicates whether the second user can hear the original speech of the first user, the translated speech of the first user, the translated speech of the second user, and the like. Herein, the call mode of the second terminal may be set by the first user on the first terminal, or may be set by the first terminal by default.

The first terminal may determine specific content of the first translated speech based on the first setting.

With reference to the first aspect, in some embodiments, when the first terminal obtains the translated speech of the first user and the translated speech of the second user at the same time, and the first translated speech includes the translated speech of the first user and the translated speech of the second user, the first translated speech is specifically a first mixed speech obtained after the first terminal splices or overlaps the translated speech of the first user and the translated speech of the second user.

The first terminal may determine, based on the first setting, specific content of audio to be sent to the second terminal.

With reference to the first aspect, in some embodiments, when the first terminal obtains the first translated speech and the original speech of the first user at the same time, and the first setting includes: sending the first translated speech and the original speech of the first user, the sending, by the first terminal, a first translated speech and/or the original speech of the first user to the second terminal based on a first setting includes: sending, by the first terminal to the second terminal, a second mixed speech obtained after the first translated speech and the original speech of the first user are spliced or overlapped.

With reference to the first aspect, in some embodiments, the second setting reflects a call mode of the first terminal. The call mode of the first terminal indicates whether the first user can hear the original speech of the second user, the translated speech of the second user, the translated speech of the first user, and the like. Herein, the call mode of the first terminal may be set by the first user on the first terminal, or may be set by the first terminal by default.

The first terminal may determine specific content of the second translated speech based on the second setting.

With reference to the first aspect, in some embodiments, when the first terminal obtains the translated speech of the first user and the translated speech of the second user at the same time, and the second translated speech includes the translated speech of the first user and the translated speech of the second user, the second translated speech is specifically the first mixed speech obtained after the first terminal splices or overlaps the translated speech of the first user and the translated speech of the second user.

The first terminal may determine specific content of to-be-played audio based on the second setting.

With reference to the first aspect, in some embodiments, when the first terminal obtains the second translated speech and the original speech of the second user at the same time, and the second setting includes: playing the second translated speech and the original speech of the second user, the playing, by the first terminal, a second translated speech and/or the original speech of the second user based on a second setting includes: playing, by the first terminal, a third mixed speech obtained after the second translated speech and the original speech of the second user are spliced or overlapped, and playing the third mixed speech.

In some embodiments, the first terminal has a playing mute function. If the first user enables the playing mute function of the first terminal, the first terminal no longer plays audio, or the first terminal continuously plays audio, but volume of playing the audio is 0.

According to a second aspect, this application provides a first terminal. The first terminal may include an audio stream collection unit, a modem unit, a translation engine, a translated speech mixing unit, an uplink speech mixing unit, and a downlink speech mixing unit. The audio stream collection unit is connected to the translation engine and the uplink speech mixing unit, the modem unit is connected to the translation engine and the downlink speech mixing unit, and the translated speech mixing unit is connected to the translation engine, the uplink speech mixing unit, and the downlink speech mixing unit.

The audio stream collection unit is configured to collect an original speech of a first user.

The modem unit is configured to demodulate an original speech of a second user, where the original speech of the second user is sent by a second terminal to the first terminal.

The translation engine is configured to translate the original speech of the first user into a translated speech of the first user; and is further configured to translate the original speech of the second user into a translated speech of the second user.

The translated speech mixing unit is configured to receive the translated speech of the first user and/or the translated speech of the second user that are/is output by the translation engine; and is further configured to: send a first translated speech to the uplink speech mixing unit based on a first setting, and send a second translated speech to the downlink speech mixing unit based on a second setting, where the first translated speech includes the translated speech of the first user and/or the translated speech of the second user; and the second translated speech includes the translated speech of the first user and/or the translated speech of the second user.

The uplink speech mixing unit is configured to output the first translated speech and/or the original speech of the first user based on the first setting.

The downlink speech mixing unit is configured to output the second translated speech and/or the original speech of the second user based on the second setting.

With reference to the second aspect, the audio stream collection unit may continuously collect an input audio stream. In some embodiments, the audio stream collection unit may be a separate microphone.

With reference to the second aspect, in some embodiments, the modem unit may be a modem.

With reference to the second aspect, in some embodiments, the translation engine may locally perform a translation operation on the first terminal, or may send an original speech to a translation server, and receive a translated speech obtained after the translation server translates the original speech.

For the first setting and the second setting, refer to the related descriptions in the first aspect.

Specific content of the first translated speech is the same as that of the first translated speech in the first aspect, and specific content of the second translated speech is the same as that of the second translated speech in the first aspect. For details, refer to the related descriptions.

With reference to the second aspect, in some embodiments, when the translated speech mixing unit obtains the translated speech of the first user and the translated speech of the second user at the same time, and the first translated speech includes the translated speech of the first user and the translated speech of the second user based on the first setting, the translated speech mixing unit is specifically configured to: splice or overlap the translated speech of the first user and the translated speech of the second user to obtain a first mixed speech, and send the first mixed speech to the uplink speech mixing unit.

With reference to the second aspect, in some embodiments, when the translated speech mixing unit obtains the translated speech of the first user and the translated speech of the second user at the same time, and the second translated speech includes the translated speech of the first user and the translated speech of the second user based on the second setting, the translated speech mixing unit is specifically configured to: splice or overlap the translated speech of the first user and the translated speech of the second user to obtain the first mixed speech, and send the first mixed speech to the downlink speech mixing unit.

With reference to the second aspect, in some embodiments, when the uplink speech mixing unit obtains the first translated speech and the original speech of the first user at the same time, and the first setting includes: sending the first translated speech and the original speech of the first user, that the uplink speech mixing unit is configured to output the first translated speech and/or the original speech of the first user based on the first setting includes: the uplink speech mixing unit is configured to: splice or overlap the first translated speech and the original speech of the first user to obtain a second mixed speech, and output the second mixed speech.

With reference to the second aspect, in some embodiments, when the downlink speech mixing unit obtains the second translated speech and the original speech of the second user at the same time, and the second setting includes: playing the second translated speech and the original speech of the second user, that the downlink speech mixing unit is configured to output the second translated speech and/or the original speech of the second user based on the second setting includes: the downlink speech mixing unit is configured to: splice or overlap the second translated speech and the original speech of the second user to obtain a third mixed speech, and output the third mixed speech.

With reference to the second aspect, in some embodiments, the first terminal may further include an uplink channel and a playing device. The uplink channel is connected to the uplink speech mixing unit, and the playing device is connected to the downlink speech mixing unit. The uplink channel is configured to send, to the second terminal, the first translated speech and/or the original speech of the first user that are/is output by the uplink speech mixing unit; and the playing device is configured to play the second translated speech and/or the original speech of the second user that are/is output by the downlink speech mixing unit. The uplink channel may be implemented as an antenna, a mobile communications module, a wireless communications module, or the like. The playing device may include a speaker, an earpiece, a headset, and the like.

With reference to the second aspect, in some embodiments, the first terminal may further include a display unit. The display unit is configured to display an original text of the first user, a translated text of the first user, an original text of the second user, and a translated text of the second user.

With reference to the second aspect, in some embodiments, the first terminal may further include a sound effect processing unit, configured to perform processing such as noise reduction or echo suppression on the continuously collected audio stream.

With reference to the second aspect, in some embodiments, the first terminal may further include a mute control unit, configured to: enable/disable a call mute function of the first terminal based on a user operation.

With reference to the second aspect, in some embodiments, the first terminal may further include a playing device selection unit, configured to select a device that is in the first terminal and that is configured to play audio that is output by the downlink speech mixing unit.

According to a third aspect, this application provides a first terminal, including one or more processors and one or more memories. The one or more memories are coupled to the one or more processors, and the one or more memories are configured to store computer program code. The computer program code includes a computer instruction, and when the one or more processors execute the computer instruction, the terminal performs the audio processing method according to the first aspect.

According to a fourth aspect, this application provides a computer storage medium, including a computer instruction. When the computer instruction is run on a terminal, the terminal is enabled to perform the audio processing method according to the first aspect.

According to a fifth aspect, this application provides a computer program product. When the computer program product is run on a computer, the computer is enabled to perform the audio processing method according to the first aspect.

According to this application, during communication, the first terminal may play audio or send audio to the second terminal based on a user setting. Therefore, different audio streams can be flexibly provided for two communications parties, so that the two communications parties each can hear expected audio, thereby improving user experience in a call process. In addition, provided that one terminal has a translation capability, automatic two-way translation can be implemented during communication, so that the two parties using different languages can normally communicate with each other.

BRIEF DESCRIPTION OF THE DRAWINGS

To describe the technical solutions in the embodiments of this application or in the background more clearly, the following describes the accompanying drawings required for describing the embodiments of this application or the background.

FIG. 6D-1 and FIG. 6D-2 are a schematic flowchart of processing a translated speech of a user 1 and a translated speech of a user 2 by a terminal 100 according to this application;

FIG. 14 is a schematic flowchart of an audio processing method according to this application; and FIG. 15 is a schematic structural diagram of a first terminal according to this application.

DETAILED DESCRIPTION OF ILLUSTRATIVE EMBODIMENTS

The following describes the technical solutions in the embodiments of this application with reference to the accompanying drawings in the embodiments of this application.

In descriptions in the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

Figure 1:
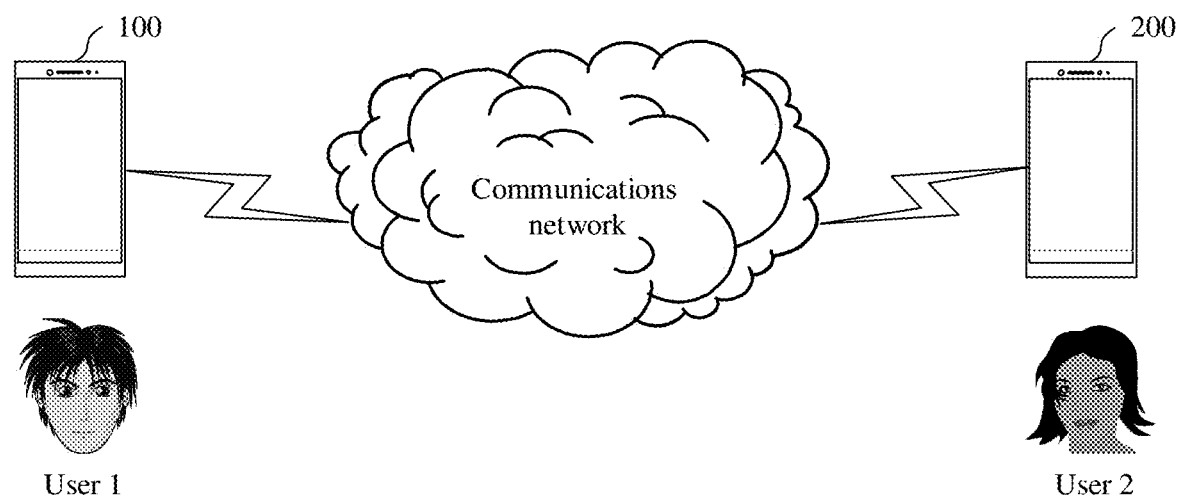
FIG. 1 is a schematic diagram of a scenario in which users communicate with each other.

A translation method provided in this application may be applied to a scenario shown in FIG. 1. Two users (a user 1 and a user 2) communicate with each other by using terminals (a terminal 100 and a terminal 200). The two users use different languages, and the terminals are interconnected based on a communications network. The translation method in this application is applied to two-way translation. To be specific, a language of each of two communications parties may be translated into a language of the other communications party, so that the two communications parties can normally communicate with each other. Herein, for clear description, FIG. 1 shows only a scenario in which two users communicate with each other. In a specific implementation, in addition to the scenario in which the two users communicate with each other, this application may be further applied to a scenario in which a plurality of users communicate with each other by using terminals.

The communications network may be a local area network, or may be a wide area network connected by using a relay device. When the communications network is the wide area network, for example, the communications network may be a 2nd generation mobile communications technology (2G) network (for example, a global system for mobile communications (GSM)), a 3rd generation mobile communications technology (3G) network, a 4th generation mobile communications technology (4G) network, a 5th generation mobile communications technology (5G) network, a future evolved public land mobile network (PLMN), or the internet. When the communications network is the local area network, for example, the communications network may be a short-distance communications network such as a Wi-Fi hotspot network, a Wi-Fi direct network, a Bluetooth network, a ZigBee network, or a near field communication (NFC) network. In the scenario shown in FIG. 1, a communication connection between the terminal 100 and the terminal 200 may be initiated by either party and established after the initiation is accepted by the other party, and may be further terminated by either party. The terminal 100 and the terminal 200 may communicate with each other through a communications network, for example, make a voice call, a text call, or a video call.

In the scenario shown in FIG. 1, the user 1 and the user 2 use different languages. For example, the user 1 may use Chinese, and the user 2 may use English, French, Russian, Spanish, or the like. An example in which the user 1 uses Chinese and the user 2 uses English is used in the following embodiments to describe the translation method provided in this application.

In the scenario shown in FIG. 1, the terminal 100 has a translation capability, and the terminal 200 may have or may not have a translation capability. That the terminal has a translation capability means that the terminal can locally translate one language into another language, or the terminal can send, through a network, one language to a server (for example, a Google translation server or a Microsoft translation server) having a translation function, and the server translates the language into another language, and then sends the another language to the terminal. The translating one language into another language may include: translating a language used by a local user into a language used by a peer user, and translating the language used by the peer user into the language used by the local user.

In some embodiments, when the terminal does not have a local translation capability and cannot connect to a translation server through a network (for example, the terminal is a non-smart phone or a fixed-line phone that cannot access a network, or the terminal cannot be located in an area without a network), the terminal does not have a translation capability. Herein, the translating one language into another language may include: translating a speech in one language into a speech in another language, or translating a text in one language into a text in another language, or translating a speech in one language into a text in another language, or translating a text in one language into a speech in another language.

In this application, in a plurality of interconnected terminals, if one of the plurality of terminals has a translation capability or uses a translation capability, users that use the plurality of terminals can normally communicate with each other. When one terminal has a translation capability, the plurality of interconnected terminals uses the translation capability of the terminal to perform communication. When a plurality of terminals has a translation capability, the plurality of terminals may negotiate with each other to determine to use a translation capability of a specific terminal to perform communication.

The following describes, with reference to the accompanying drawings and an actual application scenario based on the scenario shown in FIG. 1, the translation method provided in this application.

Application scenario 1: The user 1 and the user 2 make a voice call by using terminals, the user 1 uses Chinese, the user 2 uses English, and the two parties use the translation capability of the terminal 100 to implement automatic two-way translation. The user 1 uses the terminal 100, and the user 2 uses the terminal 200. For ease of understanding, an example in which speeches obtained during a call between the user 1 and the user 2 are converted into texts and the texts are displayed in interfaces of respective terminals in the application scenario 1 is used below for description. In some embodiments, the terminal 100 and/or the terminal 200 have/has a capability of converting a speech into a corresponding text, for example, converting a Chinese speech into a Chinese text, or converting an English speech into an English text. Herein, that the terminal has a capability of converting a speech into a corresponding text means that the terminal can convert a speech into a text based on a function of the terminal, or the terminal can send, through a network, a speech to a server that has a conversion capability, and the server converts the speech into a text and then sends the text to the terminal.

Figure 2A:
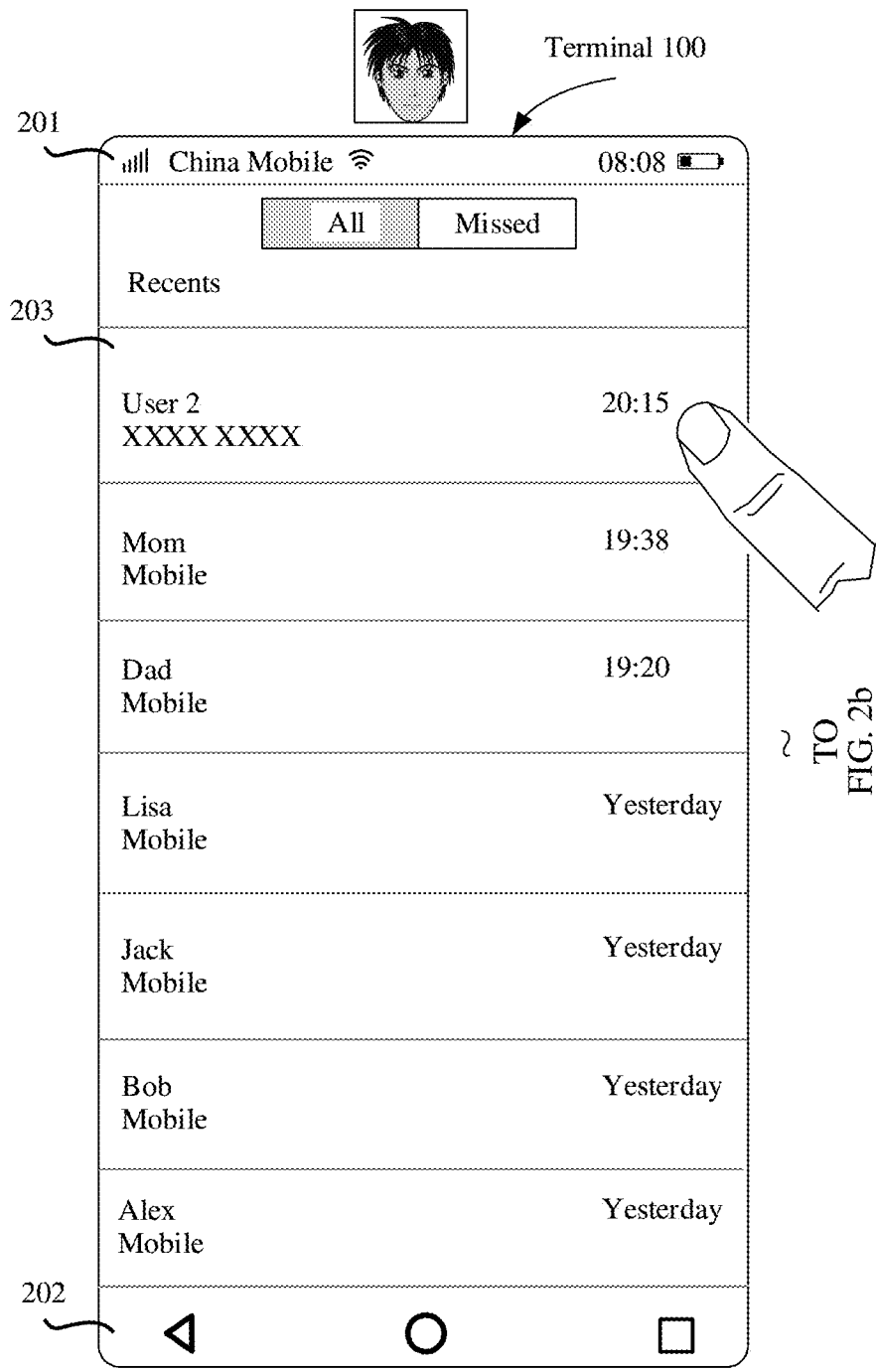
FIG. 2a to FIG. 2d to FIG. 5a to FIG. 5d are schematic diagrams of human-computer interaction according to this application.

Before the user 1 and the user 2 make a voice call, a communication connection needs to be established between the terminal 100 and the terminal 200. For example, FIG. 2a shows a last call record interface 10 displayed on a display of the terminal wo. The interface may include a status bar 201, a collapsible navigation bar 202, and a plurality of contact options such as "User 2" 203. The status bar 201 may include an operator name (for example, China Mobile), time, a Wi-Fi icon, signal strength, and a current battery level. The navigation bar 202 may include a back (back) button, a home (home) button, a multitasking button, and the like. In addition, it may be understood that in some other embodiments, the status bar 201 may further include a Bluetooth icon, an alarm clock icon, an external device icon, and the like.

Figure 2B:
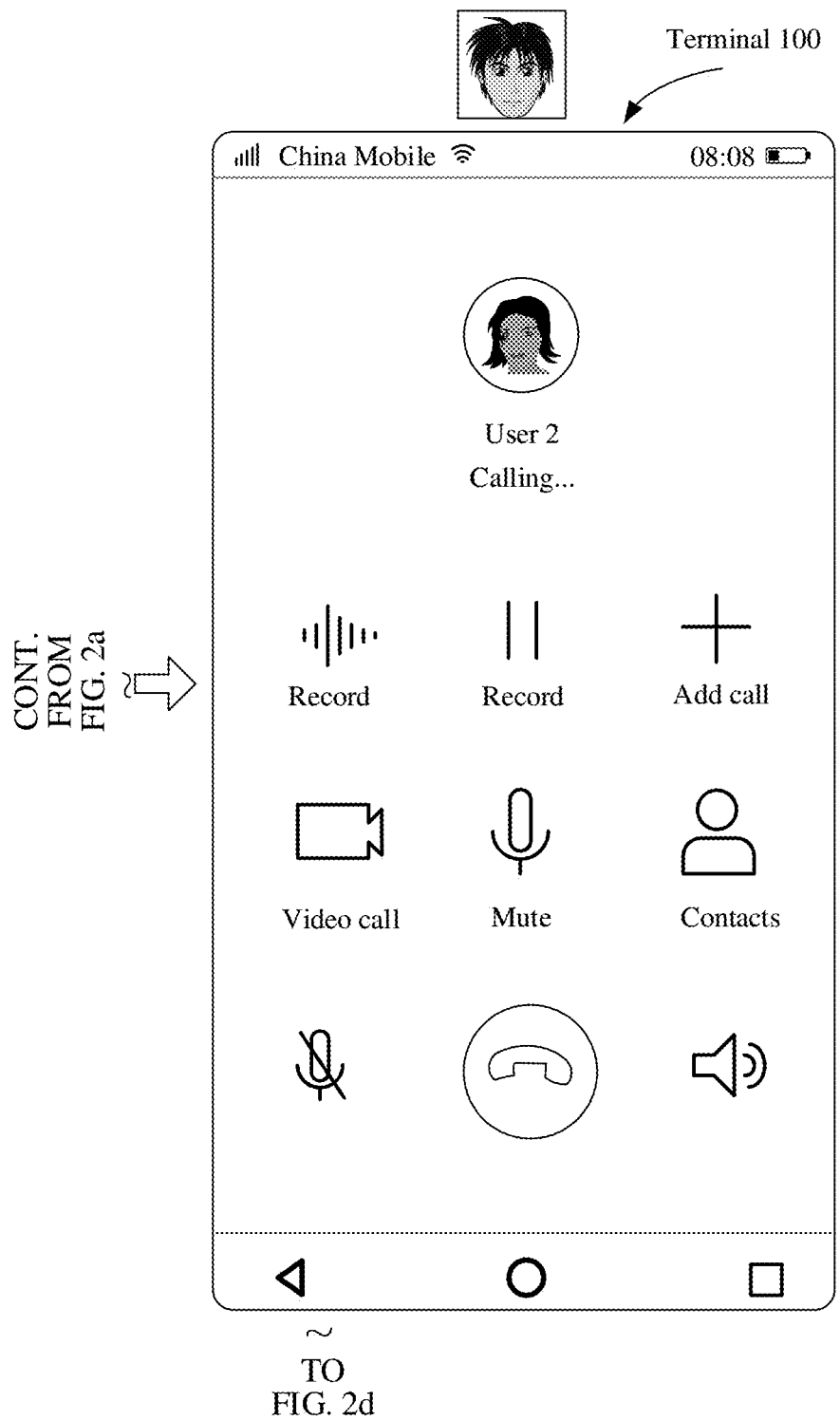
Figure 2C:
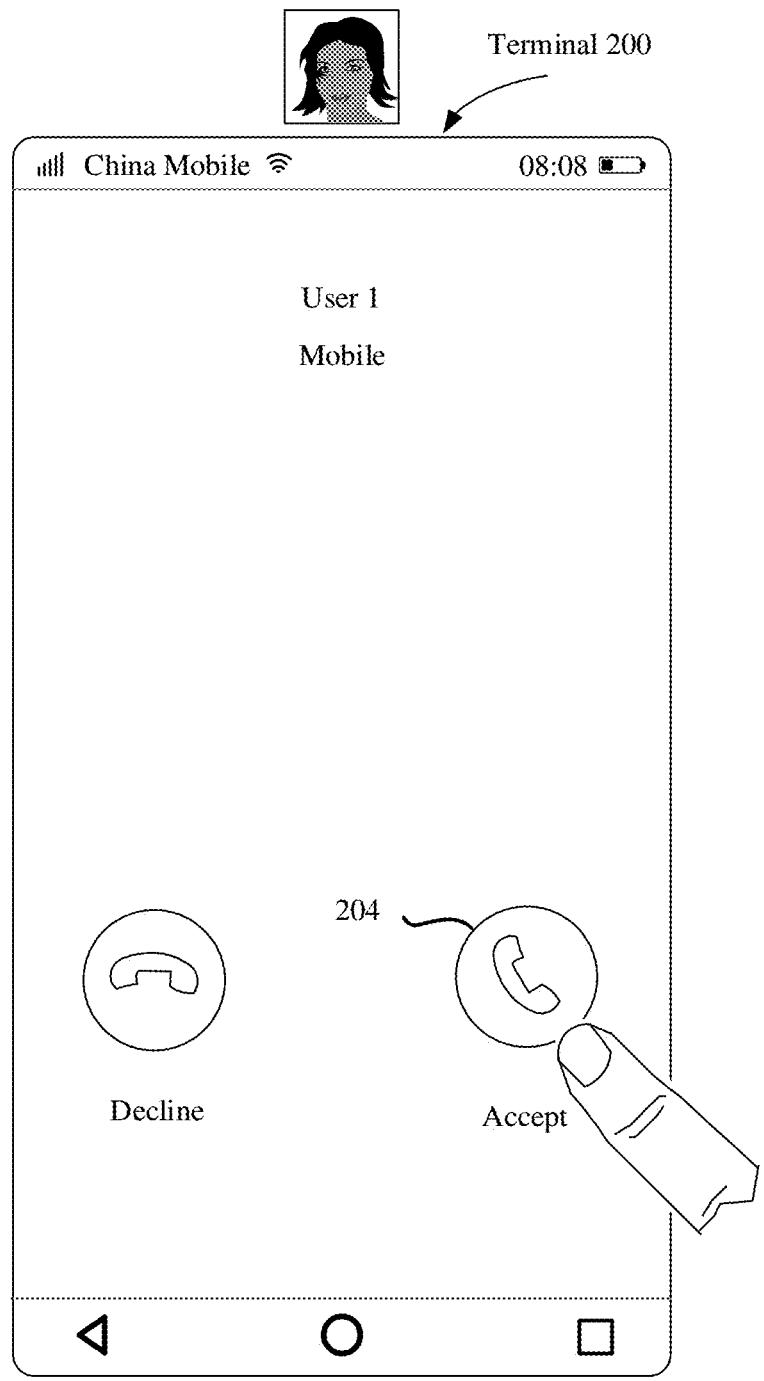

For example, FIG. 2a and FIG. 2b show a scenario in which the terminal 100 and the terminal 200 establish a communication connection. As shown in the figure, the terminal wo displays, in response to a tap operation performed by the user 1 on "User 2" 203 in the last call record interface shown in FIG. 2a, a voice call interface shown in FIG. 2b. In this case, the terminal wo requests to establish a communication connection to the terminal 200. Correspondingly, referring to FIG. 2c, after receiving a communication connection request of the terminal wo, the terminal 200 displays an interface shown in FIG. 2c. After the user 2 inputs an operation (for example, a tap operation) on "Accept" option 204 in the interface shown in FIG. 2c, the terminal wo and the terminal 200 establish the communication connection.

Herein, other than a manner of establishing a connection by making a voice call through a GSM network, the terminal wo may alternatively request, in another manner, to establish a communication connection to the terminal 200, for example, may request, by using an instant messaging application (for example, FaceTime, Skype, or WeChat (WeChat)), to make a voice call to the terminal 200. There is no limitation that the terminal wo initiates a request for establishing a communication connection. Alternatively, the terminal 200 may initiate a request for establishing a communication connection.

Figure 2D:
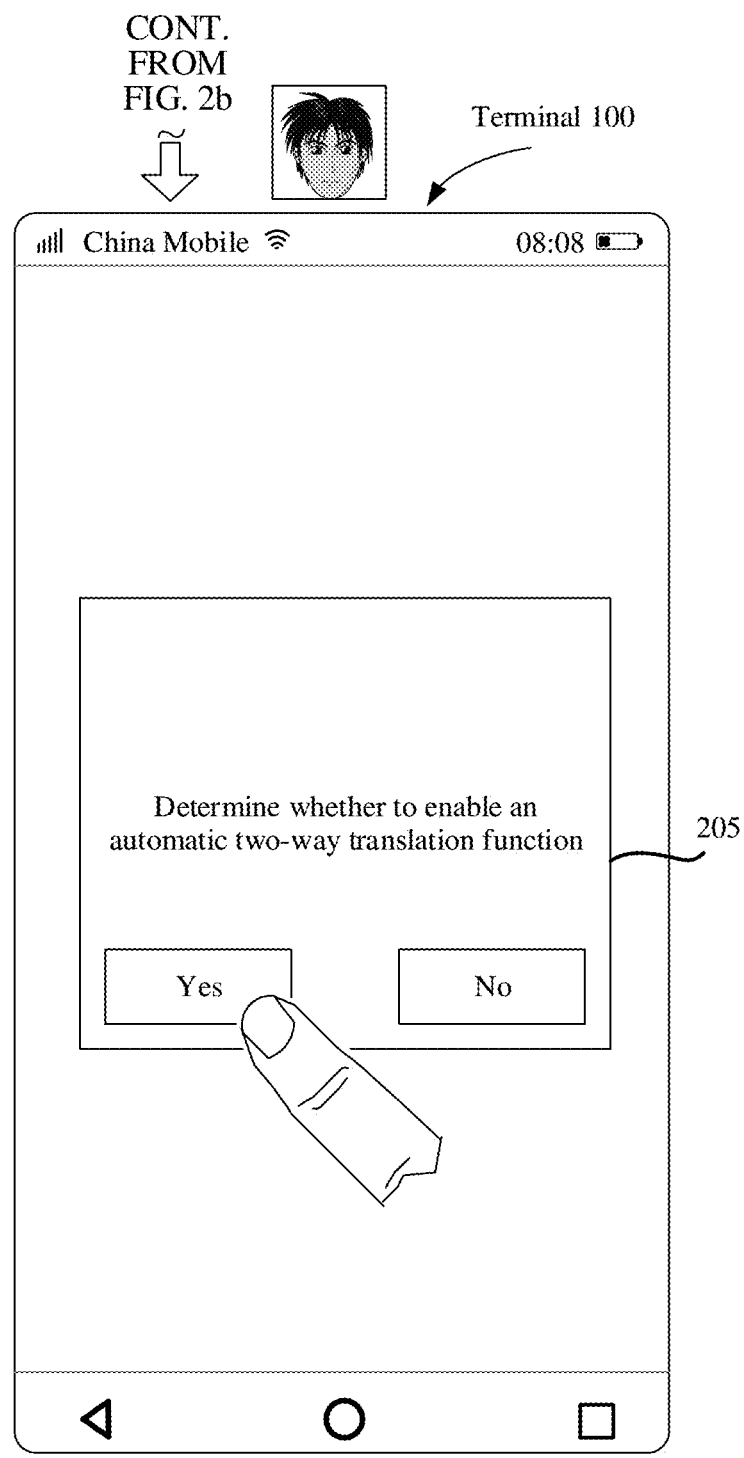

In some embodiments, for example, referring to FIG. 2d, after the terminal 100 establishes the communication connection to the terminal 200, the terminal 100 may output prompt information 205 to the user 1, to ask the user 1 whether to enable an automatic two-way translation function. For example, the terminal 100 enables the automatic two-way translation function in response to a tap operation performed by the user 1 on an option "Yes" in the prompt information 205. Herein, in the automatic two-way translation function for a speech, the two-way translation means that in a process of a voice call between the user 1 and the user 2, the terminal 100 translates a Chinese speech from the user 1 into an English speech or an English text, and translates an English speech from the user 2 into a Chinese speech or a Chinese text.

It may be understood that in another embodiment, the terminal 100 may enable the automatic two-way translation function by default after establishing the communication connection to the terminal 200.

Figure 3A:
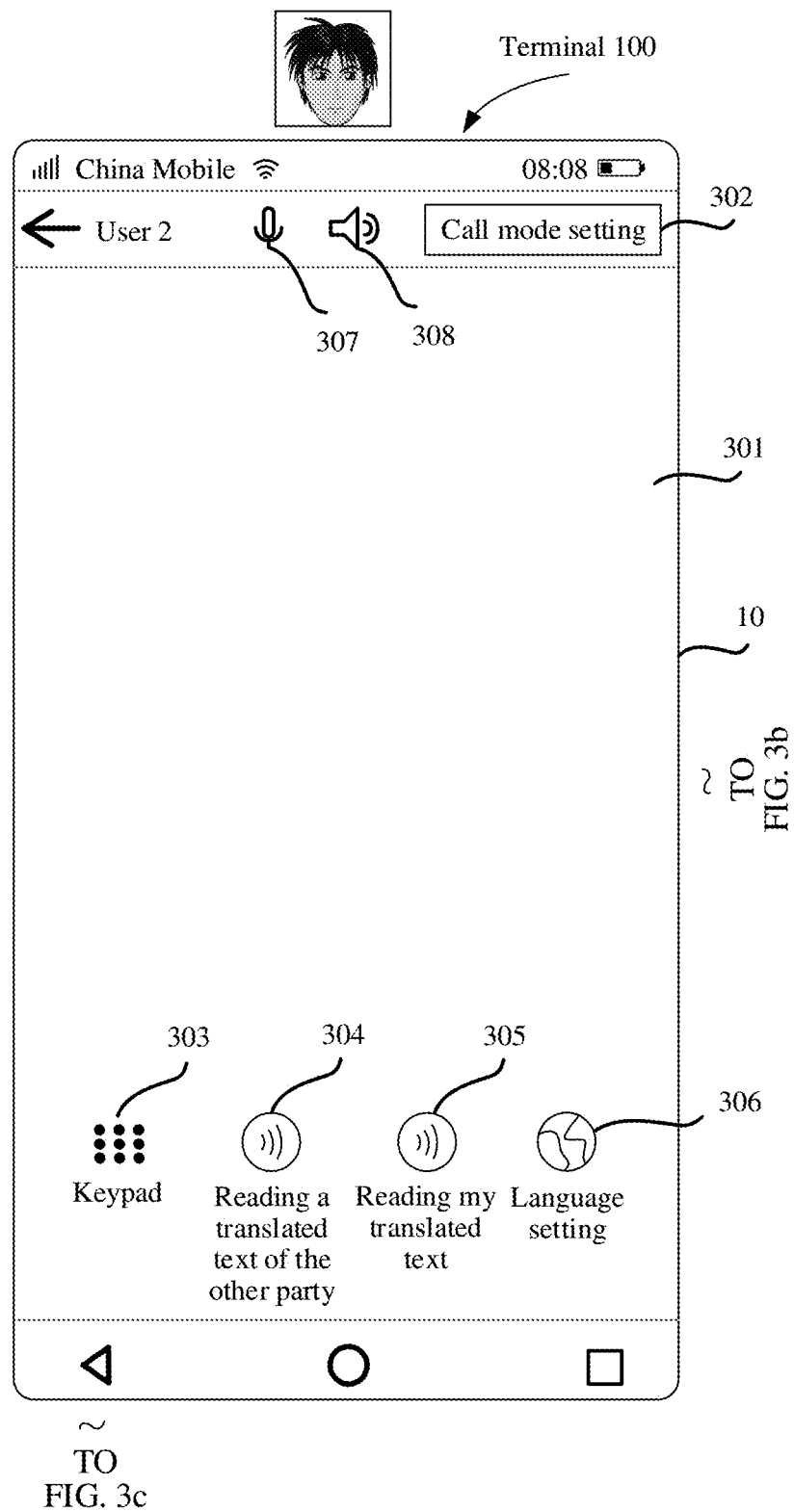

For example, after the terminal 100 establishes the communication connection to the terminal 200, and enables the automatic two-way translation function, the terminal 100 may display a call interface 10 shown in FIG. 3a.

In some embodiments, the call interface 10 may include a display area 301 used to display a text corresponding to the voice call between the user 1 and the user 2.

Figure 3B:
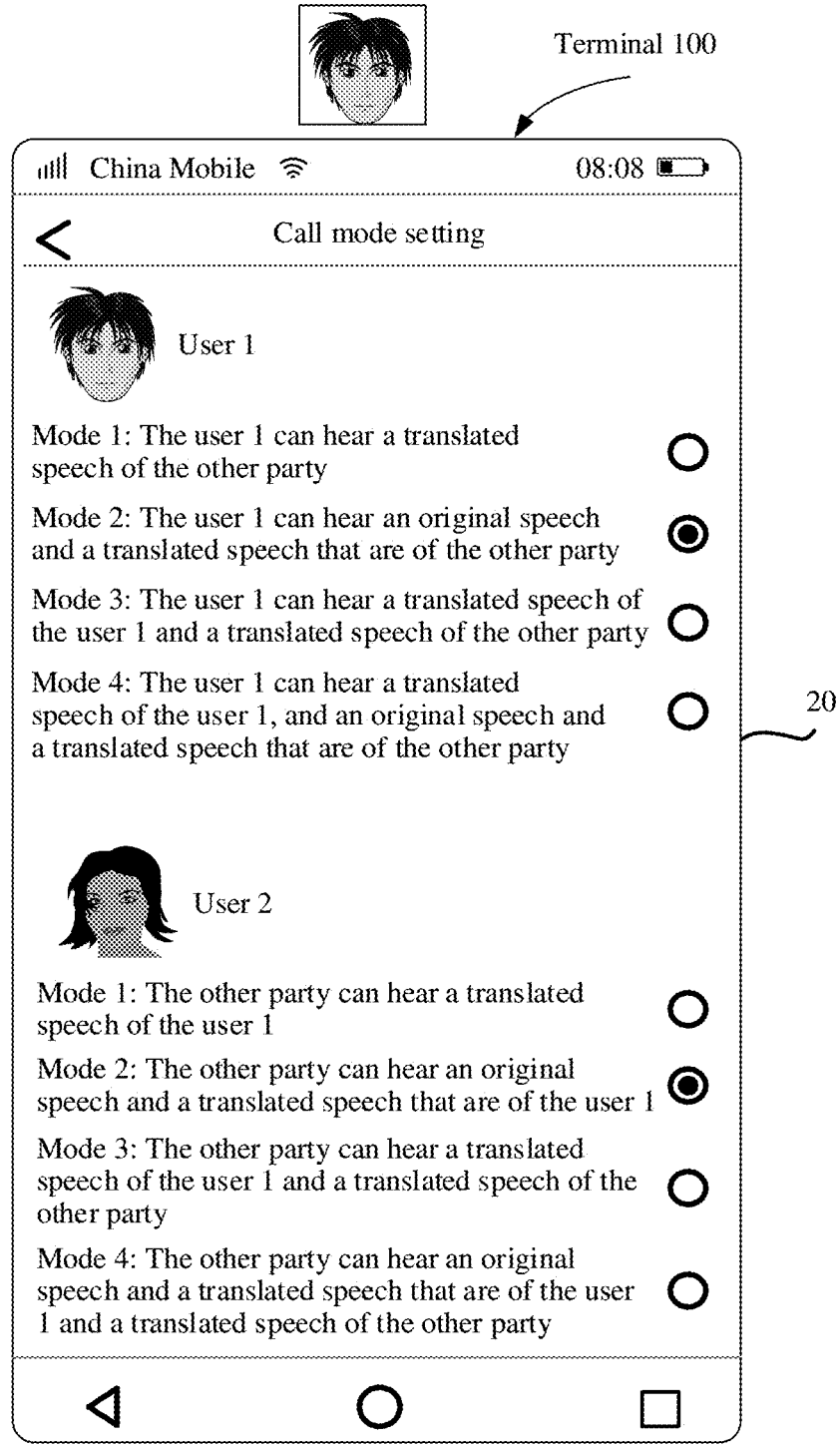

In some embodiments, the call interface 10 may further include a setting option "Call mode setting" 302 of a call mode. For example, referring to FIG. 3b, when the terminal 100 detects an operation (for example, a tap operation) performed by the user on "Call mode setting" 302, the terminal 100 displays a setting interface 20 shown in FIG. 3b. The setting interface 20 may include a plurality of call mode options corresponding to each of the two parties. The user 1 can set a call mode corresponding to each of the two parties. In this application, an original audio stream of the user 1 or the user 2 may be referred to as an original speech, and a translated audio stream may be referred to as a translated speech. A text corresponding to the translated speech of the user 1 or the user 2 may be referred to as a translated text. In this application, for the terminal 100, an original speech of the user 1 may be referred to as an uplink original speech, a translated speech of the user 1 may be referred to as an uplink translated speech, an original speech of the user 2 may be referred to as a downlink original speech, and a translated speech of the user 2 may be referred to as a downlink translated speech.

For example, optional call modes of the user 1 may include four call modes in Table 1. It may be understood that the call mode of the user 1 is a call mode of the terminal 100.

TABLE 1

| Call mode of a user 1 | Call effect |
| --- | --- |
| Call mode 1 | The user 1 can hear a translated speech of a user 2 |
| Call mode 2 | The user 1 can hear an original speech and a translated speech that are of a user 2 |
| Call mode 3 | The user 1 can hear a translated speech of the user 1 and a translated speech of a user 2 |
| Call mode 4 | The user 1 can hear a translated speech of the user 1, and an original speech and a translated speech that are of a user 2 |

In addition to the call modes listed in Table 1, in a specific implementation, the terminal 100 may further provide more call modes. For example, the user 1 can hear only the original speech of the user 2 and the translated speech of the user 1.

The user 1 may select any one of the foregoing call modes for the user 1 based on an actual requirement of the user 1. When the user 1 selects the mode 1 for the user 1, the user 1 communicates with the user 2 in a pure native language, and may talk with the user 2 in a natural communication manner. When the user 1 selects the mode 2 for the user 1, the user 1 may determine a tone of the other party based on the original speech of the other party, and learn of an intention of the other party based on the translated speech of the other party. When the user 1 selects the mode 3 for the user 1, the user 1 can hear the translated speech of the user 1. If the user 1 has basic knowledge of English, the user 1 may determine accuracy of the translated speech. If the accuracy of the translated speech is relatively low, the user 1 may re-send an original speech or notify the user 2 that the translated speech is inaccurate, to avoid misunderstanding of the user 2. When the user 1 selects the mode 4 for the user 1, the user 1 may determine accuracy of the translated speech of the user 1, and may further determine a tone of the user 2.

For the terminal 100, in the call mode 1 in Table 1, the terminal 100 plays the translated speech of the user 2. In the call mode 2, the terminal 100 plays the original speech and the translated speech that are of the user 2. In the call mode 3, the terminal 100 plays the translated speech of the user 1 and the translated speech of the user 2. In the call mode 4, the terminal 100 plays the translated speech of the user 1, and the original speech and the translated speech that are of the user 2.

Similarly, optional call modes of the user 2 may include four call modes in Table 2. The call mode of the user 2 is a call mode of the terminal 200.

TABLE 2

| Call mode of a user 2 | Call effect |
| --- | --- |
| Call mode 1 | The user 2 can hear a translated speech of a user 1 |
| Call mode 2 | The user 2 can hear an original speech and a translated speech that are of a user 1 |
| Call mode 3 | The user 2 can hear a translated speech of the user 2 and a translated speech of a user 1 |
| Call mode 4 | The user 2 can hear a translated speech of the user 2, and an original speech and a translated speech that are of a user 1 |

In addition to the call modes listed in Table 2, in a specific implementation, the terminal 100 may further provide more call modes. For example, the user 2 can hear only the original speech of the user 2 and the translated speech of the user 2.

The user 1 may select any one of the foregoing call modes for the user 2 based on an actual requirement. When the user 1 selects the mode 1 for the user 2, the user 2 communicates with the user 1 in a pure native language, and the user 2 may talk with the user 1 in a natural communication manner. When the user 1 selects the mode 2 for the user 2, the user 2 may determine a tone of the other party based on the original speech of the user 1, and learn of an intention of the other party based on the translated speech of the user 1. When the user 1 selects the mode 3 for the user 2, the user 2 can hear the translated speech of the user 2. If the user 2 has basic knowledge of Chinese, the user 2 may determine accuracy of the translated speech. If the accuracy of the translated speech is relatively low, the user 2 may re-send an original speech or notify the user 1 that the translated speech is inaccurate, to avoid misunderstanding of the user 1. When the user 1 selects the mode 4 for the user 2, the user 2 may determine accuracy of the translated speech of the user 2, and may further determine a tone of the user 1.

For the terminal 100, in the call mode 1 in Table 2, the terminal 100 sends the translated speech of the user 1 to the terminal 200. In the call mode 2, the terminal 100 sends the original speech and the translated speech that are of the user 1 to the terminal 200. In the call mode 3, the terminal 100 sends the translated speech of the user 1 and the translated speech of the user 2 to the terminal 200. In the call mode 4, the terminal 100 sends the translated speech of the user 2, and the original speech and the translated speech that are of the user 1 to the terminal 200.

It may be understood that in some embodiments, the call modes of the two communications parties may alternatively be set by the terminal 100 by default. For example, the terminal 100 may select the call mode 1 in Table 1 for the user 1 and select the call mode 1 in Table 2 for the user 2 by default.

Figure 3C:
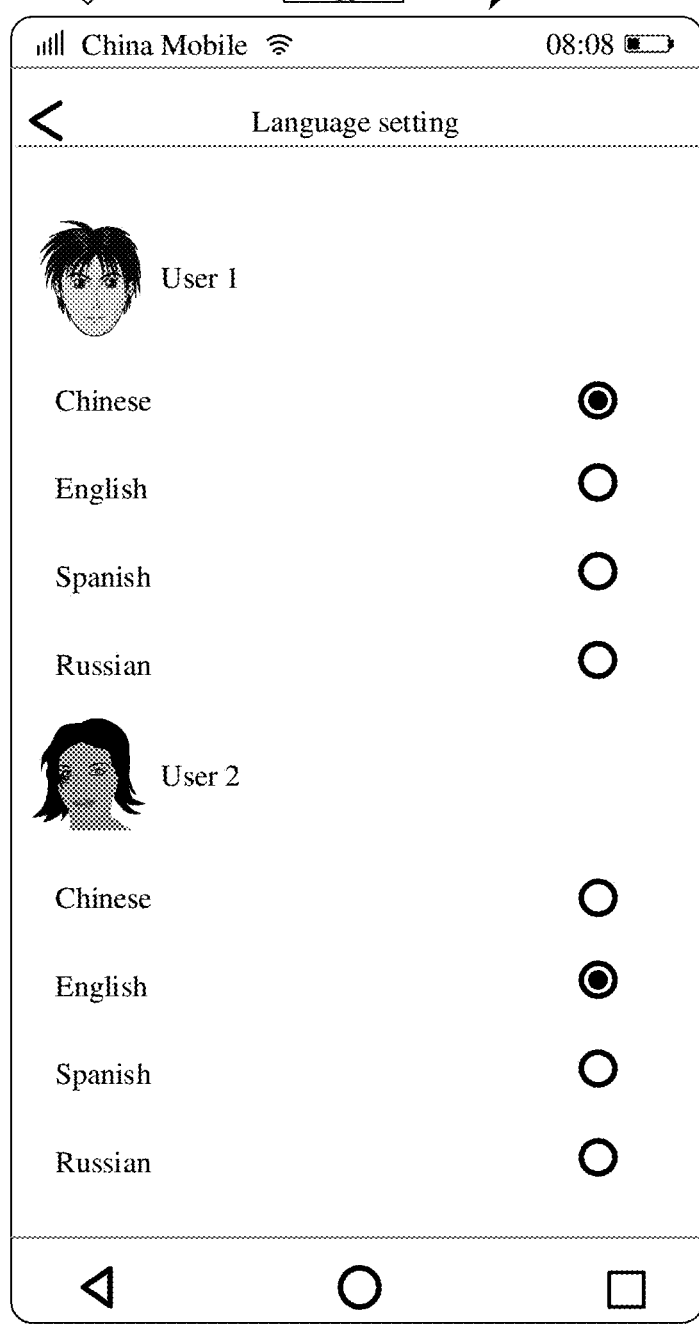

In some embodiments, the call interface 10 may include a language setting option "Language setting" 306. For example, referring to FIG. 3c, when the terminal 100 detects an operation (for example, a tap operation) performed by the user on "Language setting" 306, the terminal 100 displays a setting interface 30 shown in FIG. 3c. The setting interface 30 may include a plurality of language options (for example, Chinese, English, and Spanish) corresponding to each of the two communications parties. The user 1 may select languages to be used by the user 1 and the other party from the plurality of language options.

It may be understood that when learning of a native language of the user 2, the user 1 may select a corresponding language for the user 2 in the setting interface 30. After the user 1 selects corresponding languages for the user 1 and the user 2, the terminal 100 may translate speeches of the two parties based on the selected languages in a subsequent translation process. For example, if the user 1 uses Chinese, and the user 2 uses English, the terminal 100 translates the language of the user 1 into English and translates the language of the user 2 into Chinese locally or by using a translation server. In some embodiments, if the user 1 does not know a native language of the user 2, the terminal 100 may identify, after receiving an original speech of the user 2, the language used by the user 2.

In some embodiments, the call interface 10 may include an option "Keyboard" 303. The terminal 100 may display the keyboard in response to a tap operation performed by the user 1 on "Keyboard" 303, so that the user 1 dials a phone number of another user, to establish a communication connection to a terminal of the another user. Herein, when dialing the phone number of the another user, the user 1 may request, after terminating the communication connection to the user 2, to establish a communication connection to the another user, or may request, while maintaining the communication connection to the user 2, to establish a communication connection to the another user, that is, implement a multiparty call.

In some embodiments, the call interface 10 may include an option "Reading a translated text of the other party" 304. The terminal 100 may enable a function of "Reading a translated text of the other party" in response to a tap operation performed by the user 1 on "Reading a translated text of the other party" 304. After the terminal 100 enables the function of "Reading a translated text of the other party", when the terminal 100 obtains the translated text of the user 2, the terminal 100 reads the translated text. When reading the translated text, the terminal 100 first synthesizes the translated text into a speech, and then plays the speech.

In some embodiments, the call interface 10 may include an option "Reading my translated text" 305. The terminal 100 may enable a function of "Reading my translated text" in response to a tap operation performed by the user 1 on "Reading my translated text" 305. After the terminal 100 enables the function of "Reading my translated text", when the terminal 100 obtains the translated text of the user 1, the terminal 100 reads the translated text.

In the terminal 100, the function of "Reading a translated text of the other party", the function of "Reading my translated text", and the call mode of the user 1 may be parallel and do not affect each other.

After the terminal 100 establishes the communication connection to the terminal 200, the user 1 and the user 2 may talk with each other. The following describes a translation process in the application scenario 1 by using a specific call example.

In some embodiments, after the terminal 100 establishes the communication connection to the terminal 200, the terminal 100 continuously collects an input audio stream until the communication connection between the terminal 100 and the terminal 200 is broken. Herein, the terminal 100 may collect, by using a built-in microphone, an audio stream that is input by the user 1, or may collect, by using an external device of the terminal 100, an audio stream that is input by the user 1. Herein, the external device may be a headset with a microphone, or may be a separate microphone. The audio stream collected by the terminal 100 may include at least one of the following: a speech that is input by the user 1, a background sound, or an environmental sound. The speech that is input by the user 1 is actual content of a call between the user 1 and the user 2, and the background sound or the environmental sound is a sound (for example, a bird sound or a car horn sound) in a call environment of the user 1. Herein, the speech that is input by the user 1 is an original speech of the user 1. When the user 1 talks with the user 2, a mouth of the user 1 is close to the microphone. Therefore, in most cases, volume (which may be measured in decibels) of the speech that is input by the user 1 is greater than that of the background sound or the environmental sound.

In some embodiments, in a process in which the terminal 100 continuously collects an input audio stream, the user 1 may interrupt the process in which the terminal 100 collects the audio stream. For example, the user 1 may enable a call mute function of the terminal 100. After the call mute function is enabled, the terminal 100 temporarily stops collecting the audio stream. For example, referring to FIG. 3a, the call interface 10 may further include a microphone icon 307. The user 1 may tap the microphone icon 307, and the terminal 100 temporarily stops, in response to the tap operation, collecting the audio stream. Further, the user 1 may tap the microphone icon 307 again, and the terminal 100 resumes, in response to the tap operation, collecting the audio stream.

In some embodiments, the terminal 100 may perform processing such as noise reduction or echo suppression on the continuously collected audio stream. In this way, the speech (namely, the original speech of the user 1) that is input by the user 1 in the audio stream can be highlighted, impact of the background sound or the environmental sound in the audio stream on the speech that is input by the user 1 can be reduced, and subsequent translation quality can be ensured.

According to the foregoing embodiment, the terminal 100 may obtain the original audio stream that is continuously input or the audio stream obtained after the processing such as noise reduction or echo suppression. The following describes a process in which the terminal 100 translates the original speech of the user 1 in the obtained audio stream.

In some embodiments, the terminal 100 may segment the obtained audio stream to obtain segments of audio streams, and translate the segments of audio streams obtained through segmentation. In a possible implementation, the terminal 100 may segment the obtained audio stream based on volume of the obtained audio stream. For example, when volume of a segment of audio stream in the obtained audio stream is greater than a threshold, the segment of audio stream is separately obtained through segmentation, and the segment of audio stream is translated. In another possible implementation, the terminal 100 may segment the obtained audio stream based on specific duration. For example, the terminal 100 may segment the audio stream into 5-second segments, and translate each segment of audio stream.

In a specific example, the terminal 100 continuously collects an audio stream by using a built-in microphone, and the user 1 inputs a Chinese speech "ni hao, wo xiang mai zhang ji piao" to the terminal 100. The terminal 100 performs processing such as noise reduction or echo suppression on the collected audio stream, and obtains a segment of audio stream through segmentation. The segment of audio stream obtained through segmentation includes the Chinese speech "ni hao, wo xiang mai zhang ji piao" that is input by the user 1.

Figure 4A:
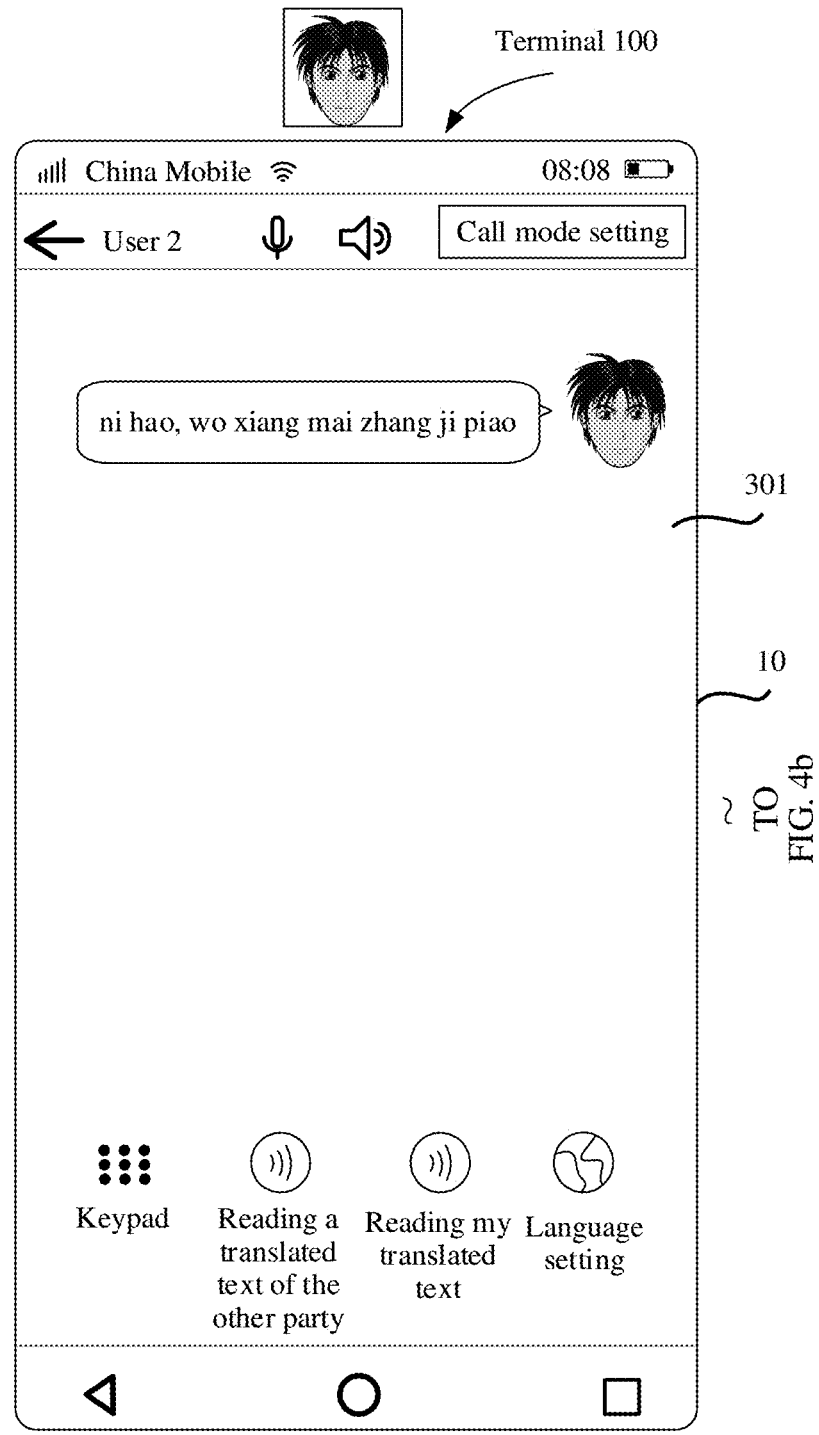

For example, referring to FIG. 4a, the terminal 100 may convert, into a Chinese text "ni hao, wo xiang mai zhang ji piao", the Chinese speech that is input by the user 1 in the segment of audio stream obtained through segmentation, and display the Chinese text in the text display area 301 in the call interface 10 of the terminal 100. Optionally, the terminal 100 may further display a profile picture or a name of the user 1 in the text display area 301, to identify that the speech corresponding to the Chinese text is input by the user 1.

The terminal 100 may translate, in either of the following manners, the segment of audio stream obtained through segmentation.

(1) The terminal 100 locally translates the segment of audio stream.

Specifically, a process in which the terminal 100 translates audio in one language into audio in another language may include the following steps.

(a) Speech recognition: Specifically, the terminal 100 may convert the Chinese speech of the user 1 in the audio stream into the Chinese text in step 1.

(b) Text correction: Specifically, in step 2, the terminal 100 may divide the Chinese text into sentences, that is, perform sentence segmentation. Optionally, the terminal 100 may further add punctuation to the Chinese text, remove an inconsecutive word (for example, "a", "en", or another repeated word) from the Chinese text, and the like in step 2. In step 2, the terminal 100 can obtain the Chinese text "ni hao, wo xiang mai zhang ji piao".

(c) Translation: Specifically, the terminal 100 may translate, by using a language package having a Chinese-English mutual translation function, the Chinese text obtained through text correction, to obtain an English text "Hello, I want to buy a ticket", namely, a translated text of the user 1. Herein, the terminal 100 may select corresponding language packages based on the currently specified languages of the two parties. For example, referring to the embodiment in FIG. 3*c*, in current language settings of the terminal 100, the user 1 uses Chinese, and the user 2 uses English. Therefore, the terminal 100 selects a language package having a Chinese-English mutual translation function to perform step 3.

(d) Speech synthesis: Specifically, the terminal 100 may further synthesize the English text obtained through translation into an English speech, that is, obtain a translated speech of the user 1.

It may be understood that a text in one language may be translated into a text in another language in steps (b) and (c), audio in one language may be translated into a text in another language in steps (a) to (c), a text in one language may be translated into audio in another language in steps (b) to (d), and audio in one language may be translated into audio in another language in steps (a) to (d).

(2) The terminal 100 translates the segment of audio stream by using a translation server (for example, a Google translation server or a Microsoft translation server).

In an implementation, the terminal 100 may directly send the segment of audio stream to the translation server, and the translation server translates the segment of audio stream. In some embodiments, the translation server has a requirement on a format of the input audio stream. Therefore, the terminal 100 may perform processing such as coding or resampling on the segment of audio stream, to obtain an audio stream that meets the format requirement, and then send the audio stream to the translation server. Herein, a process in which the translation server translates audio in one language into audio in another language may include the foregoing steps: (a) speech recognition; (b) text correction; (c) translation; and (d) speech synthesis.

In another implementation, the terminal 100 may perform step (a), and send the Chinese text obtained through speech recognition to the translation server, and the translation server performs steps (b), (c), and (d).

In another implementation, the terminal 100 may perform step (a) and (d), and send the Chinese text obtained through speech recognition to the translation server, and the translation server performs steps (b) and (c).

After obtaining the translated text of the user 1 or the translated speech of the user 1, the translation server may send the translated text of the user 1 or the translated speech of the user 1 to the terminal 100. In some embodiments, an English translated speech returned by the translation server to the terminal 100 may be compressed. Therefore, after receiving the English translated speech, the terminal 100 may perform processing such as decoding or resampling on the English translated speech.

In either of the foregoing translation manners (1) and (2), the terminal 100 may obtain the translated English text and/or the translated English speech, namely, the translated text and/or the translated speech of the user 1. After obtaining the translated text or the translated speech of the user 1, the terminal 100 may perform corresponding processing on the translated text and/or the translated speech of the user 1 based on the call mode that is set by the user 1.

Figure 4B:
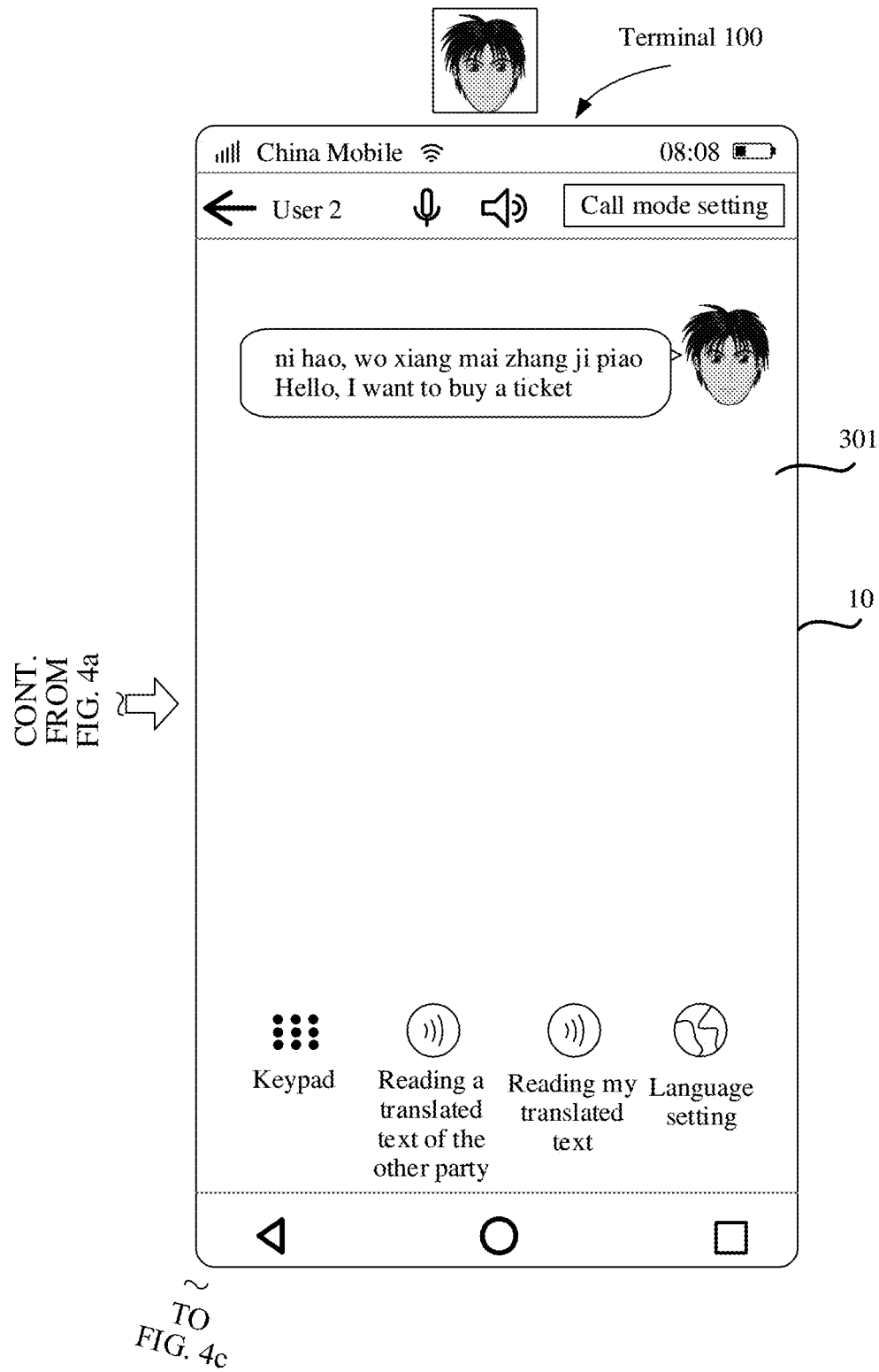

For example, referring to FIG. 4*b*, in some embodiments, if the terminal 100 obtains the translated text of the user 1, the terminal 100 may display the translated text "Hello, I want to buy a ticket" of the user 1 in the text display area 301 in the call interface 10. If the terminal 100 chooses to play the translated speech of the user 1 (that is, the user 1 can hear the translated speech of the user 1 in a current call mode of the user 1), or the terminal 100 enables the function of "Reading my translated text", the terminal 100 may further read the English text, so that the user 1 can hear the translated speech of the user 1.

Similarly, if the terminal 100 obtains the translated speech of the user 1, and the terminal 100 chooses to play the translated speech of the user 1 (that is, the user 1 can hear the translated speech of the user 1 in a current call mode of the user 1), the terminal 100 may play the translated speech. Referring to FIG. 4*b*, if the translated speech is obtained by the terminal 100 through local translation in the manner (1), the terminal 100 may further display, in the text display area 301 in the call interface 10, the English text "Hello, I want to buy a ticket" generated in step (c). For example, referring to FIG. 4*b*, if the translated speech is sent by the translation server to the terminal 100, the terminal 100 may further convert the translated speech into the English text "Hello, I want to buy a ticket", and then display the English text in the text display area 301 in the call interface 10. Further, if the terminal 100 enables the function of "Reading my translated text", the terminal 100 may further read the English text, so that the user 1 can hear the translated speech of the user 1.

Herein, the terminal 100 may play the translated speech of the user 1 by using an apparatus such as an earpiece, a speaker, or a headset.

Figure 5A:
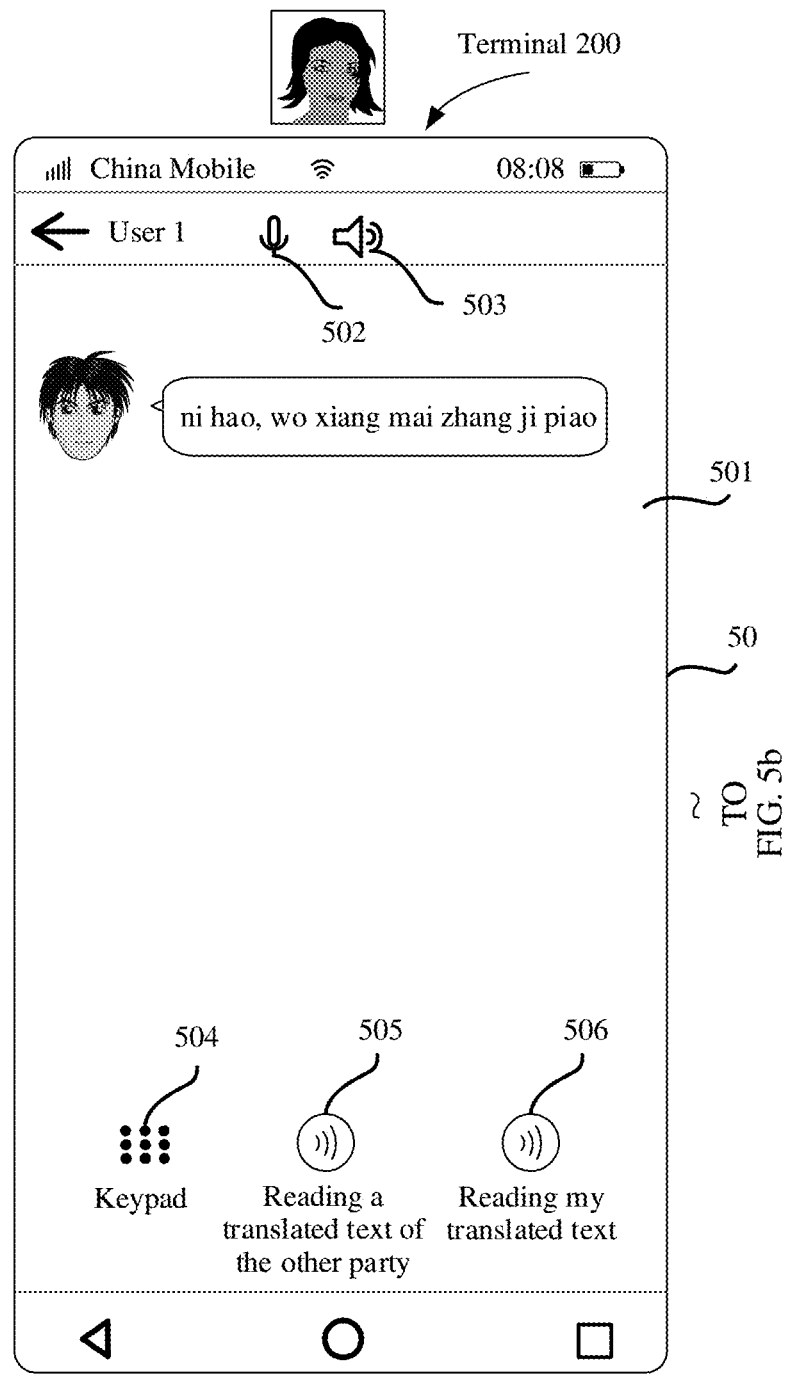

For example, after the terminal 200 establishes a communication connection to the terminal 100, the terminal 200 may display a call interface 50 shown in FIG. 5*a*. The call interface 50 may include a display area 501 used to display a text corresponding to a voice call between the user 2 and the user 1.

Herein, in some embodiments, because a translation capability of the terminal 100 is used during a call between the user 1 and the user 2, the terminal 100 may be configured to set languages and call modes of the two communications parties, and the terminal 200 is not configured to set languages and call modes of the two parties.

In some embodiments, the call interface 50 may include an option "Keyboard" 504. The terminal 200 may display the keyboard in response to a tap operation performed by the user 2 on the "Keyboard" 504, so that the user 2 dials a number of another user, and establishes a communication connection to a terminal of the another user.

In some embodiments, the call interface 50 may include an option "Reading a translated text of the other party" 505. The terminal 200 may enable a function of "Reading a translated text of the other party" in response to a tap operation performed by the user 2 on "Reading a translated text of the other party" 505. After the terminal 200 enables the function of "Reading a translated text of the other party", when the terminal 200 receives a translated text that is of the user 1 and that is sent by the terminal 100, the terminal 100 may read the translated text. When reading the translated text, the terminal 200 first synthesizes the translated text into a speech, and then plays the speech.

In some embodiments, the call interface 50 may include an option "Reading my translated text" 506. The terminal 200 may enable a function of "Reading my translated text" in response to a tap operation performed by the user 2 on "Reading my translated text" 506. After the terminal 200 enables the function of "Reading my translated text", when the terminal 200 receives a translated text that is of the user 2 and that is sent by the terminal 100, the terminal 100 may read the translated text.

After obtaining an original audio stream that is continuously input or an audio stream obtained after processing such as noise reduction or echo suppression, the terminal 100 may send the audio stream to the terminal 200 through the communication connection. Correspondingly, the terminal 200 may receive the audio stream. If the user 2 can hear an original speech of the user 1 in a current call mode of the user 2, the terminal 200 plays the audio stream. In this case, the user 2 can hear the original speech "ni hao, wo xiang mai zhang ji piao" of the user 1. For example, referring to FIG. 5*a*, in some embodiments, after receiving the audio stream sent by the terminal 100, the terminal 200 may convert the original speech of the user 1 in the audio stream into a Chinese text "ni hao, wo xiang mai zhang ji piao", and display the Chinese text in the text display area 501 in the call interface 50. Optionally, the terminal 200 may further display a profile picture or a name of the user 1 in the text display area 501, to identify that a speech corresponding to the Chinese text is the translated speech of the user 1.

After obtaining the translated text and/or the translated speech of the user 1 in either of the foregoing translation manners (1) and (2), the terminal 100 may further send the translated text and/or the translated speech of the user 1 to the terminal 200 through the communication connection.

Figure 5B:
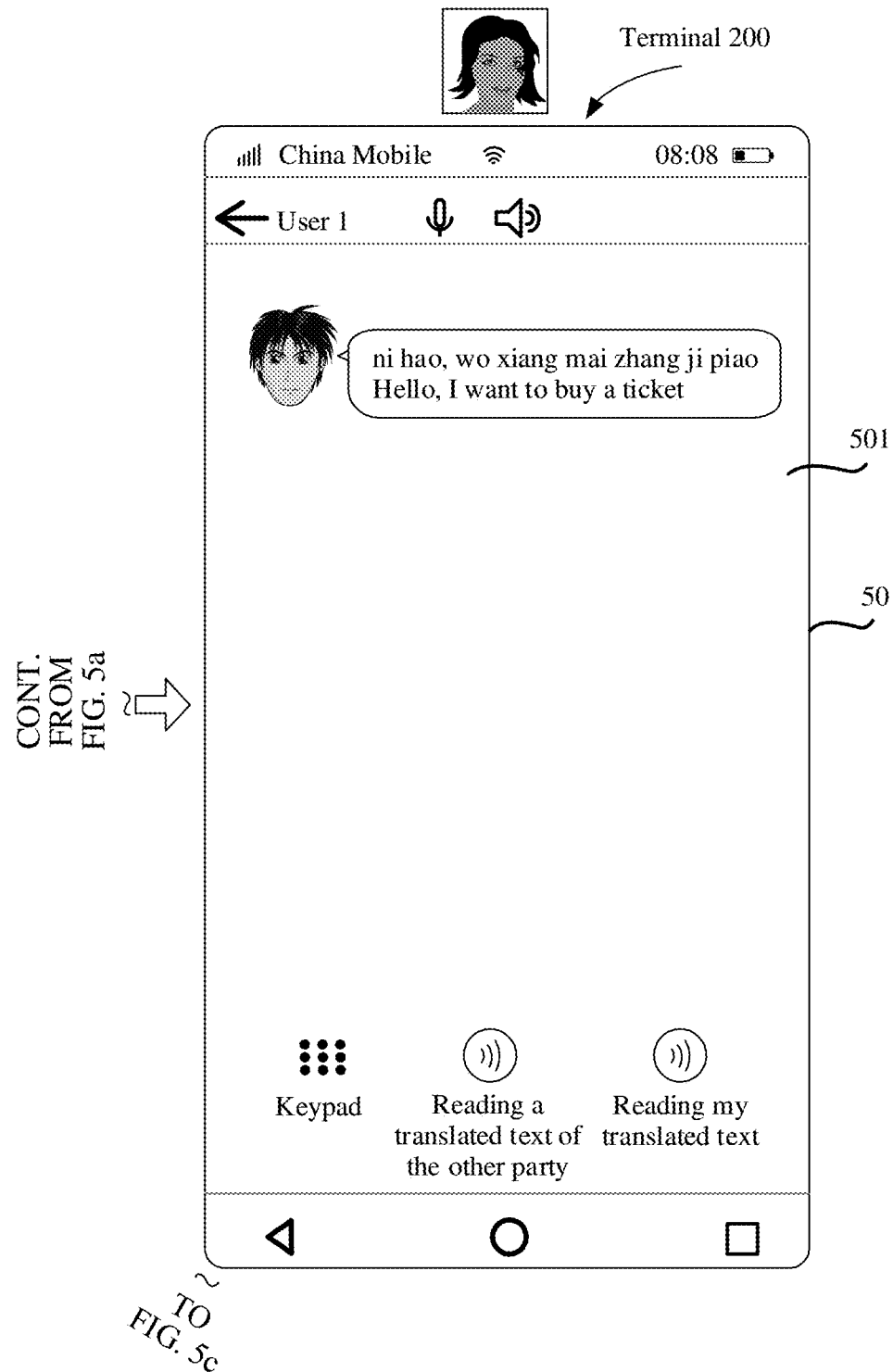

For example, referring to FIG. 5*b*, in some embodiments, if the terminal 200 receives the translated text of the user 1, the terminal 200 may display the translated text "Hello, I want to buy a ticket" of the user 1 in the text display area 501 in the call interface 50. If the user 2 can hear the translated speech of the user 1 in a current call mode of the user 2, or the terminal 200 enables the function of "Reading a translated text of the other party", the terminal 200 may further read the English text, so that the user 2 can hear the translated speech of the user 1.

Similarly, if the user 2 can hear the translated speech of the user 1 in a current call mode of the user 2, the terminal 200 may obtain the translated speech of the user 1, and play the translated speech. Further, referring to FIG. 5*b*, the terminal 200 may further convert the translated speech into the English text "Hello, I want to buy a ticket", and then display the English text in the text display area 501 in the call interface 50. Further, if the terminal 200 enables the function of "Reading a translated text of the other party", the terminal 200 may further read the English text, so that the user 2 can hear the translated speech of the user 1.

Herein, the terminal 200 may play the translated speech of the user 1 by using an apparatus such as an earpiece, a speaker, or a headset.

After the terminal 200 displays the translated text of the user 1 or plays the translated speech of the user 1, the user 2 may learn of a request of the user 1, and input an English original speech "OK, which day do you prefer" to the terminal 200. Herein, the terminal 200 may also continuously collect an input audio stream. An operation of collecting the audio stream by the terminal 200 is the same as an operation of collecting the audio stream by the terminal 100. For details, refer to the foregoing related descriptions of continuously collecting the input audio stream by the terminal 100.

In some embodiments, in a process in which the terminal 200 continuously collects an input audio stream, the user 2 may interrupt the process in which the terminal 200 collects the audio stream. For example, the user 2 may enable a call mute function of the terminal 200. After the call mute function is enabled, the terminal 200 temporarily stops collecting the audio stream. For example, referring to FIG. 5*a*, the call interface 10 may further include a microphone icon 502. The user 2 may tap the microphone icon 502, and the terminal 200 temporarily stops, in response to the tap operation, collecting an audio stream. Further, the user 2 may tap the microphone icon 502 again, and the terminal 200 resumes, in response to the tap operation, collecting the audio stream.

In some embodiments, the terminal 200 may perform processing such as noise reduction or echo suppression on the continuously collected audio stream.

According to the foregoing embodiment, the terminal 200 may obtain the original audio stream that is continuously input or the audio stream obtained after the processing such as noise reduction or echo suppression.

Figure 5C:
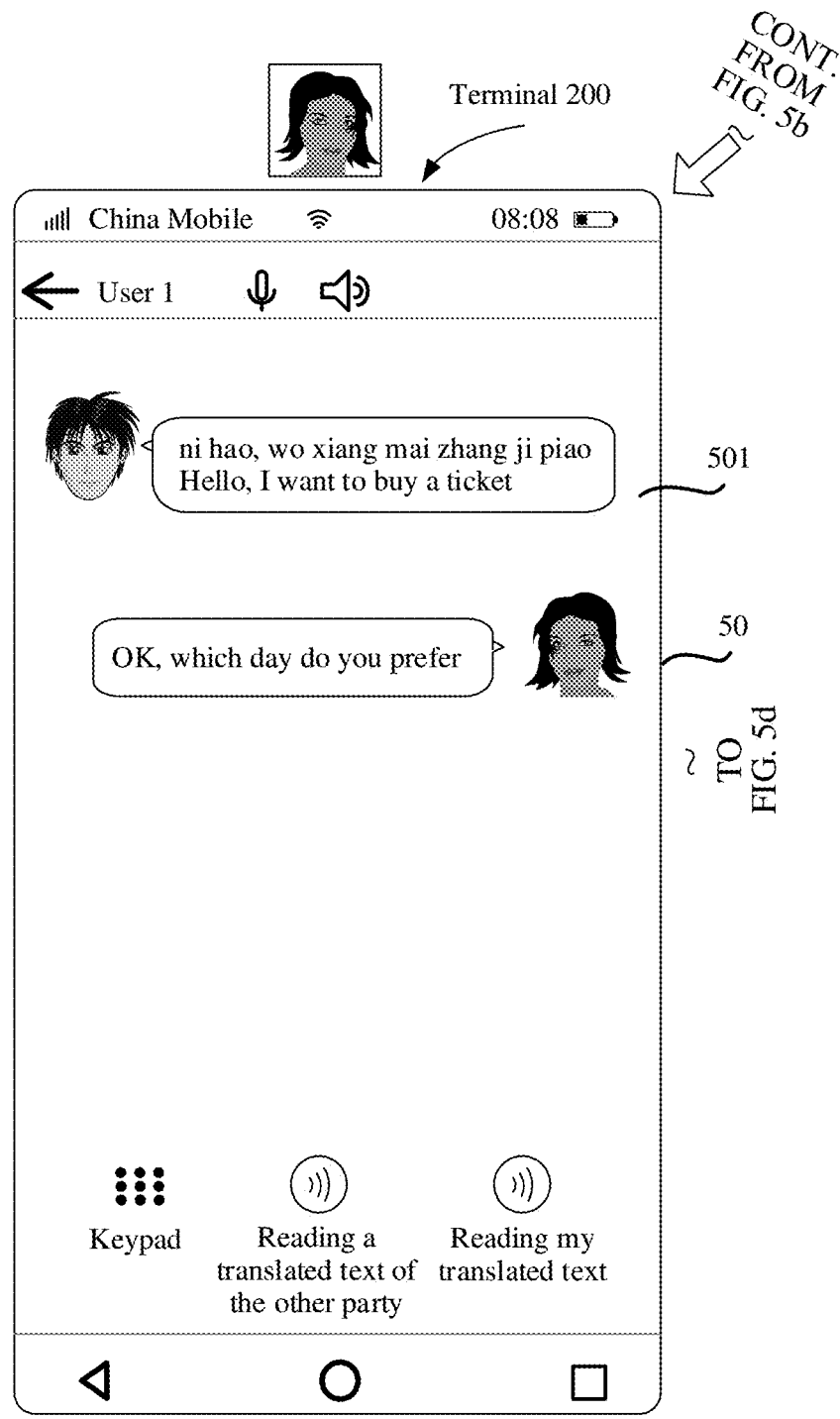

After the terminal 200 obtains the audio stream, in some embodiments, for example, referring to FIG. 5*c*, the terminal 200 may convert the original speech of the user 2 in the audio stream into an English text "OK, which day do you prefer", and display the English text in the text display area 501 in the call interface 50. Optionally, the terminal 200 may further display a profile picture or a name of the user 2 in the text display area 501, to identify that a speech corresponding to the English text is input by the user 2 to the terminal 200.

After obtaining the audio stream, the terminal 200 may further send the audio stream to the terminal 100 through the communication connection. Correspondingly, the terminal 100 may receive the audio stream. If the user 1 can hear the original speech of the user 2 in a current call mode of the user 1, the terminal 100 plays the received audio stream.

In some embodiments, the terminal 100 may segment the audio stream sent by the terminal 200 to obtain segments of audio streams, and translate the segments of audio streams obtained through segmentation. Herein, a manner in which the terminal 100 segments the audio stream sent by the terminal 200 is the same as a manner in which the terminal 100 segments the audio stream obtained by the terminal 100. For details, refer to the related descriptions.

Figure 4C:
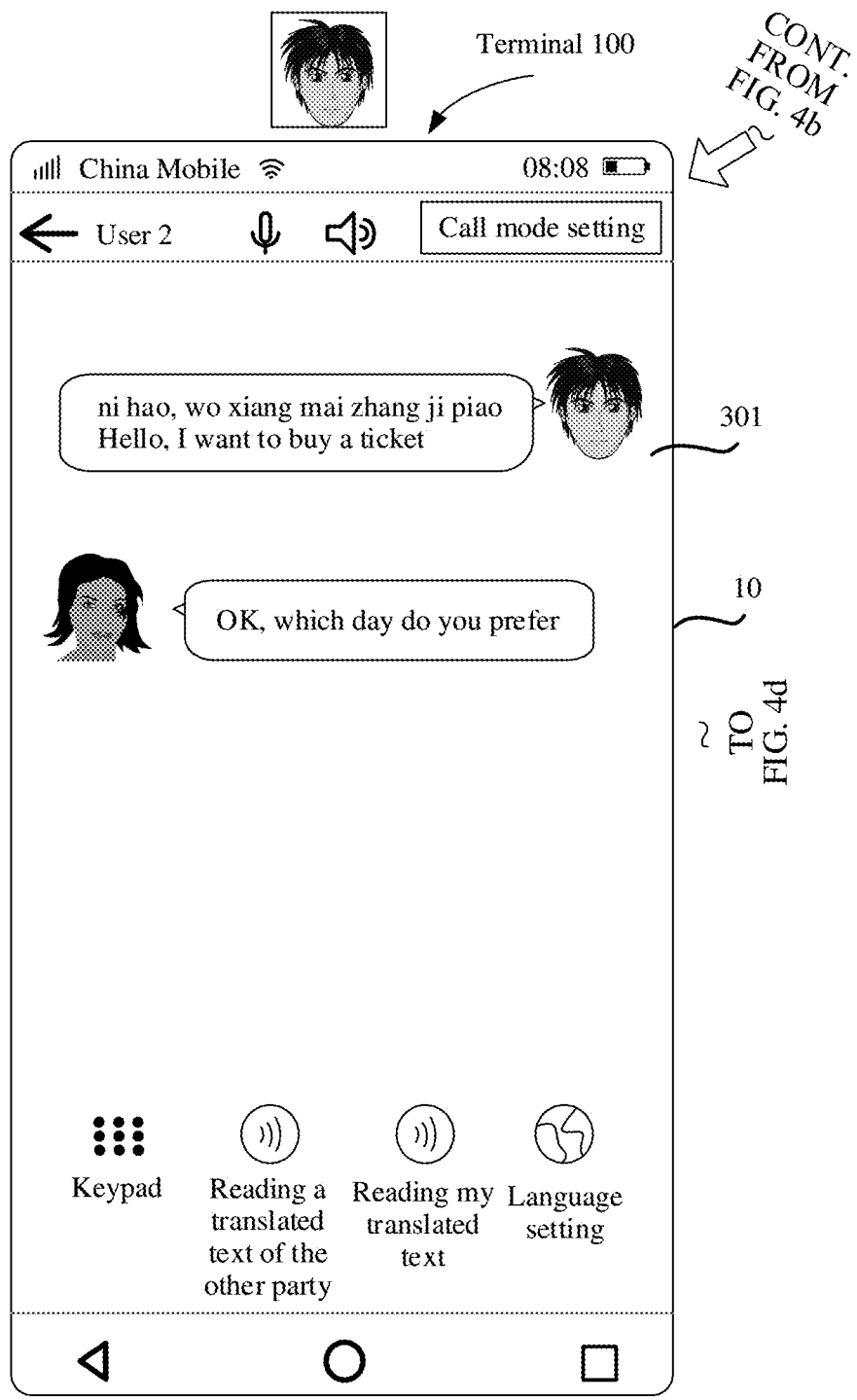

In a specific example, a segment of audio stream obtained by the terminal 100 through segmentation includes an English speech "OK, which day do you prefer" that is input by the user 2. For example, referring to FIG. 4*c*, the terminal 100 may convert, into an English text "OK, which day do you prefer", the English speech that is input by the user 2 in the segment of audio stream obtained through segmentation, and display the English text in the text display area 301 in the call interface 10 of the terminal 100. Optionally, the terminal 100 may further display a profile picture or a name of the user 2 in the text display area 301, to identify that a speech corresponding to the English text is the original speech of the user 2.

The terminal 100 may translate the segment of audio stream obtained through segmentation. A manner in which the terminal 100 translates the audio stream sent by the terminal 200 is the same as a manner in which the terminal 100 translates the audio stream collected at the local end. For details, refer to the related descriptions.

After translating the audio stream sent by the terminal 200, the terminal 100 may obtain the translated Chinese text and/or the translated Chinese speech, namely, the translated text and/or the translated speech of the user 2.

After obtaining the translated text or the translated speech of the user 2, the terminal 100 may perform corresponding processing on the translated text and/or the translated speech of the user 2 based on the call mode that is set by the user 1.

Figure 4D:
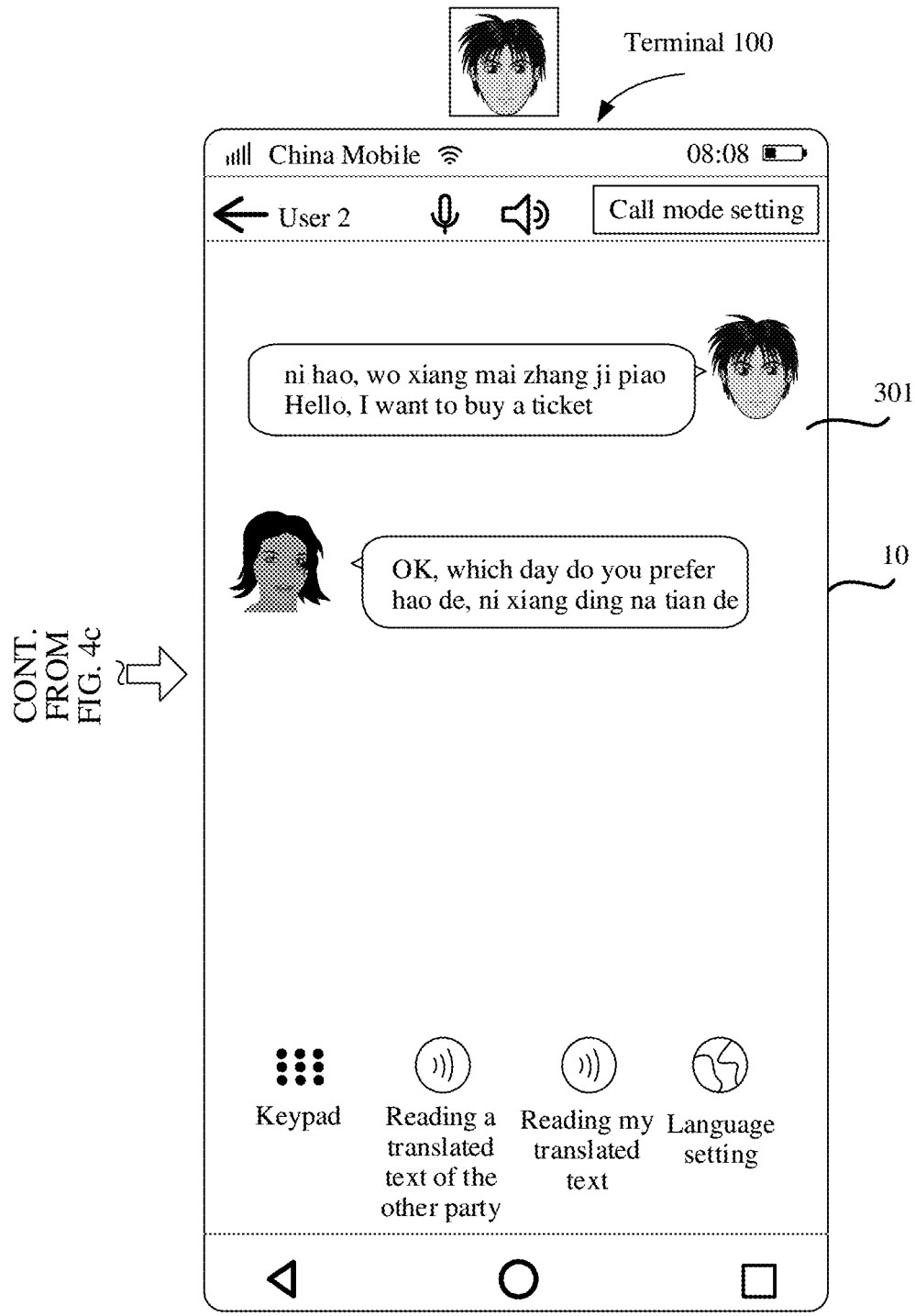

For example, referring to FIG. 4d, in some embodiments, if the terminal 100 obtains the translated text of the user 2, the terminal 100 may display the translated text "hao de, ni xiang ding na tian de" of the user 2 in the text display area 301 in the call interface 10. If the terminal 100 chooses to play the translated speech of the user 2 (that is, the user 1 can hear the translated speech of the user 2 in a current call mode of the user 1), or the terminal 100 enables the function of "Reading a translated text of the other party", the terminal 100 may further read the Chinese text, so that the user 1 can hear the translated speech of the user 2.

Similarly, if the terminal 100 obtains the translated speech of the user 2, and the terminal 100 chooses to play the translated speech of the user 2 (that is, the user 1 can hear the translated speech of the user 2 in a current call mode of the user 1), the terminal 100 may play the translated speech. For example, referring to FIG. 4d, if the translated speech of the user 2 is obtained by the terminal 100 through local translation, the terminal 100 may further display, in the text display area 301 in the call interface 10, the Chinese text "hao de, ni xiang ding na tian de" generated in a translation process of the terminal 100. For example, referring to FIG. 4d, if the translated speech of the user 2 is sent by the translation server to the terminal 100, the terminal 100 may further convert the translated speech into the Chinese text "hao de, ni xiang ding na tian de", and then display the Chinese text in the text display area 301 in the call interface 10. Further, if the terminal 100 enables the function of "Reading a translated text of the other party", the terminal 100 may further read the Chinese text, so that the user 1 can hear the translated speech of the user 2.

After obtaining the translated text and/or the translated speech of the user 2 in either of the foregoing translation manners, the terminal 100 may further send the translated text and/or the translated speech of the user 2 to the terminal 200 through the communication connection. Correspondingly, the terminal 200 may obtain the translated text and/or the translated speech of the user 2.

Figure 5D:
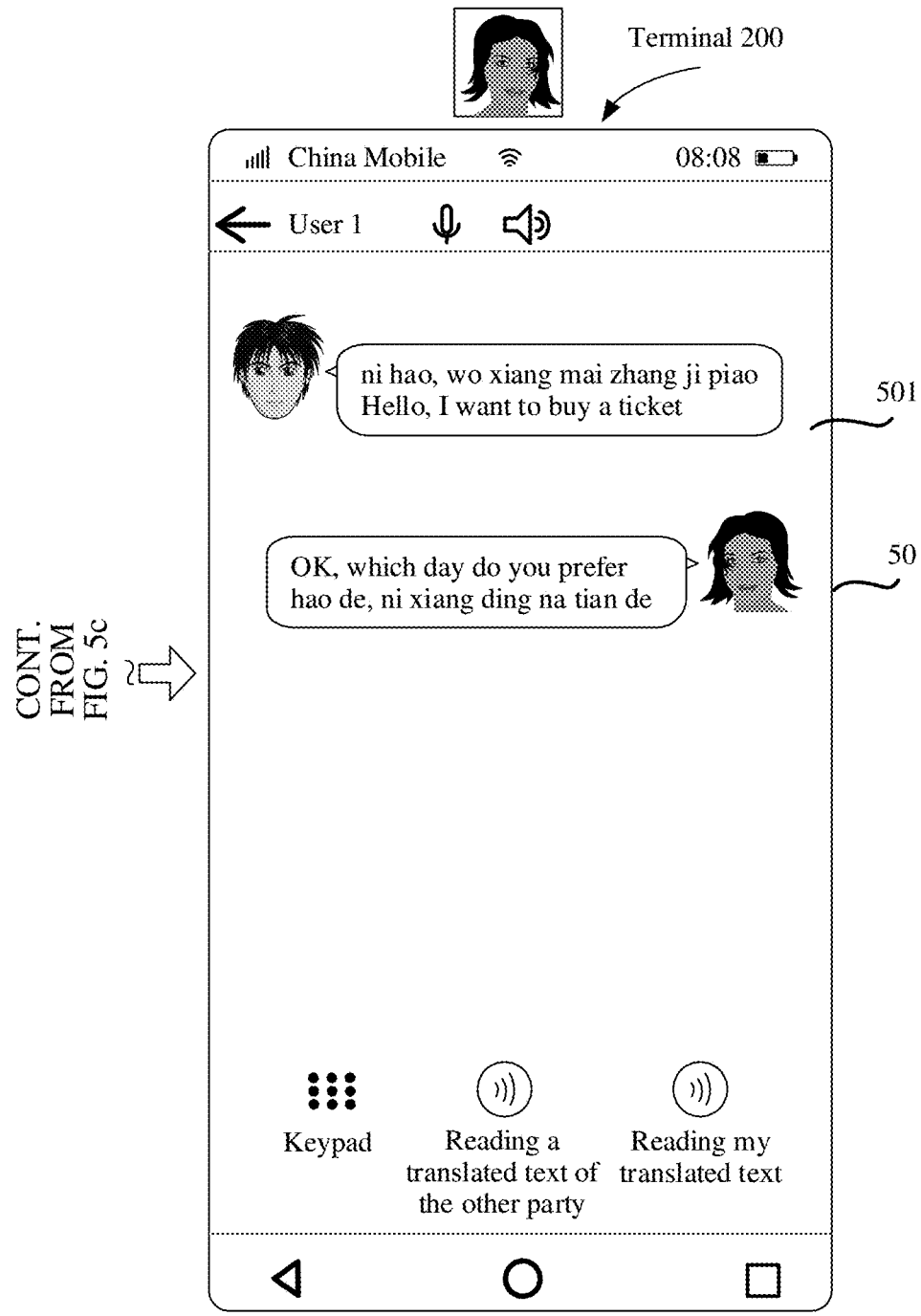

For example, referring to FIG. 5d, in some embodiments, if the terminal 200 obtains the translated text of the user 2, the terminal 200 may display the translated text "hao de, ni xiang ding na tian de" of the user 2 in the text display area 501 in the call interface 50. If the user 2 can hear the translated speech of the user 2 in a current call mode of the user 2, or the terminal 200 enables the function of "Reading my translated text", the terminal 200 may further read the Chinese text, so that the user 2 can hear the translated speech of the user 2.

Similarly, if the user 2 can hear the translated speech of the user 2 in a current call mode of the user 2, the terminal 200 may obtain the translated speech of the user 2, and play the translated speech. Further, referring to FIG. 5d, the terminal 200 may further convert the translated speech into the Chinese text "hao de, ni xiang ding na tian de", and then display the Chinese text in the text display area 501 in the call interface 50. Further, if the terminal 200 enables the function of "Reading my translated text", the terminal 200 may further read the Chinese text, so that the user 2 can hear the translated speech of the user 2.

In some embodiments, when the terminal 100 plays audio (for example, the translated speech of the user 1, or the original speech or the translated speech of the user 2), the user 1 may adjust an audio playing process of the terminal 100. For example, the user 1 may enable a playing mute function of the terminal 100. In an implementation, after the playing mute function is enabled, the terminal 100 no longer plays audio. In another implementation, after the playing mute function is enabled, the terminal 100 continuously plays audio, but volume of playing the audio is 0. For example, referring to FIG. 3a, the call interface 10 of the terminal 100 may further include a speaker icon 308. The user 1 may tap the speaker icon 308, and the terminal 100 enables a playing mute function in response to the tap operation. Further, the user 1 may tap the speaker icon 308 again, and the terminal 100 disables the playing mute function in response to the tap operation Similarly, in some embodiments, in a process in which the terminal 200 plays audio (for example, the translated speech of the user 2, or the original speech or the translated speech of the user 1), the user 2 may adjust an audio playing process of the terminal 100. For example, the user 2 may enable a playing mute function of the terminal 200. For example, referring to FIG. 5a, the call interface 50 may further include a speaker icon 503. The user 2 may enable or disable a playing mute function by tapping the speaker icon 503.

According to the embodiments in FIG. 4(a) to FIG. 4(d) and FIG. 5(a) to FIG. 5(d), the user 1 and the user 2 complete two simple speech answers. Subsequently, the user 1 and the user 2 may further continue to talk with each other in the foregoing manner.

For example, subsequently, the user 1 may further input a speech "wo xiang yao wu yue san hao de" to the terminal 100, and the user 2 may further input a speech "OK, I will check it" to the terminal 200. To be specific, a sequence of inputting original speeches during a call between the user 1 and the user 2 is as follows:

(1) An original speech of the user 1: "ni hao, wo xiang mai zhang ji piao";
(2) An original speech of the user 2: "OK, which day do you prefer";
(3) An original speech of the user 1: "wo xiang yao wu yue san hao de"; and
(4) An original speech of the user 2: "OK, I will check it".

The terminal 100 translates the original speeches of the two parties, and obtains translated speeches in the following sequence:

(5) A translated speech of the user 1: "Hello, I want to buy a ticket";
(6) A translated speech of the user 2: "hao de, ni xiang ding na tian de";
(7) A translated speech of the user 1: "I want a ticket of May 3"; and
(8) A translated speech of the user 2: "hao de, wo cha xia".

The following describes, based on the foregoing example, audio heard by the user 1 and the user 2 in a call process in different call modes.

When the user 1 is in the call mode 1 in Table 1, the user 1 hears the speeches (6) and (8) in sequence in the call process. From the perspective of the user 1, an actual call process is as follows:

User 1: "ni hao, wo xiang mai zhang ji piao";
User 2: "hao de, ni xiang ding na tian de";

User 1: "wo xiang yao wu yue san hao de"; and
User 2: "hao de, wo cha xia".

When the user 1 is in the call mode 2 in Table 1, the user 1 hears the speeches (2), (6), (4), and (8) in sequence in the call process. Herein, the speeches heard by the user 1 in sequence in the another call mode are not described in detail.

When the user 2 is in the call mode 1 in Table 2, the user 2 hears the speeches (5) and (7) in sequence in the call process. From the perspective of the user 2, an actual call process is as follows:
User 1: "Hello, I want to buy a ticket";
User 2: "OK, which day do you prefer";
User 1: "I want a ticket of May 3"; and
User 2: "OK, I will check it".

When the user 2 is in the call mode 2 in Table 2, the user 2 hears the speeches (1), (5), (3), and (7) in sequence in the call process. Herein, the speeches heard by the user 1 in sequence in the another call mode are not described in detail.

It may be understood that a speed of translating the original speeches of the two communications parties by the terminal 100 is very fast, and a delay between the original speech and the translated speech/the translated text is very short. The two communications parties can almost see the translated texts or hear the translated speeches while inputting the original speeches. According to the translation method described in the embodiments in FIG. 4(a) to FIG. 4(d) and FIG. 5(a) to FIG. 5(d), automatic two-way translation between the two communications parties can be implemented, so that the two parties using different languages can normally communicate with each other. In addition, the terminal 100 may play audio or send audio to the terminal 200 based on the call modes of the two communications parties, so that the two communications parties each can hear expected audio, thereby improving user experience in a call process.

It can be learned from the embodiments in FIG. 4(a) to FIG. 4(d) and FIG. 5(a) to FIG. 5(d) that in the application scenario 1, the terminal 100 processes two translated speeches: the translated speech of the user 1, and the translated speech of the user 2. The terminal 100 may process the obtained translated speeches based on the call modes of the user 1 and the user 2.

Figure 6A:
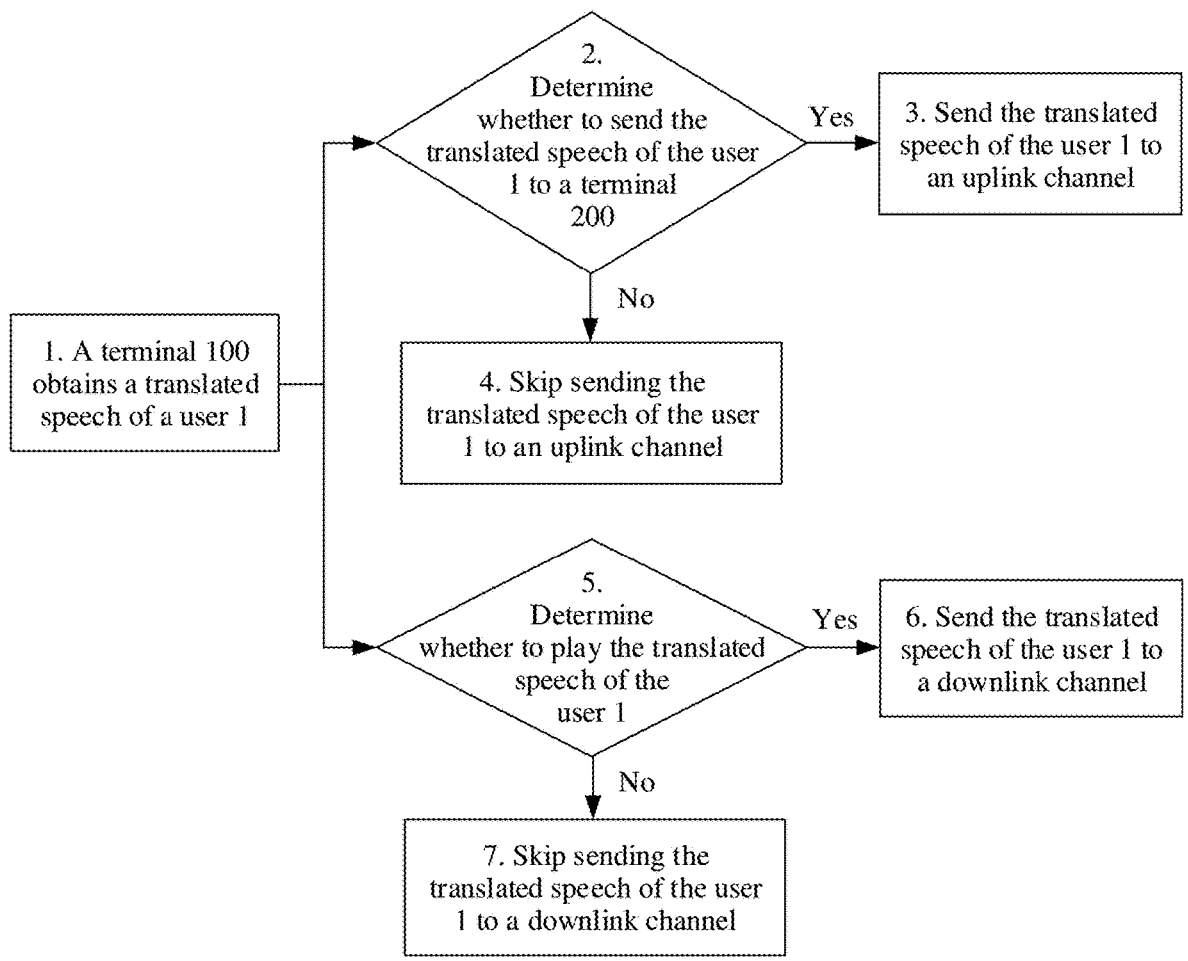
FIG. 6A is a schematic flowchart of processing a translated speech of a user 1 by a terminal 100 according to this application.

In some embodiments, the terminal 100 may obtain the translated speech of the user 1. For example, FIG. 6A shows a processing procedure of the terminal 100 when a translated speech of the user 1 is obtained. The processing procedure may include the following steps:
1. The terminal 100 obtains a translated speech of the user 1.
2. The terminal 100 determines, based on a call mode of the user 2, whether to send the translated speech of the user 1 to the terminal 200.
3. If the terminal 100 determines, in step 2, to send the translated speech of the user 1 to the terminal 200, the terminal 100 sends the translated speech of the user 1 to an uplink channel.
4. If the terminal 100 determines, in step 2, not to send the translated speech of the user 1 to the terminal 200, the terminal 100 does not send the translated speech of the user 1 to an uplink channel.
5. The terminal 100 determines, based on a call mode of the user 1, whether to play the translated speech of the user 1.
6. If the terminal 100 determines, in step 5, to play the translated speech of the user 1, the terminal 100 sends the translated speech of the user 1 to a downlink channel.
7. If the terminal 100 determines, in step 5, not to play the translated speech of the user 1, the terminal 100 does not send the translated speech of the user 1 to a downlink channel.

It may be understood that sequence numbers of the steps in FIG. 6A do not limit a sequence of performing the steps. For example, step 2 and step 5 may be simultaneously performed.

Figure 6B:
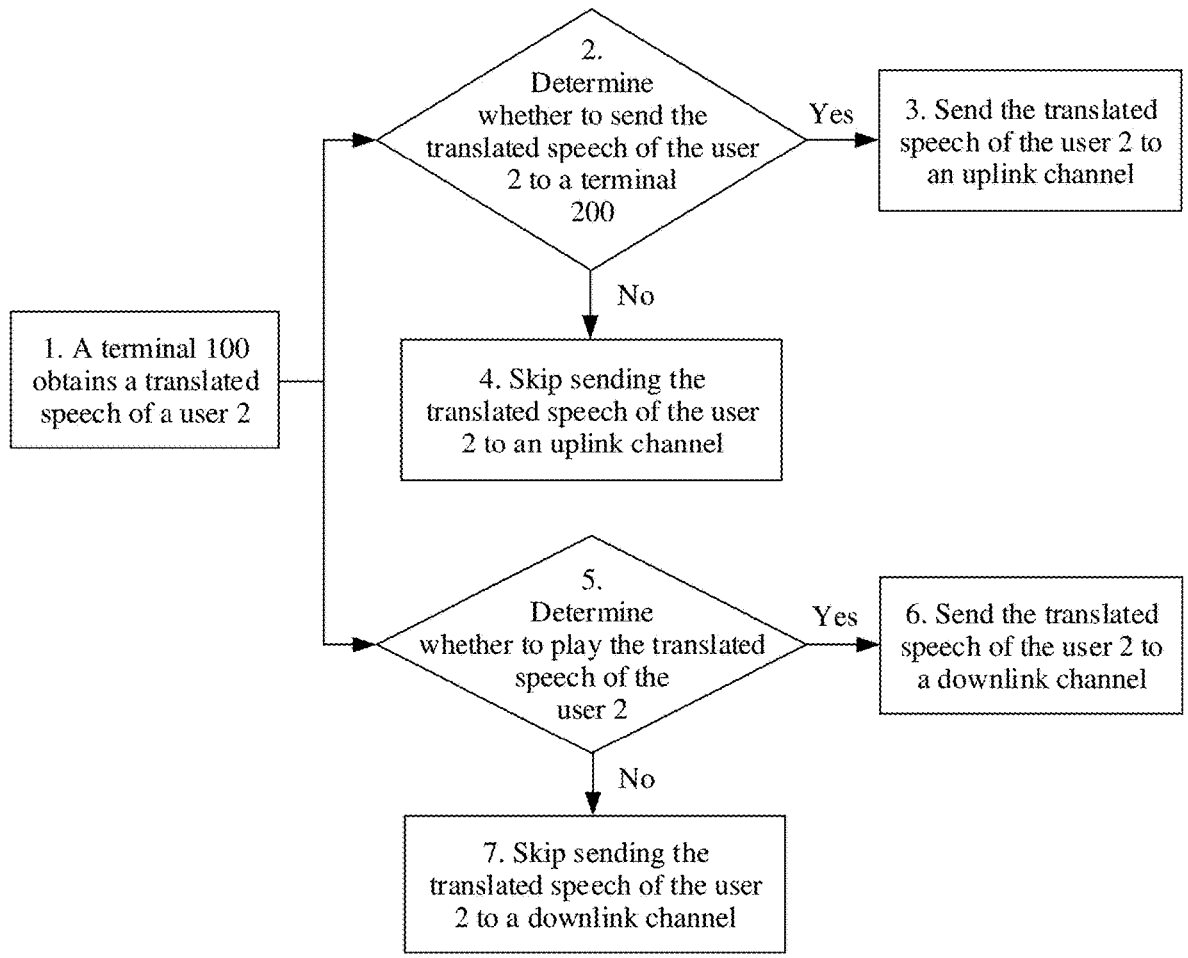
FIG. 6B is a schematic flowchart of processing a translated speech of a user 2 by a terminal 100 according to this application.

In some embodiments, the terminal 100 may obtain a translated speech of the user 2. For example, FIG. 6B shows a processing procedure of the terminal 100 when a translated speech of the user 2 is obtained. The processing procedure may include the following steps:
1. The terminal 100 obtains a translated speech of the user 2.
2. The terminal 100 determines, based on a call mode of the user 2, whether to send the translated speech of the user 2 to the terminal 200.
3. If the terminal 100 determines, in step 2, to send the translated speech of the user 2 to the terminal 200, the terminal 100 sends the translated speech of the user 2 to an uplink channel.
4. If the terminal 100 determines, in step 2, not to send the translated speech of the user 2 to the terminal 200, the terminal 100 does not send the translated speech of the user 2 to an uplink channel.
5. The terminal 100 determines, based on a call mode of the user 1, whether to play the translated speech of the user 2.
6. If the terminal 100 determines, in step 5, to play the translated speech of the user 2, the terminal 100 sends the translated speech of the user 2 to a downlink channel.
7. If the terminal 100 determines, in step 5, not to play the translated speech of the user 2, the terminal 100 does not send the translated speech of the user 2 to a downlink channel.

It may be understood that sequence numbers of the steps in FIG. 6B do not limit a sequence of performing the steps. For example, step 2 and step 5 may be simultaneously performed.

In some embodiments, in a same time period, the terminal 100 may obtain the translated speech of the user 1 and the translated speech of the user 2 at the same time.

Figure 6C:
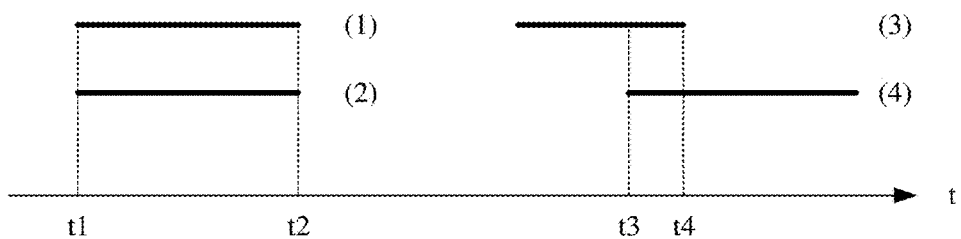
FIG. 6C is a schematic diagram of a scenario in which a terminal 100 receives a translated speech of a user 1 and a translated speech of a user 2 according to this application.

For example, FIG. 6C shows a possible scenario in which the terminal 100 obtains two translated speeches at the same time. Line segments (1) and (3) each represent a segment of translated speech of the user 1, line segments (2) and (4) each represent a segment of translated speech of the user 2, and a length of the line segment represents duration of the translated speech. As shown in the figure, in a time period from t1 to t2, the terminal 100 obtains a complete translated speech of the user 1 and a complete translated speech of the user 2 at the same time. In a time period from t3 to t4, the terminal 100 obtains a partial translated speech of the user 1 and a partial translated speech of the user 2 at the same time.

Figures 1, 6D:
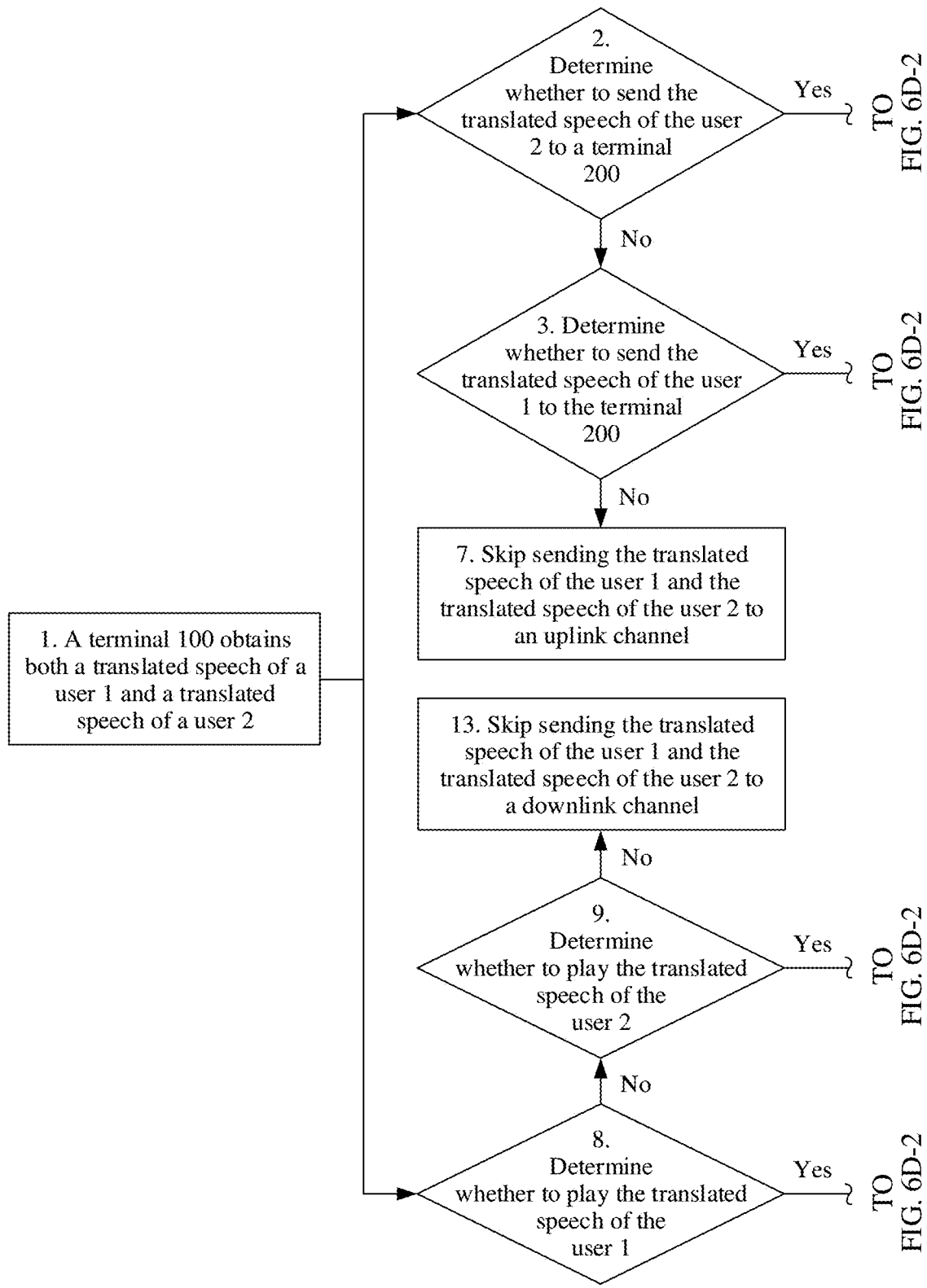
Figures 2, 6D:
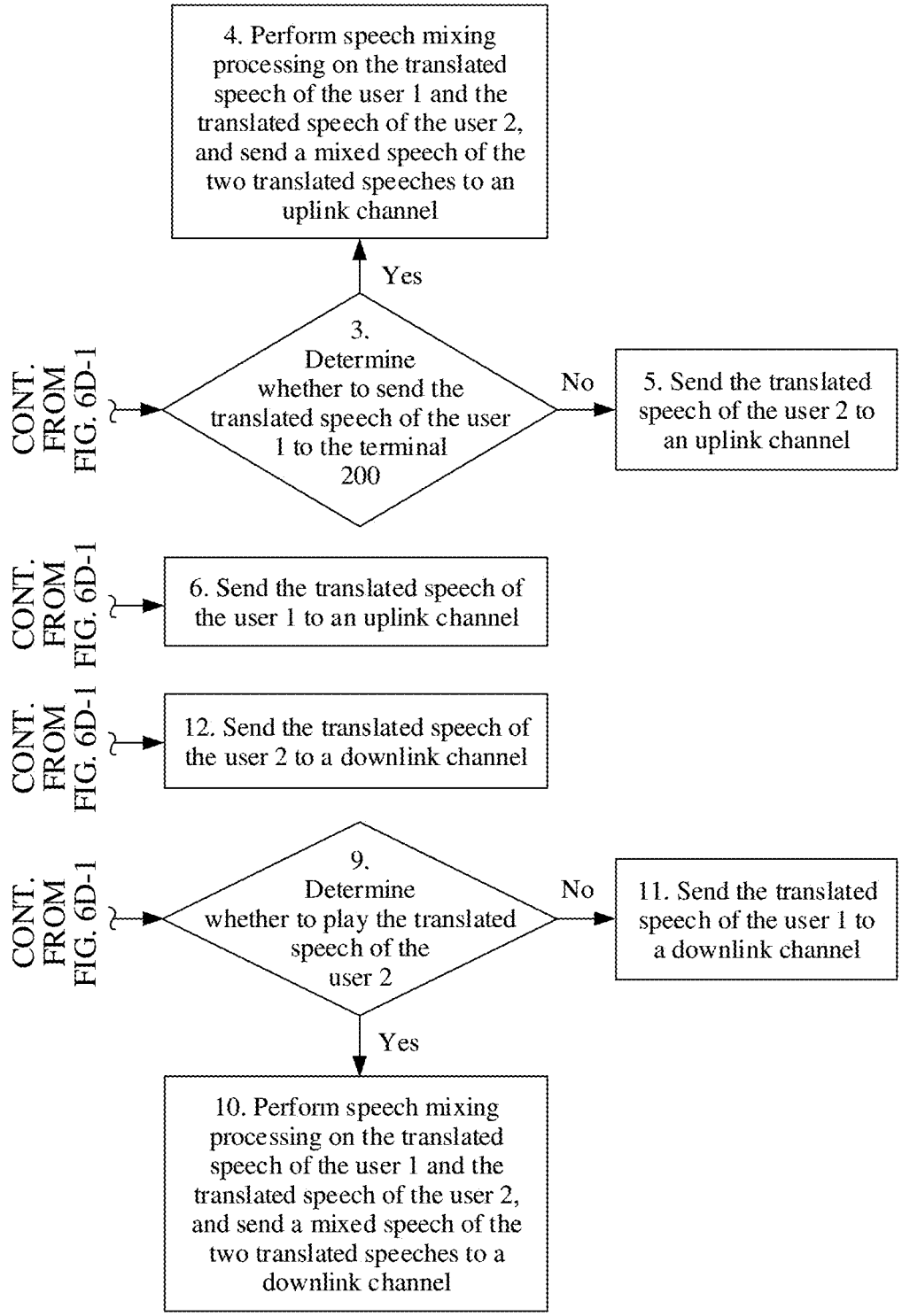

For example, FIG. 6D-1 and FIG. 6D-2 show a processing procedure of the terminal 100 when two translated speeches are obtained at the same time. The processing procedure may include the following steps:
1. The terminal 100 obtains a translated speech of the user 1 and a translated speech of the user 2 at the same time.
2. The terminal 100 determines, based on a call mode of the user 2, whether to send the translated speech of the user 2 to the terminal 200.

3. The terminal 100 determines, based on the call mode of the user 2, whether to send the translated speech of the user 1 to the terminal 200.
4. If the terminal 100 determines, in step 2, to send the translated speech of the user 2 to the terminal 200, and the terminal 100 determines, in step 3, to send the translated speech of the user 1 to the terminal 200, the terminal 100 may perform speech mixing processing on the translated speech of the user 1 and the translated speech of the user 2 to obtain a mixed speech of the two translated speeches, and send the mixed speech to an uplink channel.
5. If the terminal 100 determines, in step 2, to send the translated speech of the user 2 to the terminal 200, and the terminal 100 determines, in step 3, not to send the translated speech of the user 1 to the terminal 200, the terminal 100 sends the translated speech of the user 2 to an uplink channel.
6. If the terminal 100 determines, in step 2, not to send the translated speech of the user 2 to the terminal 200, and the terminal 100 determines, in step 3, to send the translated speech of the user 1 to the terminal 200, the terminal 100 sends the translated speech of the user 1 to an uplink channel.
7. If the terminal 100 determines, in step 2, not to send the translated speech of the user 2 to the terminal 200, and the terminal 100 determines, in step 3, not to send the translated speech of the user 1 to the terminal 200, the terminal 100 does not send the translated speech of the user 1 and the translated speech of the user 2 to an uplink channel.
8. The terminal 100 determines, based on a call mode of the user 1, whether to play the translated speech of the user 1.
9. The terminal 100 determines, based on the call mode of the user 1, whether to play the translated speech of the user 2.
10. If the terminal 100 determines, in step 8, to play the translated speech of the user 1, and the terminal 100 determines, in step 9, to play the translated speech of the user 2, the terminal 100 may perform speech mixing processing on the translated speech of the user 1 and the translated speech of the user 2, and send the mixed speech to a downlink channel.
11. If the terminal 100 determines, in step 8, to play the translated speech of the user 1, and the terminal 100 determines, in step 9, not to play the translated speech of the user 2, the terminal 100 sends the translated speech of the user 1 to a downlink channel.
12. If the terminal 100 determines, in step 8, not to play the translated speech of the user 1, and the terminal 100 determines, in step 9, to play the translated speech of the user 2, the terminal 100 sends the translated speech of the user 2 to a downlink channel.
13. If the terminal 100 determines, in step 8, not to play the translated speech of the user 1, and the terminal 100 determines, in step 9, not to play the translated speech of the user 2, the terminal 100 does not send the translated speech of the user 1 and the translated speech of the user 2 to a downlink channel.

It may be understood that sequence numbers of the steps in FIG. 6D-1 and FIG. 6D-2 do not limit a sequence of performing the steps. For example, step 2, step 3, step 8, and step 9 may be simultaneously performed.

In a possible implementation, that the terminal 100 performs speech mixing processing on the translated speech of the user 1 and the translated speech of the user 2 means that the terminal 100 splices the translated speech of the user 1 and the translated speech of the user 2 into one audio stream. When playing the mixed speech, the terminal 100 may hear the two translated speech in sequence. Herein, the terminal 100 may splice the two translated speeches in any sequence. For example, the translated speech of the user 1 is before the translated speech of the user 2, or the translated speech of the user 2 is before the translated speech of the user 1.

In another possible implementation, that the terminal 100 performs speech mixing processing on the translated speech of the user 1 and the translated speech of the user 2 means that the terminal 100 mixes or overlaps the translated speech of the user 1 and the translated speech of the user 2. When playing the mixed speech, the terminal 100 may hear the translated speech of the user 1 and the translated speech of the user 2 at the same time.

In the embodiments in FIG. 6A, FIG. 6B, and FIG. 6D-1 and FIG. 6D-2, after sending audio to the uplink channel, the terminal 100 may send the audio to the terminal 200 through the communication connection. After sending audio to the downlink channel, the terminal 100 may play the audio.

It can be learned from the embodiments in FIG. 4(*a*) to FIG. 4(*d*) and FIG. 5(*a*) to FIG. 5(*d*) that in the application scenario 1, the uplink channel of the terminal 100 includes an audio stream (including an original speech of the user 1) obtained by the terminal 100, and may further include a translated speech. The translated speech herein may be any one of the following: the translated speech of the user 1, the translated speech of the user 2, and the mixed speech of the two translated speeches (the translated speech of the user 1 and the translated speech of the user 2).

Herein, in the translated speech included in the uplink channel, the translated speech of the user 1 may be obtained in step 3 in FIG. 6A or step 6 in FIG. 6D-2, the translated speech of the user 2 may be obtained in step 3 in FIG. 6B or step 5 in FIG. 6D-2, and the mixed speech of the two translated speeches may be obtained in step 4 in FIG. 6D-2. For details, refer to the related descriptions. In an optional embodiment, the translated speech of the user 1 or the user 2 may be translated by the translation server and then sent to the terminal 100. To be specific, the translated speech may be compressed through a network. To ensure an effect of speech mixing, in some embodiments, the terminal 100 may perform a decoding operation on the translated speech.

When the uplink channel of the terminal 100 includes only the audio stream obtained by the terminal 100, and the terminal chooses to send the original speech of the user 1 to the terminal 200, the terminal 100 sends the obtained audio stream to the uplink channel.

When the uplink channel of the terminal 100 includes only the translated speech, the terminal 100 sends the translated speech to the uplink channel.

When the uplink channel of the terminal 100 includes the audio stream obtained by the terminal 100 and the translated speech, and the terminal chooses to send the original speech of the user 1 to the terminal 200, the terminal 100 may perform speech mixing processing on the audio stream obtained by the terminal 100 and the translated speech. Herein, a process of the speech mixing processing may be referred to as an uplink speech mixing process. Herein, a process in which the terminal 100 performs speech mixing processing on the audio stream obtained by the terminal 100 and the translated speech is similar to the speech mixing process in the embodiment in FIG. 6D-1 and FIG. 6D-2. The audio stream obtained by the terminal 100 and the translated speech may be spliced in a specific sequence, or may be overlapped. For details, refer to the foregoing related descriptions. After obtaining a mixed speech of the audio stream obtained by the terminal 100 and the translated speech, the terminal 100 may send the mixed speech to the uplink channel, and send the mixed speech to the terminal 200 through the communication connection.

Figure 7:
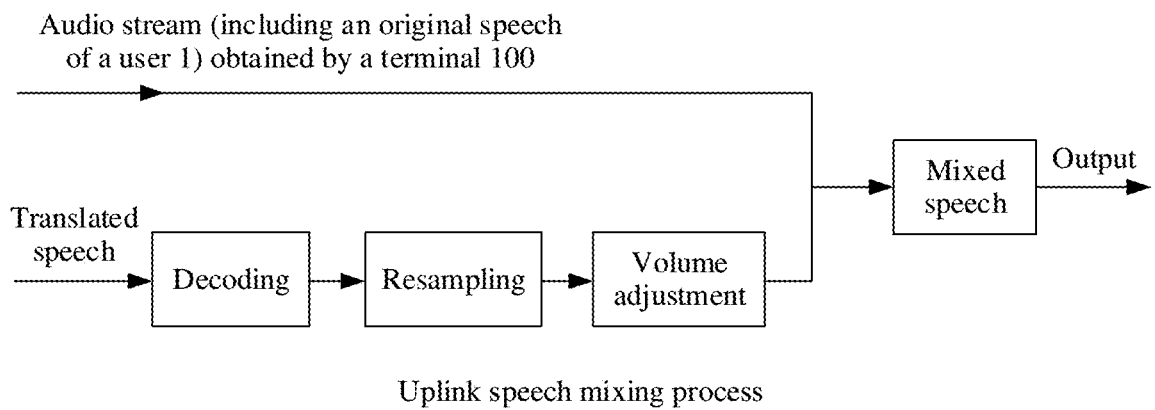
FIG. 7 is a schematic diagram of an uplink speech mixing procedure of a terminal 100 according to this application.

For example, FIG. 7 shows a possible procedure in which the terminal 100 performs speech mixing processing on the audio stream obtained by the terminal 100 and the translated speech.

In some embodiments, quality of the audio stream obtained by the terminal 100 may be different from that of the translated speech. Parameters reflecting audio quality may include a sampling rate, a quantity of sound channels, and the like. To ensure an effect of speech mixing, the terminal 100 may perform a resampling operation on the audio stream obtained by the terminal 100 or the translated speech. Herein, a lower sampling rate (for example, a sampling rate of the audio stream obtained by the terminal 100) in sampling rates corresponding to the audio stream obtained by the terminal 100 and the translated speech may be used as a standard to resample other audio (for example, the translated speech), so that the sampling rate of the audio stream obtained by the terminal 100 is the same as that of the translated speech.

In some embodiments, volume of the audio stream obtained by the terminal 100 may be different from that of the translated speech. To ensure an effect of speech mixing, the terminal 100 may perform a volume adjustment operation on the audio stream obtained by the terminal 100 or the translated speech, so that volume of the audio stream obtained by the terminal 100 is the same as that of the translated speech. Herein, an example in which volume adjustment is performed on the translated speech is used in FIG. 7 for description.

It can be learned from the embodiments in FIG. 4(a) to FIG. 4(d) and FIG. 5(a) to FIG. 5(d) that in the application scenario 1, the downlink channel of the terminal 100 may include an audio stream (including an original speech of the user 2) sent by the terminal 200, and may further include a translated speech. The translated speech herein may be any one of the following: the translated speech of the user 1, the translated speech of the user 2, and the mixed speech of the two translated speeches (the translated speech of the user 1 and the translated speech of the user 2).

Herein, in the translated speech included in the downlink channel, the translated speech of the user 1 may be obtained in step 6 in FIG. 6A or step 11 in FIG. 6D-2, the translated speech of the user 2 may be obtained in step 6 in FIG. 6B or step 12 in FIG. 6D-2, and the mixed speech of the two translated speeches may be obtained in step 10 in FIG. 6D-2. For details, refer to the related descriptions. In an optional embodiment, the translated speech of the user 1 or the user 2 may be translated by the translation server and then sent to the terminal 100. To be specific, the translated speech may be compressed through a network. In some embodiments, the terminal 100 may perform a decoding operation on the translated speech.

When the downlink channel of the terminal 100 includes only the audio stream sent by the terminal 200, and the terminal 100 chooses to play the original speech of the user 2, the terminal 100 sends, to the downlink channel, the audio stream sent by the terminal 200.

When the downlink channel of the terminal 100 includes only the translated speech, the terminal 100 sends the translated speech to the downlink channel.

When the downlink channel of the terminal 100 includes the audio stream sent by the terminal 200 and the translated speech, and the terminal 100 chooses to play the original speech of the user 2, the terminal 100 may perform speech mixing processing on the audio stream sent by the terminal 200 and the translated speech. Herein, a process in which the terminal 100 performs speech mixing processing on the audio stream sent by the terminal 200 and the translated speech is similar to the speech mixing process in the embodiment in FIG. 6D-1 and FIG. 6D-2. The audio stream sent by the terminal 200 and the translated speech may be spliced in a specific sequence, or may be overlapped. For details, refer to the foregoing related descriptions. After obtaining a mixed speech of the audio stream sent by the terminal 200 and the translated speech, the terminal 100 may send the mixed speech to the downlink channel, and play the mixed speech.

Figure 8:
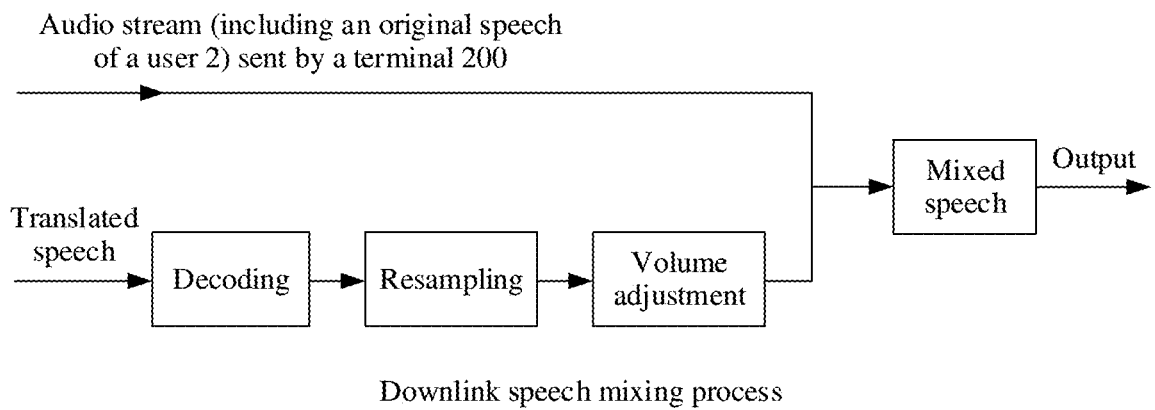
FIG. 8 is a schematic diagram of a downlink speech mixing procedure of a terminal 100 according to this application.

For example, FIG. 8 shows a possible procedure in which the terminal 100 performs speech mixing processing on the audio stream sent by the terminal 200 and the translated speech.

In some embodiments, quality of the audio stream sent by the terminal 200 may be different from that of the translated speech. To ensure an effect of speech mixing, the terminal 100 may perform a resampling operation on the audio stream sent by the terminal 200 or the translated speech. Herein, a lower sampling rate (for example, a sampling rate of the audio stream sent by the terminal 200) in sampling rates corresponding to the audio stream sent by the terminal 200 and the translated speech may be used as a standard to resample other audio (for example, the translated speech), so that the sampling rate of the audio stream sent by the terminal 200 is the same as that of the translated speech.

In some embodiments, volume of the audio stream sent by the terminal 200 may be different from that of the translated speech. To ensure an effect of speech mixing, the terminal 100 may perform a volume adjustment operation on the audio stream sent by the terminal 200 or the translated speech, so that volume of the audio stream sent by the terminal 200 is the same as that of the translated speech. Herein, an example in which volume adjustment is performed on the translated speech is used in FIG. 7 for description.

In a possible implementation, when the terminal 100 enables the function of "Reading my translated text" or the function of "Reading a translated text of the other party", the downlink channel may further include a speech into which the translated text of the user 1 is synthesized or a speech into which the translated text of the user 2 is synthesized. In some cases, the terminal 100 may perform speech mixing processing on audio on the downlink channel. For example, when the downlink channel of the terminal 100 includes the speech into which the translated text of the user 1 is synthesized, the audio stream sent by the terminal 200, and the translated speech, and the terminal 100 chooses to play the original speech of the user 2, the terminal 100 performs speech mixing processing on the speech into which the translated text of the user 1 is synthesized, the audio stream sent by the terminal 200, and the translated speech, then sends a mixed speech to the downlink channel, and plays the mixed speech. In an example of FIG. 8, an audio stream may be further added to the left side of the mixed speech in FIG. 8, and is used to input the speech into which the translated text of the user 1 is synthesized, to perform speech mixing processing on the speech into which the translated text of the user 1 is synthesized, the audio stream sent by the terminal 200, and the translated speech.

In some embodiments, if the terminal 100 plays the translated speech of the user 2, the terminal 100 may not need to display a text. Specifically, in the embodiment in FIG. 4(a) to FIG. 4(d), the terminal 100 may not need to display a text corresponding to the original speech of the user 1, the translated text of the user 1, a text corresponding to the original speech of the user 2, the translated text of the user 2, and the like that are shown in FIG. 4(a) to FIG. 4(d).

Similarly, if the terminal 200 plays the translated speech of the user 1, the terminal 200 may not need to display a text. Specifically, in the embodiment in FIG. 5(a) to FIG. 5(d), the terminal 200 may alternatively not need to display a text corresponding to the original speech of the user 1, the translated text of the user 1, a text corresponding to the original speech of the user 2, the translated text of the user 2, and the like that are shown in FIG. 5(a) to FIG. 5(d). According to the embodiments, the user 1 and the user 2 do not need to pay attention to screens of the terminals, and can talk with each other by placing the terminals close to ears.

Application scenario 2: The user 1 and the user 2 make a video call by using terminals, the user 1 uses Chinese, the user 2 uses English, and the two parties use the translation capability of the terminal 100 to implement automatic two-way translation.

The application scenario 2 is similar to the application scenario 1. A difference lies in that the terminal 100 further needs to continuously collect a picture of the user 1 by using a camera and send the picture to the terminal 200, and the terminal 200 further needs to continuously collect a picture of the user 2 by using a camera and send the picture to the terminal 100.

In some embodiments, the terminal 100 may display, while displaying the picture of the user 2, a text corresponding to communication between the two parties. The picture of the user 2 and the text corresponding to communication between the two parties may be displayed in different display areas, and the text corresponding to communication between the two parties may alternatively be displayed on the picture of the user 2 in a floating manner. This is not limited herein.

Similarly, in some embodiments, the terminal 200 may display, while displaying the picture of the user 1, a text corresponding to communication between the two parties. Herein, a display manner of the terminal 200 is the same as a manner in which the terminal 100 displays the picture of the user 2 and the text corresponding to communication between the two parties at the same time. For details, refer to the related descriptions.

Application scenario 3: The user 1 and the user 2 perform text communication by using terminals, the user 1 uses Chinese, the user 2 uses English, and the two parties use the translation capability of the terminal 100 to implement automatic two-way translation. The user 1 uses the terminal 100, and the user 2 uses the terminal 200.

Before the user 1 and the user 2 perform text communication, a communication connection needs to be established between the terminal 100 and the terminal 200. For the communication connection, refer to the related descriptions in the embodiment in FIG. 1. For example, the terminal 100 may request, by using an instant messaging application (for example, FaceTime, Skype, or WeChat), to make a text call to the terminal 200. The terminal 100 initiates a request for establishing a communication connection, or the terminal 200 may initiate a request for establishing a communication connection.

In some embodiments, after the terminal 100 establishes the communication connection to the terminal 200, the terminal 100 may output prompt information to the user 1, to ask the user whether to enable an automatic two-way translation function. Herein, for details, refer to FIG. 2d and the related descriptions.

Figure 9A:
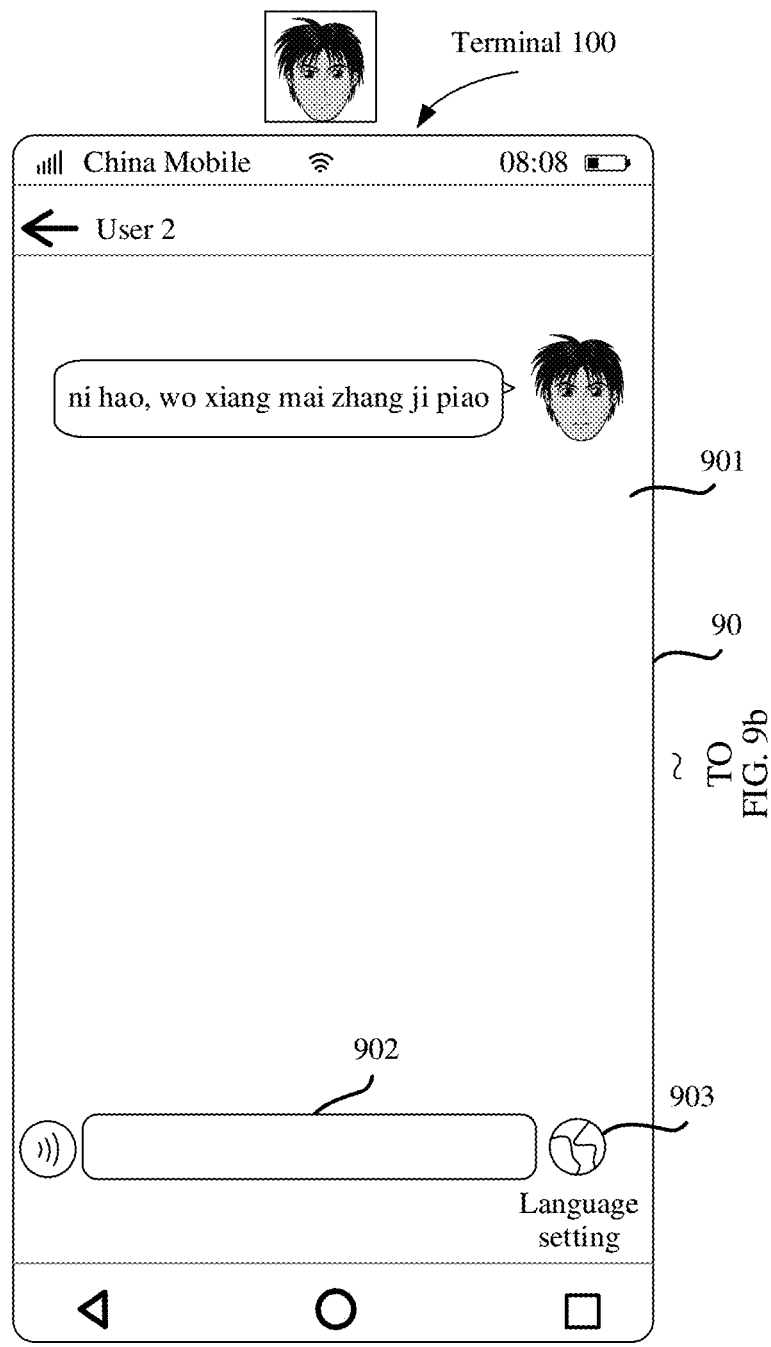
FIG. 9a to FIG. 9d and FIG. 10a to FIG. 10d are schematic diagrams of human-computer interaction according to this application.

For example, after the terminal 100 establishes the communication connection to the terminal 200, and enables the automatic two-way translation function, the terminal 100 may display a call interface 90 shown in FIG. 9a.

In some embodiments, the call interface 90 may include a display area 901 used to display a text corresponding to communication between the user 1 and the user 2.

In some embodiments, the call interface 90 may include a text input box 902. The text input box 902 is used by the user 1 to input a text.

In some embodiments, the call interface 90 may further include a language setting option "Language setting" 903. Herein, a function of the option 903 is the same as a function of the option "Language setting" 306 in the call interface 10 of the terminal 100 in the embodiment in FIG. 3. For details, refer to the related descriptions.

After the terminal 100 establishes the communication connection to the terminal 200, the user 1 and the user 2 may perform text communication. The following describes a translation process in the application scenario 2 by using a specific call example.

The terminal 100 may receive, by using an apparatus such as a touchscreen or a keyboard, the text that is input by the user 1. For example, the user 1 may input a text by using the text input box 902 on the touchscreen. In a specific example, the user 1 inputs a Chinese text "ni hao, wo xiang mai zhang ji piao" to the terminal. For example, referring to FIG. 9a, in some embodiments, the terminal 100 may display the Chinese text in the text display area 901 in the call interface 90. Optionally, the terminal 100 may further display a profile picture or a name of the user 1 in the text display area 901, to identify that the Chinese text is input by the user 1.

After receiving the Chinese text that is input by the user 1, the terminal 100 may translate the Chinese text. Herein, a manner in which the terminal 100 translates the text that is input by the user 1 is similar to a process in which the terminal 100 translates the speech in the application scenario 1. For details, refer to the related descriptions. It may be understood that after translating the text, the terminal 100 may obtain the translated text "Hello, I want to buy a ticket" of the user 1.

Figure 9B:
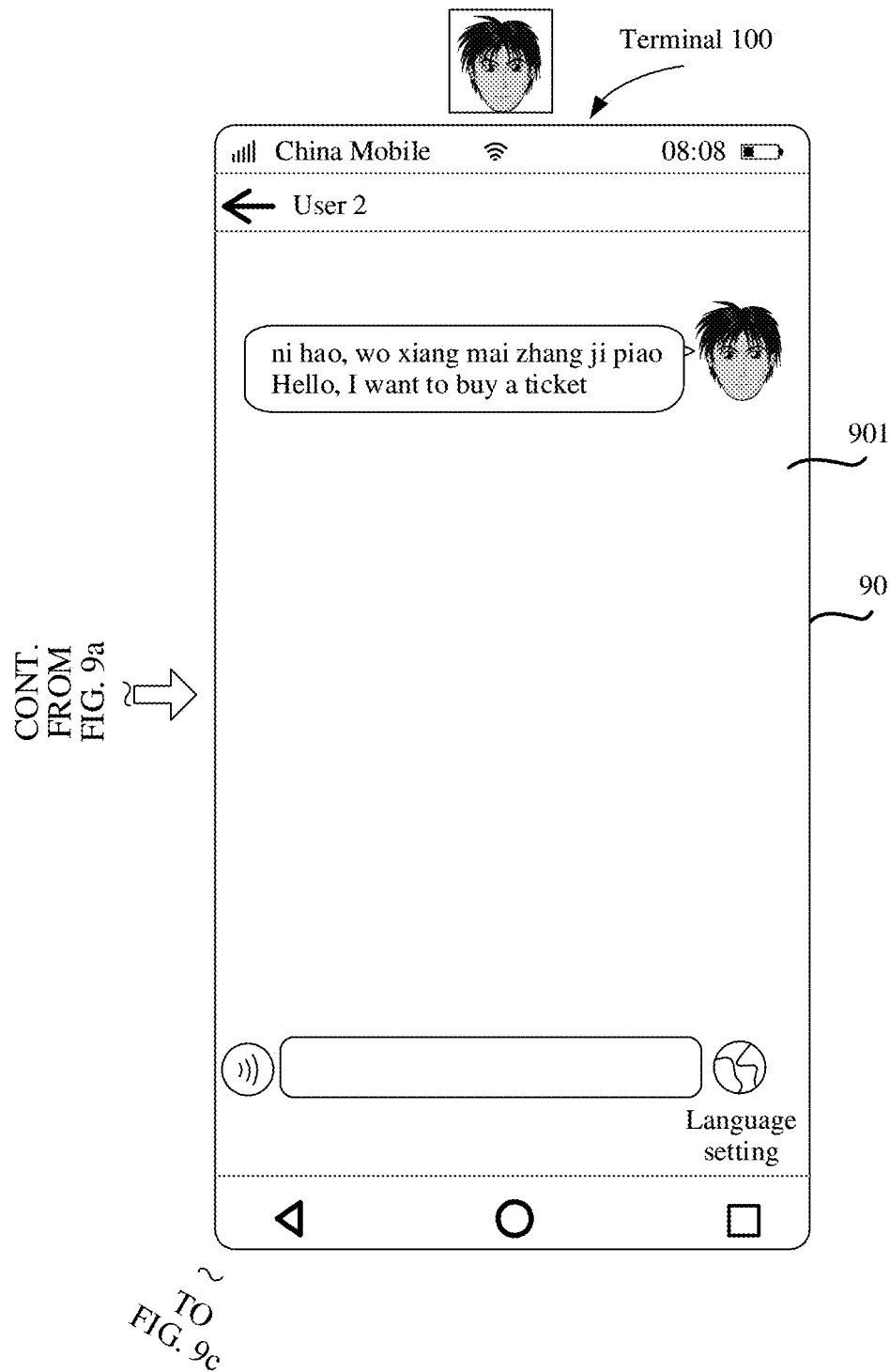
Figure 9C:
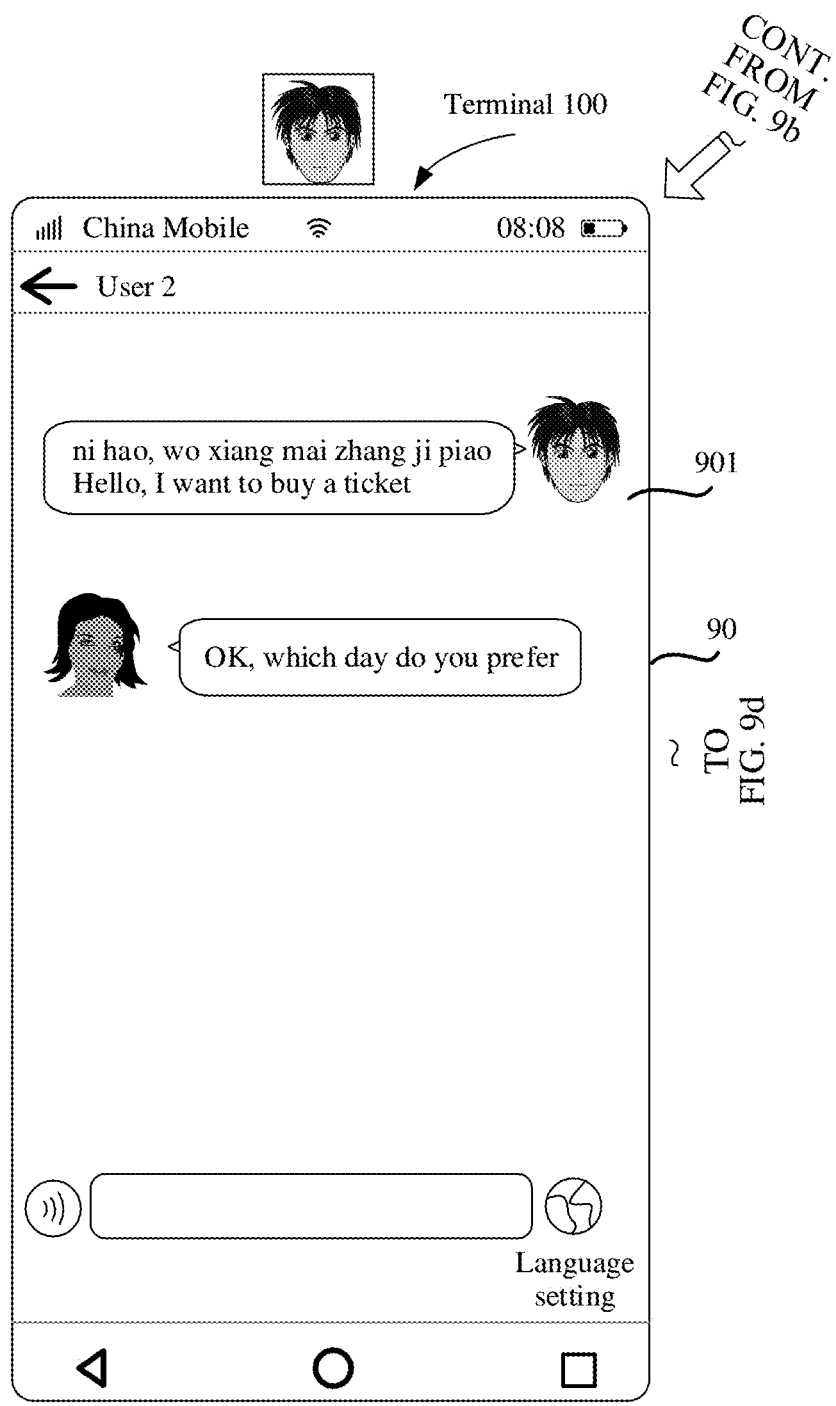

For example, referring to FIG. 9b, in some embodiments, after obtaining the translated text of the user 1, the terminal 100 may display the translated text "Hello, I want to buy a ticket" of the user 1 in the text display area 901 in the call interface 90.

Figure 10A:
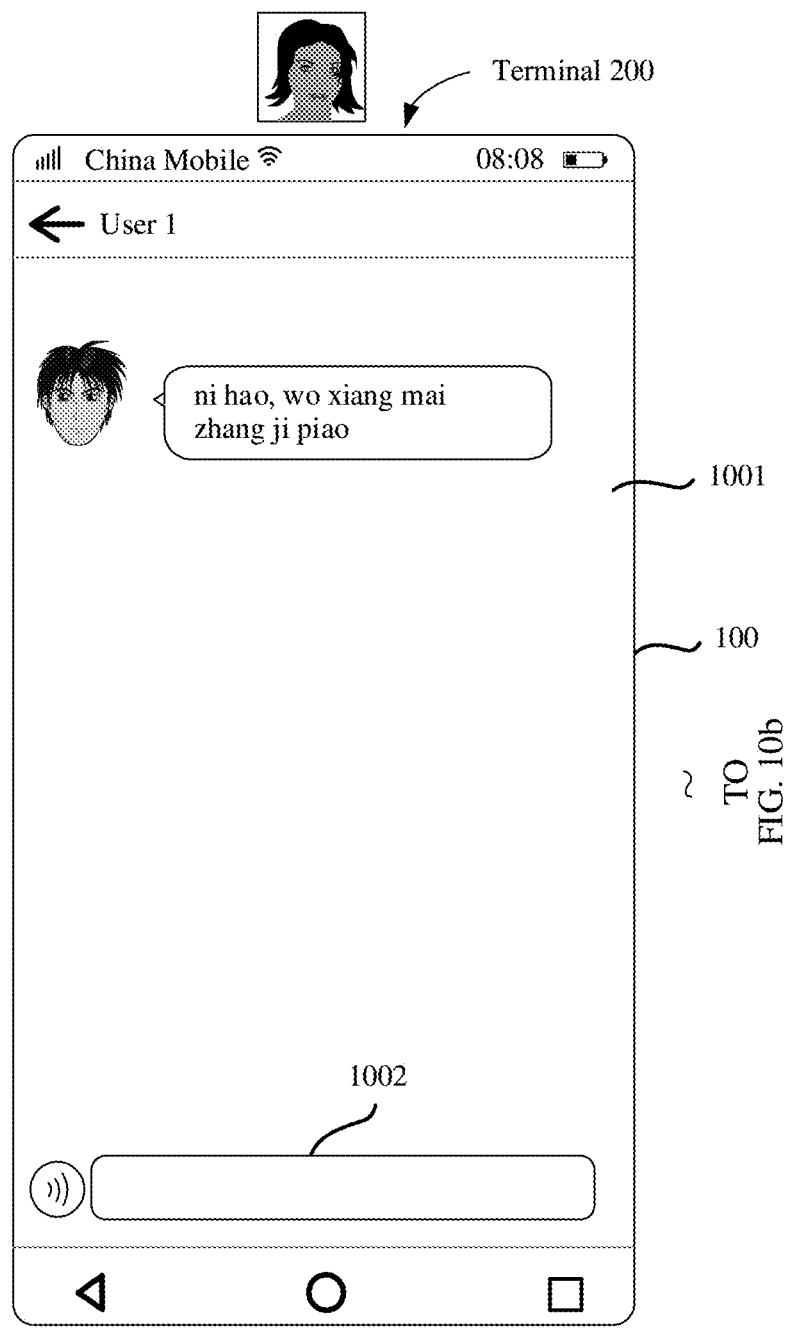

For example, after the terminal 200 establishes a communication connection to the terminal 100, the terminal 200 may display a call interface 100 shown in FIG. 10a.

In some embodiments, the call interface 100 may include a display area 1001 used to display a text corresponding to communication between the user 2 and the user 1.

In some embodiments, the call interface 100 may further include a text input box 1002. The text input box 1002 is used by the user 2 to input a text.

After receiving an original Chinese text that is input by the user 1, the terminal 100 may send the Chinese text to the terminal 200 through the communication connection. Correspondingly, the terminal 200 may receive the Chinese text. For example, referring to FIG. 10a, in some embodiments, the terminal 200 may display the received Chinese text in the display area 1001. Optionally, the terminal 200 may further display a profile picture or a name of the user 1 in the text display area 1001, to identify that the Chinese text is the original text of the user 1.

Figure 10B:
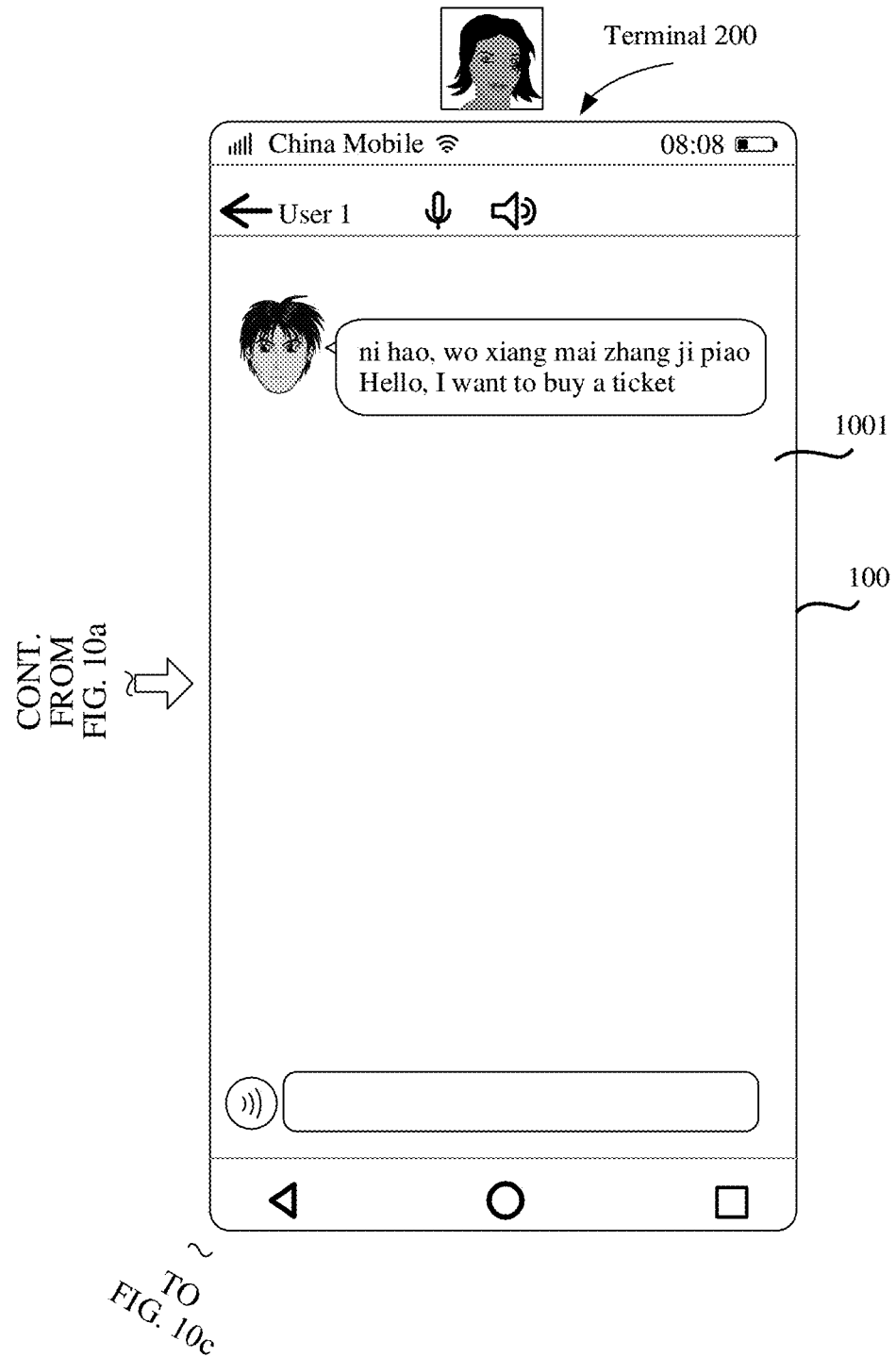

After obtaining the translated text "Hello, I want to buy a ticket" of the user 1, the terminal 100 may further send the translated text to the terminal 200 through the communication connection. For example, referring to FIG. 10b, in some embodiments, after receiving the translated text of the user 1, the terminal 200 may display the translated text "Hello, I want to buy a ticket" of the user 1 in the text display area 1001 in the call interface 100.

Figure 10C:
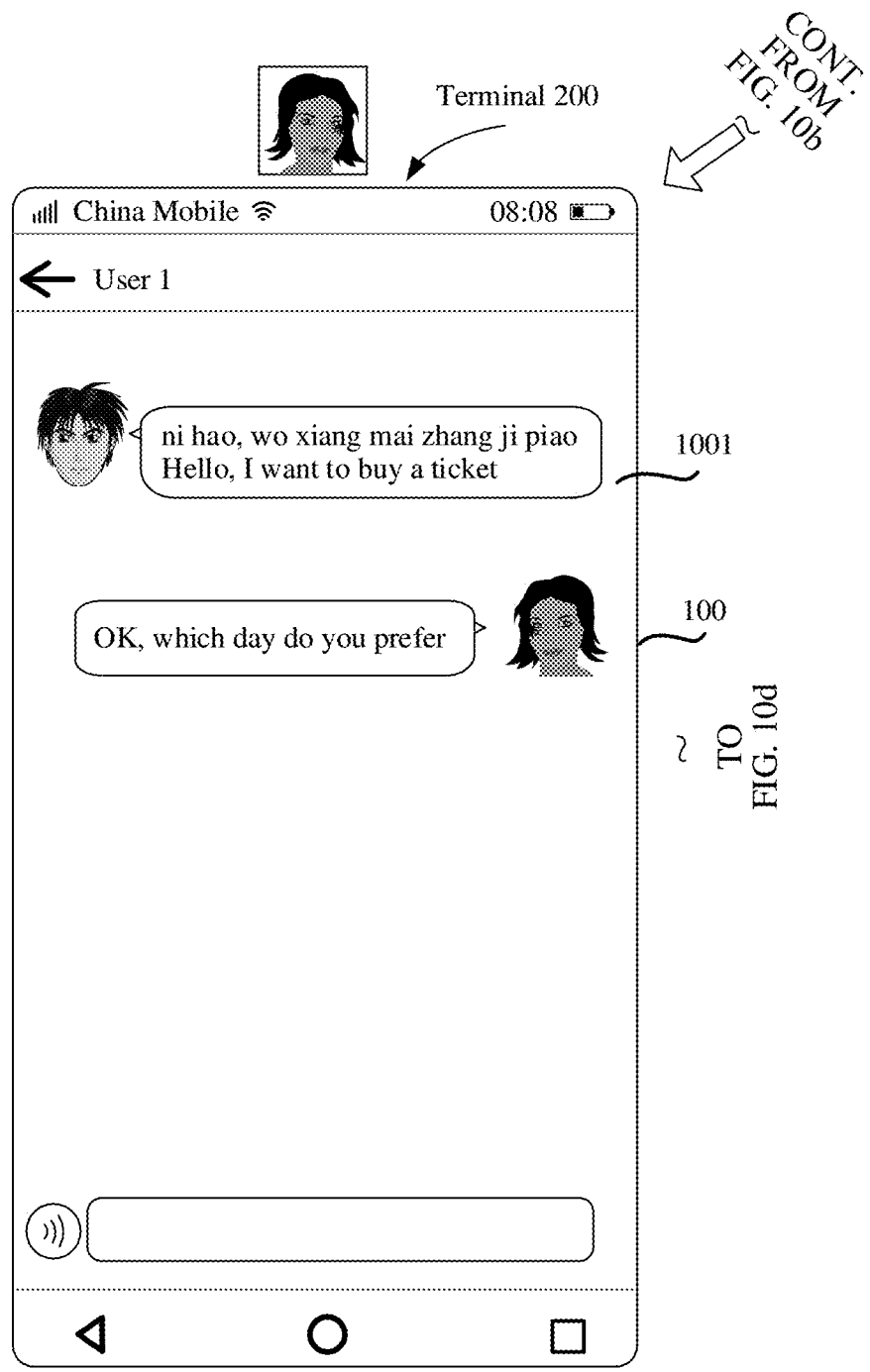

After the terminal 200 displays the translated text of the user 1, the user 2 may learn of a request of the user 1, and input an English text "OK, which day do you prefer" to the terminal 200. The user 2 may input the text to the terminal 200 by using an apparatus such as a touchscreen or a keyboard. For example, the user 2 may input a text by using the text input box 1002 on the touchscreen. After the terminal 200 obtains the English text that is input by the user 2, in some embodiments, for example, referring to FIG. 10c, the terminal 200 may display the English text in the text display area 1001 in the call interface 100.

After obtaining the English text that is input by the user 2, the terminal 200 may send the English text to the terminal 100 through the communication connection. Correspondingly, the terminal 100 may receive the English text. After receiving the English text sent by the terminal 200, the terminal 100 may translate the English text. Herein, a manner in which the terminal 100 translates the English text is similar to a process in which the terminal 100 translates the speech in the application scenario 1. For details, refer to the related descriptions. It may be understood that after translating the text, the terminal 100 may obtain the translated text "hao de, ni xiang ding na tian de" of the user 2.

Figure 9D:
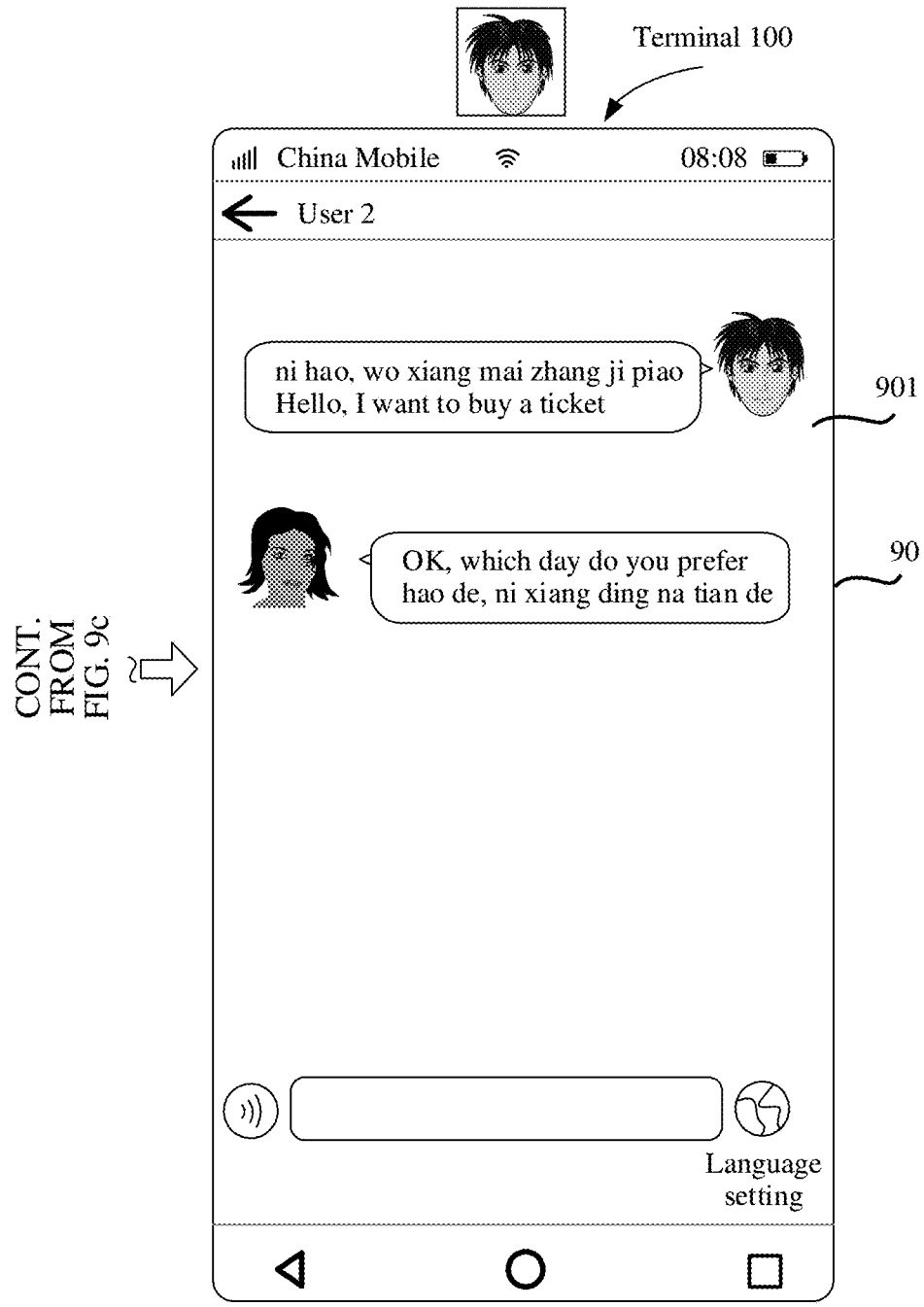

For example, referring to FIG. 9d, after obtaining the translated text of the user 2, the terminal 100 may display the translated text "hao de, ni xiang ding na tian de" of the user 2 in the text display area 901 in the call interface 90.

Figure 10D:
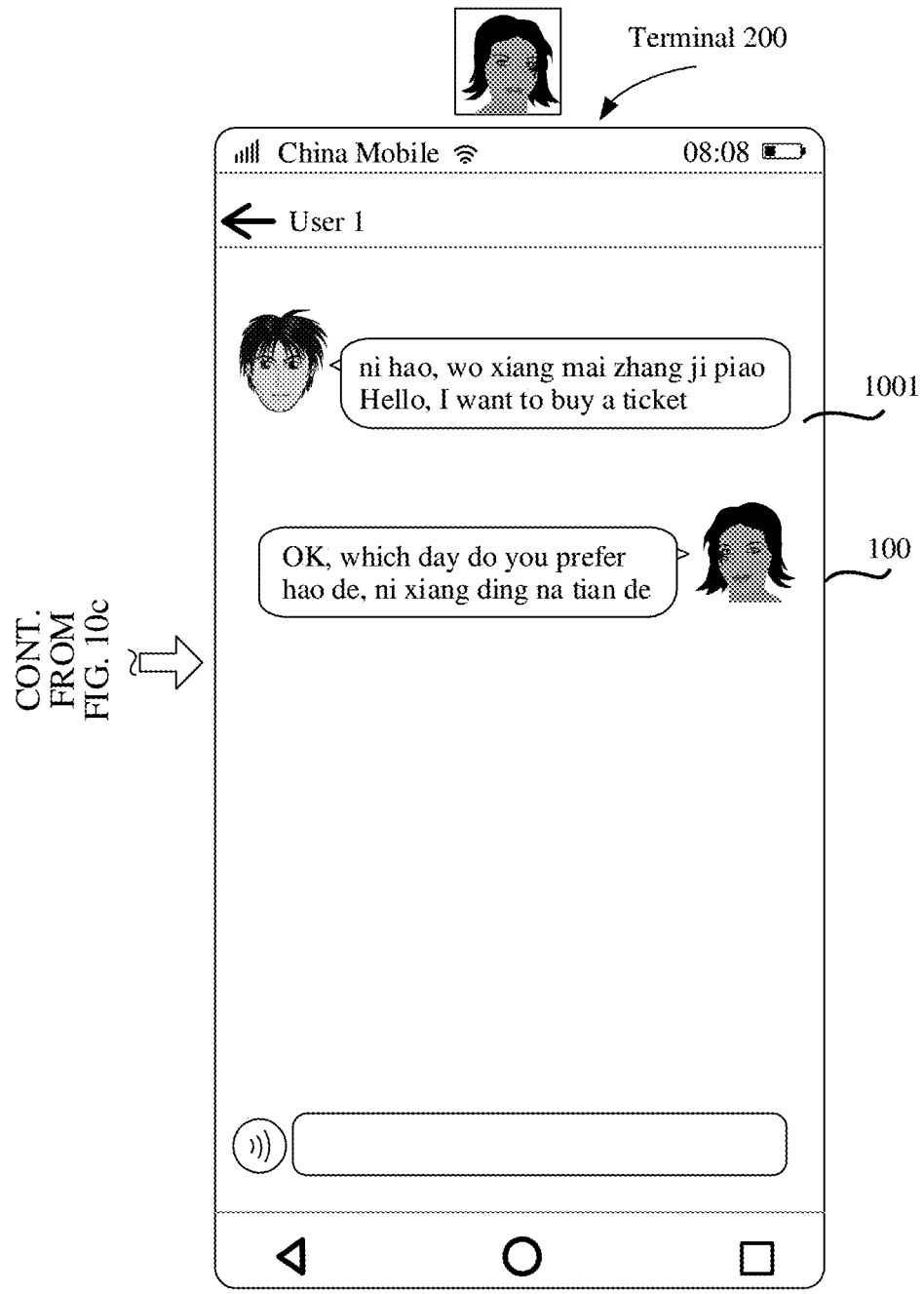

After obtaining the translated text of the user 2, the terminal 100 may further send the translated text of the user 2 to the terminal 200 through the communication connection. Correspondingly, the terminal 200 may obtain the translated text of the user 2. For example, referring to FIG. 10d, in some embodiments, after obtaining the translated text of the user 2, the terminal 200 may display the translated text "hao de, ni xiang ding na tian de" of the user 2 in the text display area 1001 in the call interface 100.

According to the embodiments in FIG. 9(a) to FIG. 9(d) and FIG. 10(a) to FIG. 10(d), the user 1 and the user 2 complete simple two-sentence text communication. Subsequently, the user 1 and the user 2 may further continue to communicate with each other in the foregoing manner.

Figure 11:
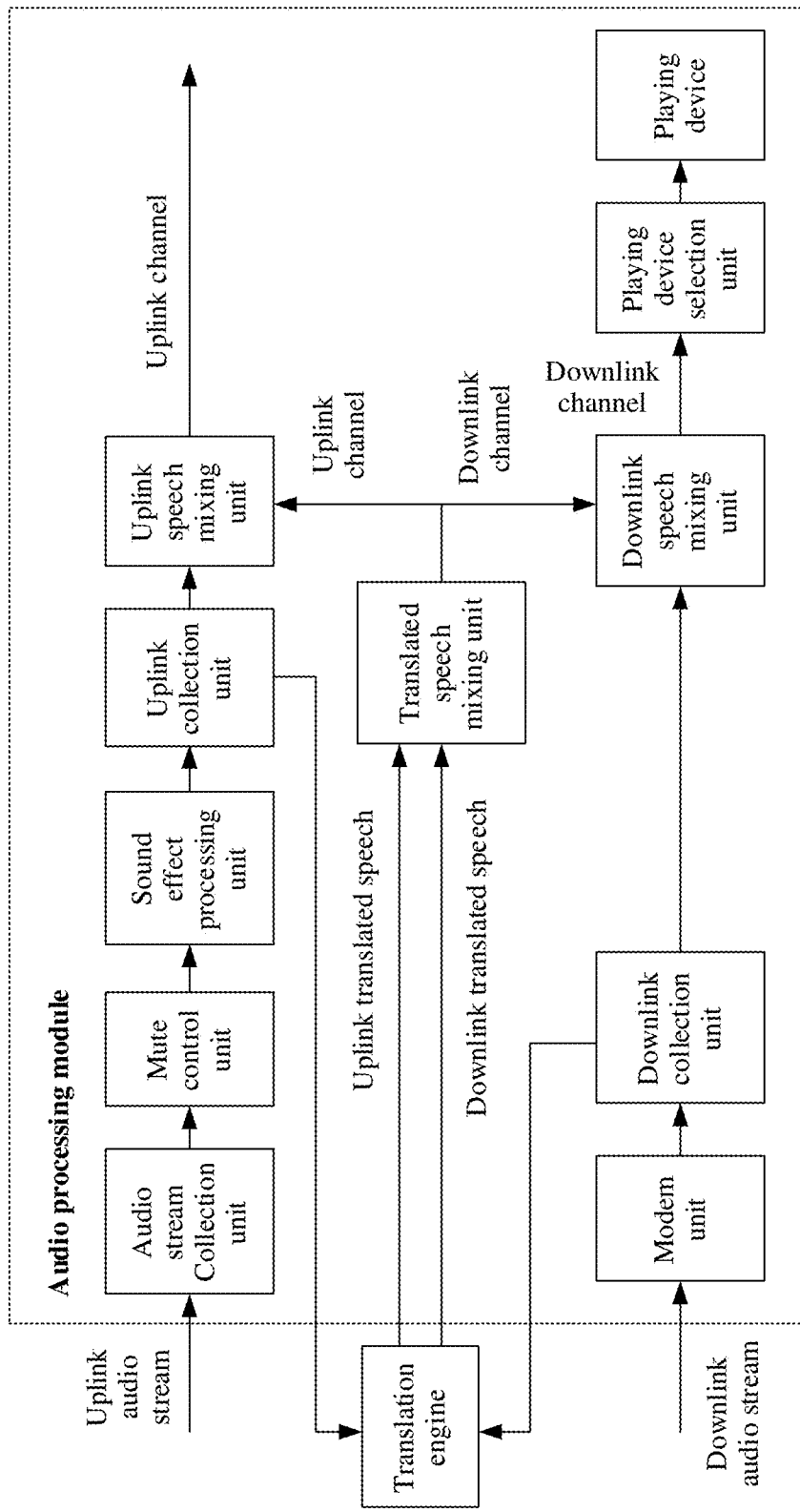
FIG. 11 is a schematic structural diagram of an audio processing module according to this application.

FIG. 11 is a possible schematic structural diagram of a translation engine and an audio processing module. The translation engine and the audio processing module may be applied to the terminal 100. The terminal 100 may implement, by using the translation engine and the audio processing module, automatic two-way translation performed during a voice call between the user 1 and the user 2 in the foregoing application scenario 1.

The translation engine and the audio processing module are independent of each other. The audio processing module is responsible for outputting uplink and downlink audio streams (including uplink and downlink original speeches) to the translation engine. The translation engine outputs the translated uplink and downlink translated speeches to the audio processing module.

The translation engine is configured to translate the uplink and downlink audio streams that are output by the audio processing module. Herein, the translation engine may perform translation processing by using a local translation capability of the terminal 100, or may send the uplink and downlink audio streams to a translation server, and the translation server translates the uplink and downlink audio streams. In some embodiments, in a translation process, the translation engine may send different original speeches to different translation servers for translation processing. The translation engine may be a software module.

As shown in FIG. 11, the audio processing module may include the following components: an audio stream collection unit, a mute control unit, a sound effect processing unit, an uplink collection unit, a modem unit, a downlink collection unit, a translated speech mixing unit, an uplink speech mixing unit, an uplink channel, a downlink speech mixing unit, a downlink channel, a playing device selection unit, and a playing device.

The audio stream collection unit is configured to continuously collect an input audio stream. The audio stream may include at least one of the following: a speech that is input by the user 1, a background sound, or an environmental sound. The audio stream collection unit may be a microphone.

The mute control unit is configured to: enable/disable a call mute function of the terminal 100 based on a user operation.

The sound effect processing unit is configured to perform processing such as noise reduction or echo suppression on the continuously collected audio stream.

The uplink collection unit is configured to: obtain the audio stream obtained through the processing such as noise reduction or echo suppression, and send the audio stream to the uplink speech mixing unit and the translation engine.

The modem unit is configured to demodulate a downlink audio stream sent by the terminal 200. The modem unit may be a modem.

The downlink collection unit is configured to: obtain the audio stream demodulated by the modem unit, and send the audio stream to the downlink speech mixing unit and the translation engine.

The translated speech mixing unit is configured to: receive an uplink translated speech and/or a downlink translated speech that are/is output by the translation engine, and process the uplink translated speech and/or the downlink translated speech based on call modes of the user 1 and the user 2. Herein, for a function of the translated speech mixing unit, refer to the related descriptions of the steps in the embodiments in FIG. 6A, FIG. 6B, and FIG. 6D-1 and FIG. 6D-2.

The uplink speech mixing unit is configured to: receive the audio stream obtained by the uplink collection unit and/or the translated speech that is output by the translation engine, and process, based on the call mode of the user 2, the audio stream obtained by the uplink collection unit and/or the translated speech that is output by the translation engine. Herein, for a function of the uplink speech mixing unit, refer to the related descriptions in the embodiment in FIG. 7.

The uplink channel is configured to send, to the terminal 200 through a communication connection, audio that is output by the uplink speech mixing unit. The uplink channel may be implemented as an antenna, a mobile communications module, a wireless communications module, or the like.

The downlink speech mixing unit is configured to: receive the audio stream obtained by the downlink collection unit and/or the translated speech that is output by the translation engine, and process, based on the call mode of the user 1, the audio stream obtained by the downlink collection unit and/or the translated speech that is output by the translation engine. Herein, for a function of the downlink speech mixing unit, refer to the related descriptions in the embodiment in FIG. 8.

The downlink channel is configured to send, to the playing device, audio that is output by the downlink speech mixing unit.

The playing device selection unit is configured to select a device that is in the terminal 100 and that is configured to play the audio that is output by the downlink speech mixing unit.

The playing device is configured to play the audio that is output by the downlink speech mixing unit. The playing device may include a speaker, an earpiece, a headset, and the like.

Functions of the mute control unit, the sound effect processing unit, the uplink collection unit, the downlink collection unit, the translated speech mixing unit, the uplink speech mixing unit, the downlink speech mixing unit, and the playing device selection unit may be implemented in a processor of the terminal 100.

It may be understood that the mute control unit, the sound effect processing unit, the uplink collection unit, the downlink collection unit, and the playing device selection unit may be deleted or added based on a design requirement of an actual product. For example, in some embodiments, the mute control unit may not be disposed.

The following describes an implementation of the terminal 100 according to this application.

In this application, the terminal 100 may be a portable electronic device such as a mobile phone, a tablet computer, a personal digital assistant (PDA), or a wearable device. An example embodiment of the portable electronic device includes but is not limited to a portable electronic device using iOS, Android, Microsoft, or another operating system. The portable electronic device may alternatively be another portable electronic device, for example, a laptop computer with a touch-sensitive surface (for example, a touch panel). It should be further understood that in some other embodiments of this application, the terminal may alternatively be a desktop computer with a touch-sensitive surface (for example, a touch panel), but not the portable electronic device.

Figure 12:
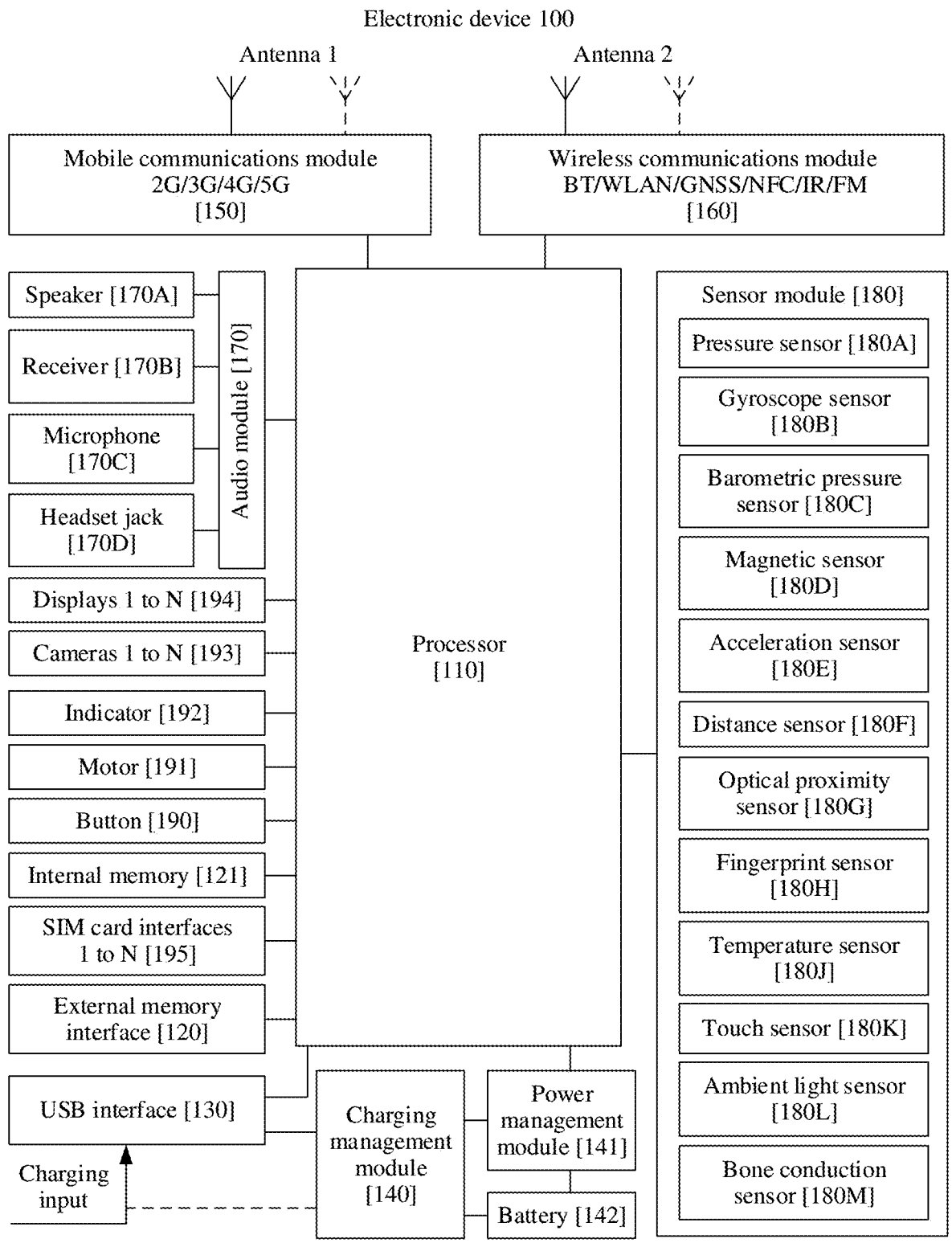
FIG. 12 is a schematic structural diagram of a terminal 100 according to this application.

FIG. 12 shows a possible structure of the terminal 100 according to this application.

The terminal 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, a proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the terminal 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments of this application, the processor 110 may be configured to process an uplink audio stream collected by the terminal 100 and a downlink audio stream sent by the terminal 200. Specifically, the processor 110 may perform processing such as noise reduction or echo suppression on the uplink audio stream collected by the terminal 100, and translate the processed uplink audio stream. The processor 110 may further demodulate the downlink audio stream sent by the terminal 200, and translate the demodulated downlink audio stream. The processor 110 may further control a communications unit to communicate with a translation server, to obtain an uplink translated speech and a downlink translated speech. The processor 110 is further configured to process the uplink translated speech, the downlink translated speech, an uplink original speech, and a downlink original speech based on call modes of the user 1 and the user 2. For details, refer to the embodiments in FIG. 6A, FIG. 6B, FIG. 6D-1 and FIG. 6D-2, FIG. 7, and FIG. 8 and the related descriptions.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through an I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 16o through the UART interface, to implement a Bluetooth function. In some embodiments, the audio module 170 may transmit an audio signal to the wireless communications module 16o through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the terminal 100, or may be configured to transmit data between the terminal 100 and a peripheral device, or may be configured to connect to a headset to play audio by using the headset. The interface may be further configured to connect to another terminal such as an AR device.

It may be understood that an interface connection relationship between the modules that is shown in this embodiment of the present invention is merely an example for description, and does not constitute a limitation on the structure of the terminal 100. In some other embodiments of this application, the terminal 100 may alternatively use an interface connection manner different from that in the embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the terminal 100. The charging management module 140 may further supply power to the terminal by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented through the antenna 1, the antenna 2, the mobile communications module 150, the wireless communications module 160, the modem processor, the baseband processor, and the like.

The antenna 1 and the antenna 2 are configured to: transmit and receive an electromagnetic wave signal. Each antenna in the terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the terminal 100. The mobile communications module 150 may include at least one filter, a switch, a power amplifier, a low noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the terminal 100. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 10. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communications module 150 of the terminal 100 are coupled, and the antenna 2 and the wireless communications module 160 of the terminal 100 are coupled, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS)), and/or a satellite based augmentation system (SBAS).

The terminal 100 implements a display function by using the GPU, the display 194, the application processor, and the like. The GPU is a microprocessor for image processing, and is connected to the display 194 and the application processor. The GPU is configured to perform: mathematical and geometric calculation, and render an image. The processor 110 may include one or more GPUs, which execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode or an active-matrix organic light emitting diode (AMOLED), a flexible light-emitting diode (FLED), a mini LED, a micro LED, a micro OLED, a quantum dot light emitting diode (QLED), or the like. In some embodiments, the terminal 100 may include one or N displays 194, where N is a positive integer greater than 1.

The terminal 100 can implement the photographing function by using the ISP, the camera 193, the video codec, the GPU, the display 194, the application processor, and the like.

The ISP is configured to process data fed back by the camera 193. For example, during photographing, a shutter is opened, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image is generated for an object by using the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal of a standard format such as RGB or YUV. In some embodiments, the terminal 100 may include one or N cameras 193, where N is a positive integer greater than 1. In some embodiments of this application, the camera 193 may be configured to capture a picture of the user 1.

The digital signal processor is configured to process a digital signal. In addition to the digital image signal, the digital signal processor can further process another digital signal. For example, when the terminal 100 selects a frequency, the digital signal processor is configured to perform Fourier transform on frequency energy and the like.

The video codec is configured to: compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to connect to an external storage card, for example, a micro SD card, to extend a storage capability of the terminal 100. The external storage card communicates with the processor 110 through the external memory interface 120, to implement a data storage function, for example, store files such as music and a video in the external storage card.

The internal memory 121 may be configured to store computer executable program code, where the executable program code includes an instruction. The processor 110 performs various function applications of the terminal 100 and data processing by running the instruction stored in the internal memory 121. The internal memory 121 may include a program storage area and a data storage area. The program storage region may store an operating system, an application required by at least one function (for example, a sound playing function or an image playing function), and the like. The data storage area may store data (for example, audio data or a phone book) created in a use process of the terminal 100, and the like. In addition, the internal memory 121 may include a high-speed random access memory, and may further include a nonvolatile memory, for example, at least one magnetic disk storage device, a flash memory device, or a universal flash storage (UFS).

The terminal 100 can implement an audio function by using the audio module 170, the speaker 170A, the receiver 170B, the microphone 170C, the headset interface 170D, the application processor, and the like, for example, music playing or recording.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The terminal 100 may be used to listen to music or answer a call in a hands-free mode over the speaker 170A. In some embodiments of this application, the speaker 170A may be configured to play an original speech and a translated speech that are of the user 2, and a translated speech of the user 1.

The receiver 170B, also referred to as an "earpiece", is configured to convert an audio electrical signal into a sound signal. When a call is answered or voice information is listened to by using the terminal 100, the receiver 170B may be put close to a human ear to listen to a voice. In some embodiments of this application, the receiver 170B may be configured to play the original speech and the translated speech that are of the user 2, and the translated speech of the user 1.

The microphone 170C, also referred to as a "mike" or a "microphone", is configured to convert a sound signal into an electrical signal. When making a call or sending voice information, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like. In some embodiments of this application, the microphone 170 C may be configured to collect an original audio stream that is input by the user 1.

The headset jack 170D is configured to connect to a wired headset. The headset jack 170D may be a USB interface 130, a 3.5 mm open mobile terminal platform (OMTP) standard interface, or cellular telecommunications industry association of the USA (CTIA) standard interface.

The pressure sensor 180A is configured to sense a pressure signal, and can convert the pressure signal into an electrical signal.

The gyro sensor 180B may be configured to determine a movement posture of the terminal 100.

The barometric pressure sensor 180C is configured to measure barometric pressure.

The magnetic sensor 180D includes a Hall sensor. The terminal 100 may detect opening and closing of a flip leather case by using the magnetic sensor 180D.

The acceleration sensor 180E may detect magnitude of accelerations in various directions (usually on three axes) of the terminal 100, The distance sensor 180F is configured to measure a distance.

For example, the optical proximity sensor 180G may include a light-emitting diode (LED) and an optical detector, for example, a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100.

The ambient light sensor 180L is configured to sense ambient light brightness.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature.

The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation on or near the touch sensor 180K. The touch sensor may transfer a detected touch operation to the application processor, to determine a type of a touch event. Visual output related to the touch operation may be provided by using the display 194. In some other embodiments, the touch sensor 180K may alternatively be disposed on a surface of the terminal 100 at a location different from that of the display 194.

The bone conduction sensor 180M may obtain a vibration signal. In some embodiments, the bone conduction sensor 180M may obtain a vibration signal of a vibration bone of a human vocal part.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be used for an incoming call vibration prompt, or may be used for a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types.

A software system of the terminal 100 may use a layered architecture, an event-driven architecture, a microkernel architecture, a micro service architecture, or a cloud architecture. In this embodiment of the present invention, an Android system with the layered architecture is used as an example to describe a software structure of the terminal 100.

Figure 13:
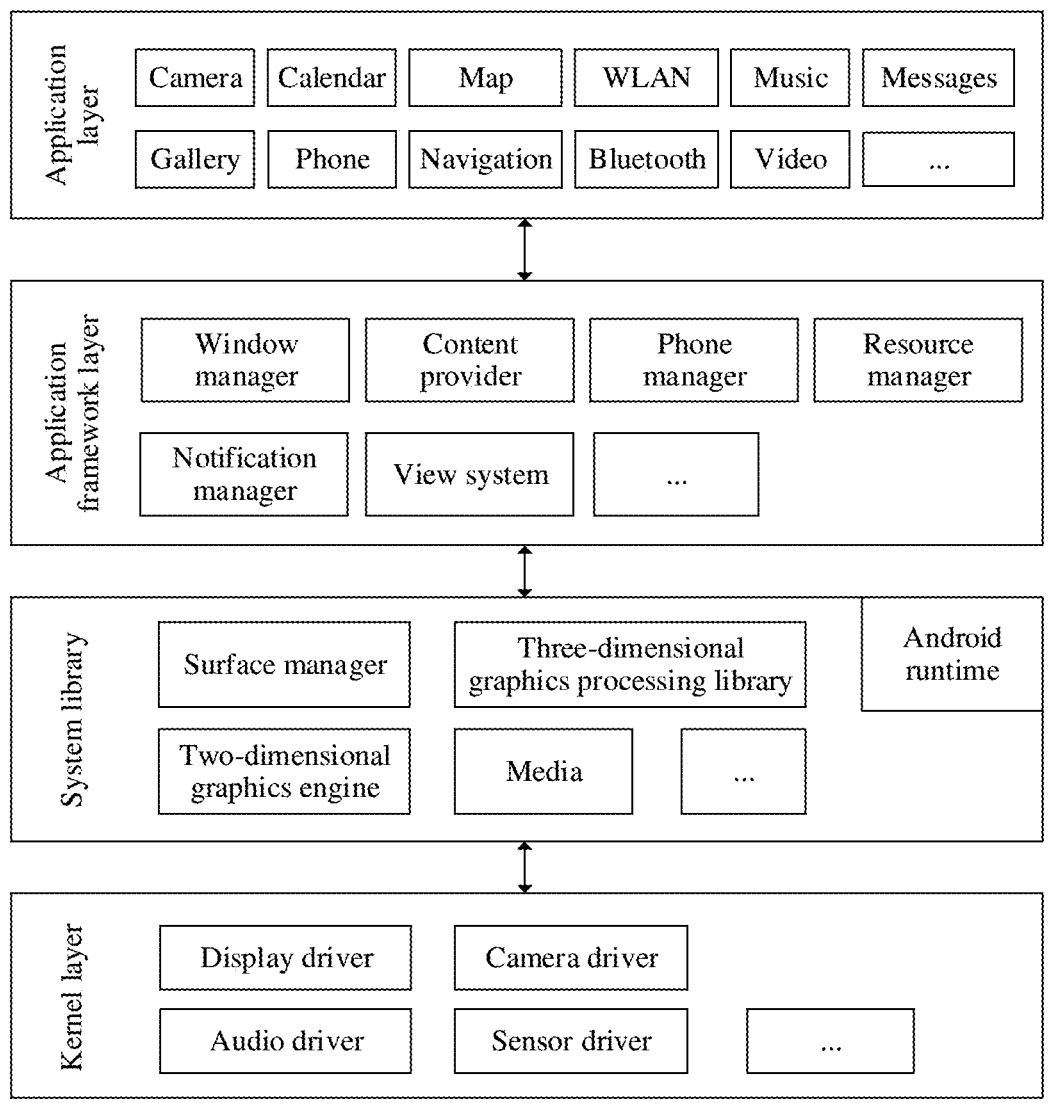
FIG. 13 is a block diagram of a software structure of a terminal 100 according to this application.

FIG. 13 is a block diagram of a software structure of the terminal 100 according to an embodiment of the present invention.

In the layered architecture, software is divided into several layers, and each layer has a clear role and task. The layers communicate with each other through a software interface. In some embodiments, the Android system is divided into four layers, namely, an application layer, an application framework layer, an Android runtime and system library, and a kernel layer from top to bottom.

The application layer may include a series of application packages.

As shown in FIG. 13, the application packages may include applications such as Camera, Gallery, Calendar, Phone, Map, Navigation, WLAN, Bluetooth, Music, Videos, and Messages.

The application framework layer provides an application programming interface (API) and a programming framework for the application at the application layer. The application framework layer includes some predefined functions.

As shown in FIG. 13, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a bookmark, an address book, and the like.

The view system includes visual controls such as a control for displaying a text and a control for displaying a picture. The view system can be configured to construct an application. A display interface may include one or more views. For example, a display interface including a Messaging notification icon may include a text display view and a picture display view.

The phone manager is configured to provide a communication function of the terminal 100, for example, management of a call status (including answering or declining).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is played, the terminal vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playing and recording of a plurality of frequently used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal 100 with reference to a capture photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a camera application icon. A camera application invokes an interface at the application framework layer to enable the camera application, then enables a camera driver by invoking the kernel layer, and captures a static image or a video by using the camera 193.

Based on the embodiments shown in FIG. 1 to FIG. 11 and the terminal 100 described in the embodiment in FIG. 12, the following describes an audio processing method provided in this application.

FIG. 14 is a schematic flowchart of an audio processing method according to this application. As shown in FIG. 14, the method includes the following steps.

S101: A first terminal collects an original speech of a first user, obtains a translated speech of the first user that is obtained by translating the original speech of the first user, receives an original speech of a second user that is sent by a second terminal, and obtains a translated speech of the second user that is obtained by translating the original speech of the second user.

Specifically, the first terminal may be the terminal 100 in the embodiment in FIG. 1, the first user is the user 1, the second terminal may be the terminal 200 in the embodiment in FIG. 1, and the second user is the user 2. The first user uses a first language, and the second user uses a second language. The first language is different from the second language. In this application, due to a language difference, a translation capability of the first terminal needs to be used during a call between the first user and the second user. Herein, for the translation capability, refer to the related descriptions in the embodiment in FIG. 1.

The first terminal establishes a communication connection to the second terminal through a communications network. Herein, for the communication connection established between the first terminal and the second terminal, refer to the related descriptions in the embodiment in FIG. 1.

In this application, the first terminal may continuously collect an input audio stream. The first terminal may collect the input audio stream by using a built-in microphone, or may collect the input audio stream by using an external device of the first terminal. Herein, the external device may be a headset with a microphone, or may be a separate microphone. The audio stream collected by the first terminal may include at least one of the following: a speech that is input by the first user, a background sound, or an environmental sound. The speech that is input by the first user is actual content of the call between the first user and the second user, and the background sound or the environmental sound is a sound (for example, a bird sound or a car horn sound) in a call environment of the first user. Herein, the speech that is input by the first user is the original speech of the first user.

In some embodiments, the first terminal has a call mute function. If the first user enables the call mute function of the first terminal, the first terminal temporarily stops collecting the audio stream.

In some embodiments, the first terminal may perform processing such as noise reduction or echo suppression on the continuously collected audio stream. In this way, the original speech of the first user in the audio stream can be highlighted, impact of the background sound or the environmental sound in the audio stream on the original speech of the first user can be reduced, and subsequent translation quality can be ensured.

After collecting the original speech of the first user, the first terminal may obtain the translated speech of the first user that is obtained by translating the original speech of the first user. The first terminal may obtain the translated speech of the first user in any one of the following manners:

(1) The translated speech of the first user is obtained by the first terminal through local translation.

In some embodiments, the first terminal may translate the original speech of the first user in the following steps: (a) speech recognition; (b) text correction; (c) translation; and (d) speech synthesis. Herein, for specific operations of the steps in the translation, refer to the foregoing related descriptions.

(2) The first terminal sends the original speech of the first user to a translation server, and the translation server translates the original speech of the first user into the translated speech of the first user, and then sends the translated speech of the first user to the first terminal.

The translation server is a server (for example, a Google translation server or a Microsoft translation server) that has a translation function. A process in which the translation server translates the original speech of the first user into the translated speech of the first user is the same as the foregoing translation process of the first terminal. For details, refer to the related descriptions. In some embodiments, the translation server has a requirement on a format of the input audio stream. Therefore, the first terminal may perform processing such as coding or resampling on the collected audio stream, to obtain an audio stream that meets the format requirement, and then send the audio stream to the translation server. In some embodiments, a translated speech returned by the translation server to the first terminal may be compressed. Therefore, after receiving the translated speech of the first user, the first terminal may perform processing such as decoding or resampling on the translated speech of the first user.

In this application, the first terminal may receive the original speech of the second user that is sent by the second terminal. The second terminal may also continuously collect an input audio stream, where the audio stream includes the original speech of the second user. A process in which the second terminal collects the original speech of the second user is the same as a process in which the first terminal collects the original speech of the first user. For details, refer to the related descriptions.

After receiving the original speech of the second user, the first terminal may obtain the translated speech of the second user that is obtained by translating the original speech of the second user. Similar to the translated speech of the first user, the translated speech of the second user may be obtained by the first terminal through local translation. Alternatively, the translation server translates the original speech of the second user into the translated speech of the second user, and then sends the translated speech of the second user to the first terminal. For details, refer to the foregoing related descriptions.

S102: The first terminal sends a first translated speech and/or the original speech of the first user to the second terminal based on a first setting.

In some embodiments, the first setting reflects a call mode of the second terminal. The call mode of the second terminal indicates whether the second user can hear the original speech of the first user, the translated speech of the first user, the translated speech of the second user, and the like. In a possible implementation, the call mode of the second terminal may be the call mode of the user 2 that is mentioned above. For details, refer to the modes in Table 2, and refer to the related descriptions. Herein, the call mode of the second terminal may be set by the first user on the first terminal, or may be set by the first terminal by default.

The first translated speech includes the translated speech of the first user and/or the translated speech of the second user. Specific content of the first translated speech is determined based on the first setting. In some embodiments, the first translated speech may include the audio sent to the uplink channel in steps 1 to 4 in FIG. 6A, steps 1 to 4 in FIG. 6B, or steps 4 to 7 in FIG. 6D-1 and FIG. 6D-2. For details, refer to the related descriptions.

In this application, the first terminal determines, based on the first setting, specific content of audio to be sent to the second terminal. For example, in a possible implementation, if the first setting reflects that the second user can hear the original speech of the first user and the translated speech of the first user, the first terminal sends the original speech of the first user and the first translated speech to the second terminal, where the first translated speech includes the translated speech of the first user. If the first setting reflects that the second user can hear the original speech of the first user, the translated speech of the first user, and the translated speech of the second user, the first terminal sends the original speech of the first user and the first translated speech to the second terminal, where the first translated speech includes the translated speech of the first user and the translated speech of the second user.

In some embodiments, when the first terminal obtains the translated speech of the first user and the translated speech of the second user at the same time, and the first translated speech includes the translated speech of the first user and the translated speech of the second user based on the first setting, the first translated speech is specifically a first mixed speech obtained after the first terminal splices or overlaps the translated speech of the first user and the translated speech of the second user. Herein, for a process in which the first terminal obtains the first mixed speech, refer to step 4 in FIG. 6D-1 and FIG. 6D-2.

In some embodiments, when the first terminal obtains the first translated speech and the original speech of the first user at the same time, and the first setting includes: sending the first translated speech and the original speech of the first user, that the first terminal sends a first translated speech and/or the original speech of the first user to the second terminal based on a first setting includes: The first terminal sends, to the second terminal, a second mixed speech obtained after the first translated speech and the original speech of the first user are spliced or overlapped. Herein, for a process in which the first terminal obtains the second mixed speech, refer to the uplink speech mixing process shown in FIG. 7. Herein, that the first setting includes sending the first translated speech and the original speech of the first user means that the second user can hear the first translated speech and the original speech of the first user.

S103: The first terminal plays a second translated speech and/or the original speech of the second user based on a second setting.

In some embodiments, the second setting reflects a call mode of the first terminal. The call mode of the first terminal indicates whether the first user can hear the original speech of the second user, the translated speech of the second user, the translated speech of the first user, and the like. In a possible implementation, the call mode of the first terminal may be the call mode of the user 1 that is mentioned above. For details, refer to the modes in Table 1, and refer to the related descriptions. Herein, the call mode of the first terminal may be set by the first user on the first terminal, or may be set by the first terminal by default.

The second translated speech includes the translated speech of the first user and/or the translated speech of the second user. Specific content of the second translated speech is determined based on the second setting. In some embodiments, the second translated speech may include the audio sent to the downlink channel in steps 5 to 7 in FIG. 6A, steps 5 to 7 in FIG. 6B, or steps 10 to 13 in FIG. 6D-1 and FIG. 6D-2. For details, refer to the related descriptions.

In this application, the first terminal determines specific content of to-be-played audio based on the second setting. For example, in a possible implementation, if the second setting reflects that the first user can hear the original speech of the second user and the translated speech of the second user, the first terminal plays the original speech of the second user and the second translated speech, where the second translated speech includes the translated speech of the second user. If the second setting reflects that the first user can hear the original speech of the second user, the translated speech of the second user, and the translated speech of the first user, the first terminal plays the original speech of the second user and the first translated speech, where the first translated speech includes the translated speech of the first user and the translated speech of the second user.

In some embodiments, when the first terminal obtains the translated speech of the first user and the translated speech of the second user at the same time, and the second translated speech includes the translated speech of the first user and the translated speech of the second user based on the second setting, the second translated speech is specifically the first mixed speech obtained after the first terminal splices or overlaps the translated speech of the first user and the translated speech of the second user. Herein, for a process in which the first terminal obtains the first mixed speech, refer to step 10 in FIG. 6D-2.

In some embodiments, when the first terminal obtains the second translated speech and the original speech of the second user at the same time, and the second setting includes: playing the second translated speech and the original speech of the second user, that the first terminal plays a second translated speech and/or the original speech of the second user based on a second setting includes: The first terminal plays a third mixed speech obtained after the second translated speech and the original speech of the second user are spliced or overlapped, and plays the third mixed speech. Herein, for a process in which the first terminal obtains the third mixed speech, refer to the downlink speech mixing process shown in FIG. 8. Herein, that the second setting includes playing the second translated speech and the original speech of the second user means that the first user can hear the second translated speech and the original speech of the second user.

In some embodiments, the first terminal has a playing mute function. If the first user enables the playing mute function of the first terminal, the first terminal no longer plays audio, or the first terminal continuously plays audio, but volume of playing the audio is 0.

In some embodiments, after obtaining the original speech of the first user, the translated speech of the first user, the original speech of the second user, and the translated speech of the second user, the first terminal may further convert the audio into a corresponding text, and display the text. To be specific, the first terminal may further display an original text of the first user, a translated text of the first user, an original text of the second user, and a translated text of the second user. Herein, for a specific implementation of displaying each text by the first terminal, refer to the embodiment in FIG. 4 and the related descriptions.

According to the audio processing method in this application, during communication, the first terminal may play audio or send audio to the second terminal based on a user setting. Therefore, different audio streams can be flexibly provided for two communications parties, so that the two communications parties each can hear expected audio, thereby improving user experience in a call process. In addition, provided that one terminal has a translation capability, automatic two-way translation can be implemented during communication, so that the two parties using different languages can normally communicate with each other.

FIG. 15 is a schematic structural diagram of a first terminal according to this application. The first terminal may be the terminal 100 in the embodiments in FIG. 1 to FIG. 12, or may be the first terminal in the embodiment in FIG. 14.

As shown in the figure, the first terminal may include an audio stream collection unit 1501, a modem unit 1502, a translation engine 1503, a translated speech mixing unit 1504, an uplink speech mixing unit 1505, and a downlink speech mixing unit 1506. The audio stream collection unit 1501 is connected to the translation engine 1503 and the uplink speech mixing unit 1505, the modem unit 1502 is connected to the translation engine 1503 and the downlink speech mixing unit 1506, and the translated speech mixing unit 1504 is connected to the translation engine 1503, the uplink speech mixing unit 1505, and the downlink speech mixing unit 1506.

The audio stream collection unit 1501 is configured to collect an original speech of a first user. Specifically, the audio stream collection unit 1501 may continuously collect an input audio stream. The audio stream collection unit 1501 may be a separate microphone.

The modem unit 1502 is configured to demodulate an original speech of a second user, where the original speech of the second user is sent by a second terminal to the first terminal. The modem unit may be a modem.

The translation engine 1503 is configured to translate the original speech of the first user into a translated speech of the first user; and is further configured to translate the original speech of the second user into a translated speech of the second user. Specifically, the translation engine 1503 may locally perform a translation operation on the first terminal, or may send an original speech to a translation server, and receive a translated speech obtained after the translation server translates the original speech. For a process in which the translation engine 1503 translates the original speech, refer to the related descriptions of step S101 in the embodiment in FIG. 14.

The translated speech mixing unit 1504 is configured to receive the translated speech of the first user and/or the translated speech of the second user that are/is output by the translation engine; and is further configured to: send a first translated speech to the uplink speech mixing unit based on a first setting, and send a second translated speech to the downlink speech mixing unit based on a second setting, where the first translated speech includes the translated speech of the first user and/or the translated speech of the second user; and the second translated speech includes the translated speech of the first user and/or the translated speech of the second user.

For the first setting and the second setting, refer to the related descriptions in the embodiment in FIG. 14. Details are not described herein again.

For specific content of the first translated speech and the second translated speech, refer to the related descriptions in the embodiment in FIG. 14. Details are not described herein again.

Specifically, the translated speech mixing unit 1504 is configured to send corresponding audio to the uplink speech mixing unit based on the first setting, where the audio may include the audio sent to the uplink channel in steps 1 to 4 in FIG. 6A, steps 1 to 4 in FIG. 6B, or steps 4 to 7 in FIG. 6D-1 and FIG. 6D-2. For details, refer to the related descriptions. The translated speech mixing unit is further configured to send corresponding audio to the downlink speech mixing unit based on the second setting, where the audio may include the audio sent to the downlink channel in steps 5 to 7 in FIG. 6A, steps 5 to 7 in FIG. 6B, or steps 10 to 13 in FIG. 6D-1 and FIG. 6D-2. For details, refer to the related descriptions.

In some embodiments, when the translated speech mixing unit 1504 obtains the translated speech of the first user and the translated speech of the second user at the same time, and the first translated speech includes the translated speech of the first user and the translated speech of the second user based on the first setting, the translated speech mixing unit 1504 is specifically configured to: splice or overlap the translated speech of the first user and the translated speech of the second user to obtain a first mixed speech, and send the first mixed speech to the uplink speech mixing unit. Herein, for a process in which the translated speech mixing unit 1504 obtains the first mixed speech, refer to step 4 in FIG. 6D-2.

In some embodiments, when the translated speech mixing unit 1504 obtains the translated speech of the first user and the translated speech of the second user at the same time, and the second translated speech includes the translated speech of the first user and the translated speech of the second user based on the second setting, the translated speech mixing unit 1504 is specifically configured to: splice or overlap the translated speech of the first user and the translated speech of the second user to obtain the first mixed speech, and send the first mixed speech to the downlink speech mixing unit. Herein, for a process in which the translated speech mixing unit 1504 obtains the first mixed speech, refer to step 10 in FIG. 6D-2.

The uplink speech mixing unit 1505 is configured to output the first translated speech and/or the original speech of the first user based on the first setting.

In some embodiments, when the uplink speech mixing unit 1505 obtains the first translated speech and the original speech of the first user at the same time, and the first setting includes: sending the first translated speech and the original speech of the first user, that the uplink speech mixing unit 1505 is configured to output the first translated speech and/or the original speech of the first user based on the first setting includes: the uplink speech mixing unit 1505 is configured to: splice or overlap the first translated speech and the original speech of the first user to obtain a second mixed speech, and output the second mixed speech. Herein, for a process in which the uplink speech mixing unit 1505 obtains the second mixed speech, refer to the uplink speech mixing process shown in FIG. 7.

The downlink speech mixing unit 1506 is configured to output the second translated speech and/or the original speech of the second user based on the second setting.

In some embodiments, when the downlink speech mixing unit 1506 obtains the second translated speech and the original speech of the second user at the same time, and the second setting includes: playing the second translated speech and the original speech of the second user, that the downlink speech mixing unit 1506 is configured to output the second translated speech and/or the original speech of the second user based on the second setting includes: the downlink speech mixing unit 1506 is configured to: splice or overlap the second translated speech and the original speech of the second user to obtain a third mixed speech, and output the third mixed speech. Herein, for a process in which the downlink speech mixing unit 1506 obtains the third mixed speech, refer to the downlink speech mixing process shown in FIG. 8. In some embodiments, the first terminal shown in FIG. 15 may further include an uplink channel and a playing device. The uplink channel is connected to the uplink speech mixing unit, and the playing device is connected to the downlink speech mixing unit. The uplink channel is configured to send, to the second terminal, the first translated speech and/or the original speech of the first user that are/is output by the uplink speech mixing unit; and the playing device is configured to play the second translated speech and/or the original speech of the second user that are/is output by the downlink speech mixing unit. The uplink channel may be implemented as an antenna, a mobile communications module, a wireless communications module, or the like. The playing device may include a speaker, an earpiece, a headset, and the like.

In some embodiments, the first terminal shown in FIG. 15 may further include a display unit. The display unit is configured to display an original text of the first user, a translated text of the first user, an original text of the second user, and a translated text of the second user. Herein, for a specific implementation of displaying each text by the first terminal, refer to the embodiment in FIG. 4 and the related descriptions.

In some embodiments, the first terminal shown in FIG. 15 may further include a sound effect processing unit, configured to perform processing such as noise reduction or echo suppression on the continuously collected audio stream.

In some embodiments, the first terminal shown in FIG. 15 may further include a mute control unit, configured to: enable/disable a call mute function of the first terminal based on a user operation.

In some embodiments, the first terminal shown in FIG. 15 may further include a playing device selection unit, configured to select a device that is in the first terminal and that is configured to play audio that is output by the downlink speech mixing unit.

The implementations of this application may be randomly combined to achieve different technical effects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to this application are completely or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk), or the like.

In summary, the foregoing descriptions are merely embodiments of the technical solutions of the present invention, but are not intended to limit the protection scope of the present invention. Any modification, equivalent replacement, and improvement made according to the disclosure of the present invention shall fall within the protection scope of the present invention.

What is claimed is:

1. An audio processing method, applied to a first terminal, wherein the method comprises:
    collecting, by the first terminal, an original speech of a first user, obtaining a translated speech of the first user that is obtained by translating the original speech of the first user, receiving an original speech of a second user that is sent by a second terminal, and obtaining a translated speech of the second user that is obtained by translating the original speech of the second user;
    sending, by the first terminal, a first translated speech and the original speech of the first user to the second terminal based on a first setting; and
    playing, by the first terminal, a second translated speech and the original speech of the second user based on a second setting, wherein
    the first translated speech comprises the translated speech of the first user and/or the translated speech of the second user, and the second translated speech comprises the translated speech of the first user and/or the translated speech of the second user, and
    when the first terminal obtains the translated speech of the first user and the translated speech of the second user at the same time and when they completely overlap, and the first translated speech comprises the translated speech of the first user and the translated speech of the second user, the first translated speech is a first mixed speech obtained after the first terminal splices or overlaps the translated speech of the first user and the translated speech of the second user.

2. The method according to claim 1, wherein
    the translated speech of the first user is obtained by the first terminal through local translation, or a translation server translates the original speech of the first user into the translated speech of the first user, and then sends the translated speech of the first user to the first terminal; and
    the translated speech of the second user is obtained by the first terminal through local translation, or the translation server translates the original speech of the second user into the translated speech of the second user, and then sends the translated speech of the second user to the first terminal.

3. The method according to claim 1, wherein when the first terminal obtains the translated speech of the first user and the translated speech of the second user at the same time, and the first translated speech comprises the translated speech of the first user and the translated speech of the second user, the first translated speech is a first mixed speech obtained after the first terminal overlaps the translated speech of the first user and the translated speech of the second user.

4. The method according to claim 1, wherein when the first terminal obtains the translated speech of the first user and the translated speech of the second user at the same time, and the second translated speech comprises the translated speech of the first user and the translated speech of the second user, the second translated speech is a first mixed speech obtained after the first terminal splices or overlaps the translated speech of the first user and the translated speech of the second user.

5. The method according to claim 1, wherein when the first terminal obtains the first translated speech and the original speech of the first user at the same time, and the first setting comprises: sending the first translated speech and the original speech of the first user,
the sending, by the first terminal, a first translated speech and/or the original speech of the first user to the second terminal based on the first setting comprises: sending, by the first terminal to the second terminal, a second mixed speech obtained after the first translated speech and the original speech of the first user are spliced or overlapped.

6. The method according to claim 1, wherein when the first terminal obtains the second translated speech and the original speech of the second user at the same time, and the second setting comprises: playing the second translated speech and the original speech of the second user,
the playing, by the first terminal, a second translated speech and/or the original speech of the second user based on the second setting comprises: playing, by the first terminal, a third mixed speech obtained after the second translated speech and the original speech of the second user are spliced or overlapped, and playing the third mixed speech.

7. The method according to claim 1, wherein the first setting reflects a call mode of the second terminal.

8. The method according to claim 1, wherein the second setting reflects a call mode of the first terminal.

9. The method according to claim 1, wherein the method further comprises:
displaying, by the first terminal, an original text of the first user, a translated text of the first user, an original text of the second user, and a translated text of the second user, wherein
the original text of the first user is a text corresponding to the original speech of the first user, the translated text of the first user is a text corresponding to the translated speech of the first user, the original text of the second user is a text corresponding to the original speech of the second user, and the translated text of the second user is a text corresponding to the translated speech of the second user.

10. A first terminal, comprising:
at least one processor; and
a memory coupled to the at least one processor, wherein the memory comprises instructions that, when executed by the at least one processor, cause the first terminal to perform operations comprising:
collecting an original speech of a first user, obtaining a translated speech of the first user that is obtained by translating the original speech of the first user, receiving an original speech of a second user that is sent by a second terminal, and obtaining a translated speech of the second user that is obtained by translating the original speech of the second user;
sending a first translated speech and the original speech of the first user to the second terminal based on a first setting; and
playing a second translated speech and the original speech of the second user based on a second setting, wherein
the first translated speech comprises the translated speech of the first user and/or the translated speech of the second user; and the second translated speech comprises the translated speech of the first user and/or the translated speech of the second user, and
when the first terminal obtains the translated speech of the first user and the translated speech of the second user at the same time and when they completely overlap, and the first translated speech comprises the translated speech of the first user and the translated speech of the second user, the first translated speech is a first mixed speech obtained after the first terminal splices or overlaps the translated speech of the first user and the translated speech of the second user.

11. The first terminal according to claim 10, wherein
the translated speech of the first user is obtained by the first terminal through local translation, or a translation server translates the original speech of the first user into the translated speech of the first user, and then sends the translated speech of the first user to the first terminal; and
the translated speech of the second user is obtained by the first terminal through local translation, or the translation server translates the original speech of the second user into the translated speech of the second user, and then sends the translated speech of the second user to the first terminal.

12. The first terminal according to claim 10, wherein when the first terminal obtains the translated speech of the first user and the translated speech of the second user at the same time, and the first translated speech comprises the translated speech of the first user and the translated speech of the second user, the first translated speech is a first mixed speech obtained after the first terminal splices or overlaps the translated speech of the first user and the translated speech of the second user.

13. The first terminal according to claim 10, wherein when the first terminal obtains the translated speech of the first user and the translated speech of the second user at the same time, and the second translated speech comprises the translated speech of the first user and the translated speech of the second user, the second translated speech is a first mixed speech obtained after the first terminal splices or overlaps the translated speech of the first user and the translated speech of the second user.

14. The first terminal according to claim 10, wherein when the first terminal obtains the first translated speech and the original speech of the first user at the same time, and the first setting comprises: sending the first translated speech and the original speech of the first user,
the sending the first translated speech and/or the original speech of the first user to the second terminal based on the first setting comprises: sending, by the first terminal to the second terminal, a second mixed speech obtained after the first translated speech and the original speech of the first user are spliced or overlapped.

15. The first terminal according to claim 10, wherein when the first terminal obtains the second translated speech and the original speech of the second user at the same time, and the second setting comprises: playing the second translated speech and the original speech of the second user,
the playing the second translated speech and/or the original speech of the second user based on the second setting comprises: playing a third mixed speech obtained after the second translated speech and the original speech of the second user are spliced or overlapped, and playing the third mixed speech.

16. A computer program product comprising instructions stored on a non-transitory computer-readable medium that, when executed by a processor, cause a first terminal to perform operations comprising:
- collecting an original speech of a first user, obtaining a translated speech of the first user that is obtained by translating the original speech of the first user, receiving an original speech of a second user that is sent by a second terminal, and obtaining a translated speech of the second user that is obtained by translating the original speech of the second user;
- sending a first translated speech and the original speech of the first user to the second terminal based on a first setting; and
- playing a second translated speech and the original speech of the second user based on a second setting, wherein the first translated speech comprises the translated speech of the first user and/or the translated speech of the second user; and the second translated speech comprises the translated speech of the first user and/or the translated speech of the second user, and
- when the first terminal obtains the translated speech of the first user and the translated speech of the second user at the same time and when they completely overlap, and the first translated speech comprises the translated speech of the first user and the translated speech of the second user, the first translated speech is a first mixed speech obtained after the first terminal splices or overlaps the translated speech of the first user and the translated speech of the second user.

17. The computer program product according to claim 16, wherein
- the translated speech of the first user is obtained by the first terminal through local translation, or a translation server translates the original speech of the first user into the translated speech of the first user, and then sends the translated speech of the first user to the first terminal; and
- the translated speech of the second user is obtained by the first terminal through local translation, or the translation server translates the original speech of the second user into the translated speech of the second user, and then sends the translated speech of the second user to the first terminal.

18. The computer program product according to claim 16, wherein when the first terminal obtains the translated speech of the first user and the translated speech of the second user at the same time, and the first translated speech comprises the translated speech of the first user and the translated speech of the second user, the first translated speech is a first mixed speech obtained after the first terminal overlaps the translated speech of the first user and the translated speech of the second user.

19. The computer program product according to claim 16, wherein when the first terminal obtains the translated speech of the first user and the translated speech of the second user at the same time, and the second translated speech comprises the translated speech of the first user and the translated speech of the second user, the second translated speech is a first mixed speech obtained after the first terminal splices or overlaps the translated speech of the first user and the translated speech of the second user.

20. The computer program product according to claim 16, wherein when the first terminal obtains the first translated speech and the original speech of the first user at the same time, and the first setting comprises: sending the first translated speech and the original speech of the first user,
- the sending the first translated speech and/or the original speech of the first user to the second terminal based on the first setting comprises: sending, to the second terminal, a second mixed speech obtained after the first translated speech and the original speech of the first user are spliced or overlapped.

* * * * *

UNITED STATES PATENT AND TRADEMARK OFFICE
CERTIFICATE OF CORRECTION

PATENT NO. : 11,893,359 B2
APPLICATION NO. : 17/230337
DATED : February 6, 2024
INVENTOR(S) : Zhang et al.

It is certified that error appears in the above-identified patent and that said Letters Patent is hereby corrected as shown below:

In the Claims

In Column 50, in Claim 12, Line 32, after "terminal" delete "splices or".

Signed and Sealed this
Seventh Day of May, 2024

Katherine Kelly Vidal
*Director of the United States Patent and Trademark Office*